(12) United States Patent
Watson et al.

(10) Patent No.: US 7,136,494 B2
(45) Date of Patent: Nov. 14, 2006

(54) VEHICLE ACCESSORY MICROPHONE ASSEMBLY HAVING A WINDSCREEN WITH HYDROPHOBIC PROPERTIES

(75) Inventors: Alan R. Watson, Buchanan, MI (US);
Robert C. Knapp, Coloma, MI (US);
Robert R. Turnbull, Holland, MI (US);
William R. Spence, Holland, MI (US);
G. Bruce Poe, Hamilton, MI (US);
Michael A. Bryson, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 7 days.

(21) Appl. No.: 10/635,751

(22) Filed: Aug. 6, 2003

(65) Prior Publication Data

US 2004/0028239 A1  Feb. 12, 2004

Related U.S. Application Data

(63) Continuation of application No. 09/724,119, filed on Nov. 28, 2000, now Pat. No. 6,614,911, and a continuation of application No. PCT/US00/31708, filed on Nov. 17, 2000, which is a continuation-in-part of application No. 09/444,176, filed on Nov. 19, 1999.

(60) Provisional application No. 60/242,465, filed on Oct. 23, 2000, provisional application No. 60/221,307, filed on Jul. 28, 2000, provisional application No. 60/216,297, filed on Jul. 6, 2000, provisional application No. 60/195,509, filed on Apr. 6, 2000.

(51) Int. Cl.
*H04B 1/00* (2006.01)
*H04R 3/00* (2006.01)
*H04R 11/04* (2006.01)

(52) U.S. Cl. .................. 381/86; 381/92; 381/357; 381/359; 381/355

(58) Field of Classification Search .................. 381/86, 381/92
See application file for complete search history.

(56) References Cited

U.S. PATENT DOCUMENTS

| 3,963,881 A |   | 6/1976 | Fraim et al. |
| 3,995,124 A | * | 11/1976 | Gabr .......................... 381/357 |
| 4,117,275 A |   | 9/1978 | Miyanaga et al. |
| 4,182,937 A |   | 1/1980 | Greenwood |
| 4,194,096 A |   | 3/1980 | Ramsey |
| 4,258,235 A |   | 3/1981 | Watson |

(Continued)

FOREIGN PATENT DOCUMENTS

DE        104 891 A1    3/1974

(Continued)

OTHER PUBLICATIONS

D. Van Nostrand Company, Inc., *Acoustical Engineering-Microphones*, first published May 1957, reprinted Aug. 1960, Oct. 1964, Oct. 1967, pp. 310-319, Based on an earlier work entitled *Elements of Acoustical Engineering*, by Harry F. Olson, copyright 1940, 1947 by D. Van Nostrand Company, Inc.

(Continued)

*Primary Examiner*—Laura A. Grier
(74) *Attorney, Agent, or Firm*—Price, Heneveld, Cooper, DeWitt & Litton, LLP

(57) ABSTRACT

A microphone assembly for a vehicle accessory includes one or more transducers positioned in a microphone housing. The microphone housing has at least one acoustic port to which the transducer is acoustically coupled. The microphone assembly further includes a windscreen sealed across the acoustic port. The windscreen having hydrophobic properties to prevent water from penetrating the microphone housing through the acoustic port.

28 Claims, 32 Drawing Sheets

U.S. PATENT DOCUMENTS

| | | |
|---|---|---|
| 4,264,790 A | 4/1981 | Zlevor |
| 4,268,725 A | 5/1981 | Nakagawa et al. |
| 4,354,059 A | 10/1982 | Ishigaki et al. |
| 4,362,907 A | 12/1982 | Polacsek |
| 4,401,859 A | 8/1983 | Watson |
| 4,410,770 A | 10/1983 | Hagey |
| 4,418,404 A | 11/1983 | Gordon et al. |
| 4,456,796 A | 6/1984 | Nakagawa et al. |
| 4,567,608 A | 1/1986 | Watson et al. |
| 4,570,746 A | 2/1986 | Das et al. |
| 4,600,077 A | 7/1986 | Drever |
| 4,625,827 A | 12/1986 | Bartlett |
| 4,685,137 A | 8/1987 | Watson et al. |
| 4,712,429 A | 12/1987 | Raspet et al. |
| 4,768,614 A | 9/1988 | Case |
| 4,817,164 A | 3/1989 | Bertignoll et al. |
| 4,858,719 A | 8/1989 | Fidi et al. |
| 4,885,773 A | 12/1989 | Stottlemyer et al. |
| 4,887,300 A | 12/1989 | Erling |
| 4,888,807 A | 12/1989 | Reichel |
| 4,930,742 A | 6/1990 | Schofield et al. |
| 4,975,966 A | 12/1990 | Sapiejewski |
| 5,193,117 A | 3/1993 | Ono et al. |
| 5,323,466 A | 6/1994 | Geddes |
| 5,349,140 A | 9/1994 | Valenzin |
| 5,410,604 A | 4/1995 | Saito et al. |
| 5,414,776 A | 5/1995 | Sims, Jr. |
| 5,426,703 A | 6/1995 | Hamabe et al. |
| 5,566,224 A | 10/1996 | ul Azam et al. |
| 5,631,638 A | 5/1997 | Kaspar et al. |
| 5,699,436 A | 12/1997 | Claybaugh et al. |
| 5,812,496 A | 9/1998 | Peck |
| 5,854,848 A | 12/1998 | Tate et al. |
| 5,862,240 A | 1/1999 | Ohkubo et al. |
| 5,870,485 A | 2/1999 | Lundgren et al. |
| 5,878,353 A | 3/1999 | ul Azam et al. |
| 5,940,503 A | 8/1999 | Palett et al. |
| 6,026,162 A | 2/2000 | Palett et al. |
| 6,061,457 A | 5/2000 | Stockhamer |
| 6,091,830 A | 7/2000 | Toki |
| 6,118,881 A | 9/2000 | Quinlan et al. |
| 6,127,919 A | 10/2000 | Wylin |
| 6,246,765 B1 | 6/2001 | Palett et al. |
| 6,278,377 B1 | 8/2001 | DeLine et al. |
| 6,433,676 B1 | 8/2002 | DeLine et al. |
| 6,560,344 B1 * | 5/2003 | Julstrom et al. ............ 381/356 |
| 6,614,911 B1 * | 9/2003 | Watson et al. ................ 381/86 |
| 6,717,524 B1 * | 4/2004 | DeLine et al. ........... 340/815.4 |

FOREIGN PATENT DOCUMENTS

| | | |
|---|---|---|
| EP | 1078818 | 2/2001 |
| EP | 0 624 046 A1 | 11/2004 |
| JP | 56089194 | 7/1981 |
| JP | 56116396 | 9/1981 |
| JP | 59149494 | 8/1984 |
| JP | 3231044 | 10/1991 |
| JP | 10107880 | 4/1998 |
| WO | 9858450 | 12/1998 |
| WO | 9966638 | 12/1999 |
| WO | 0052639 | 9/2000 |

OTHER PUBLICATIONS

Robertson, A.E., "Microphones," *Wireless World by Iliffe Books Ltd.*, 1963.

* cited by examiner

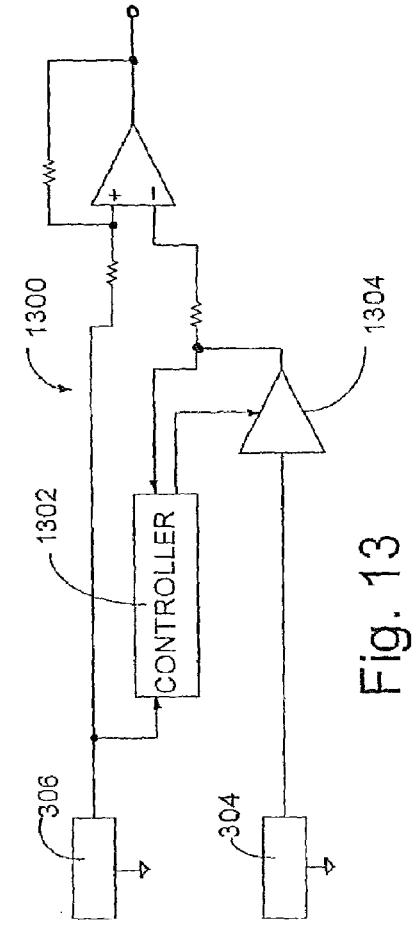
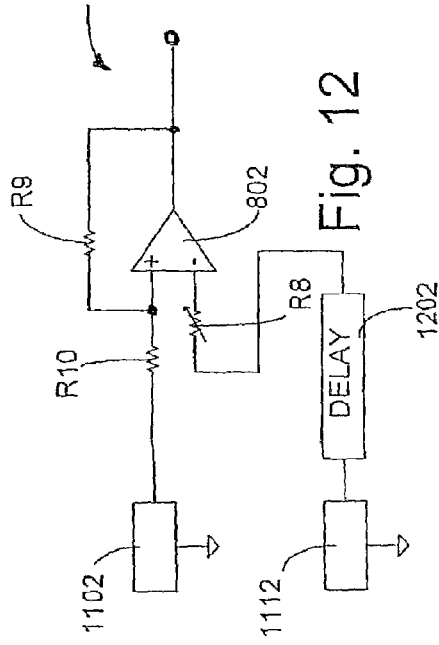
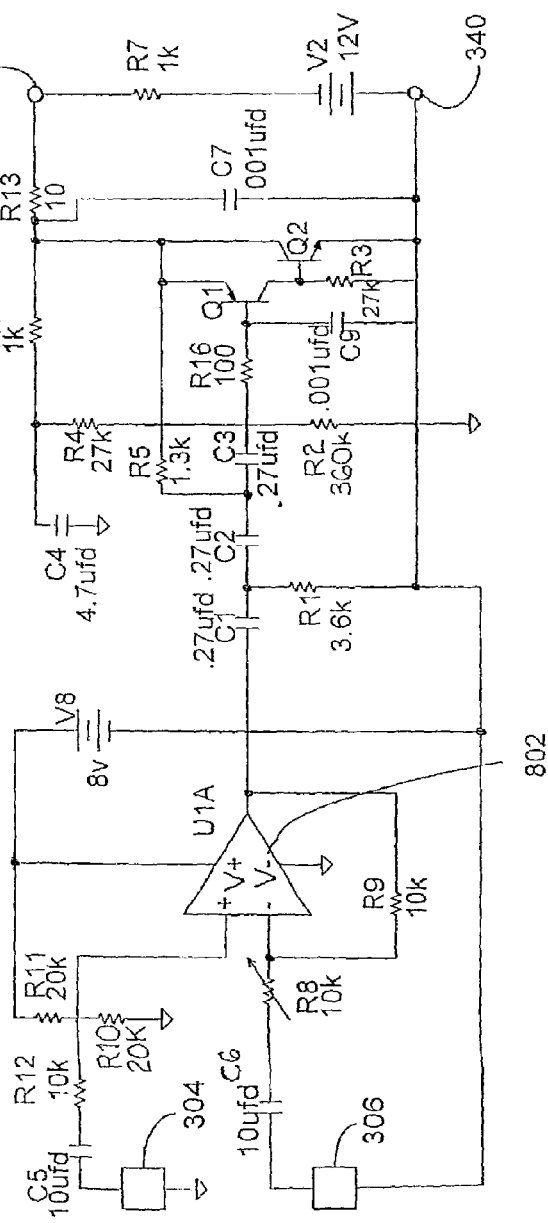

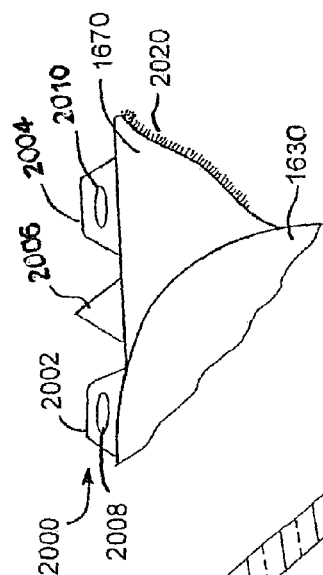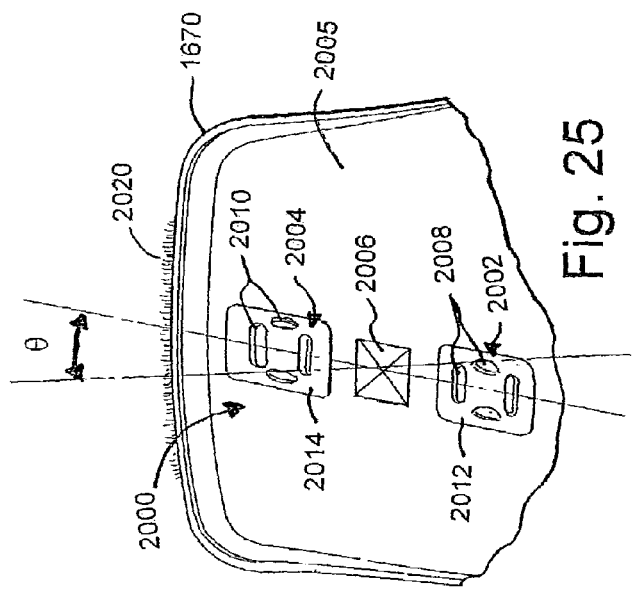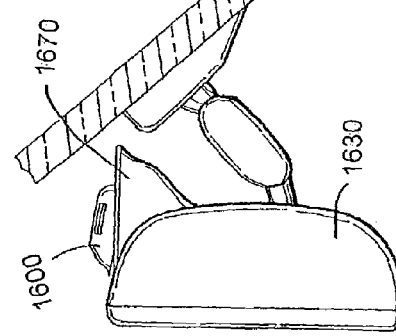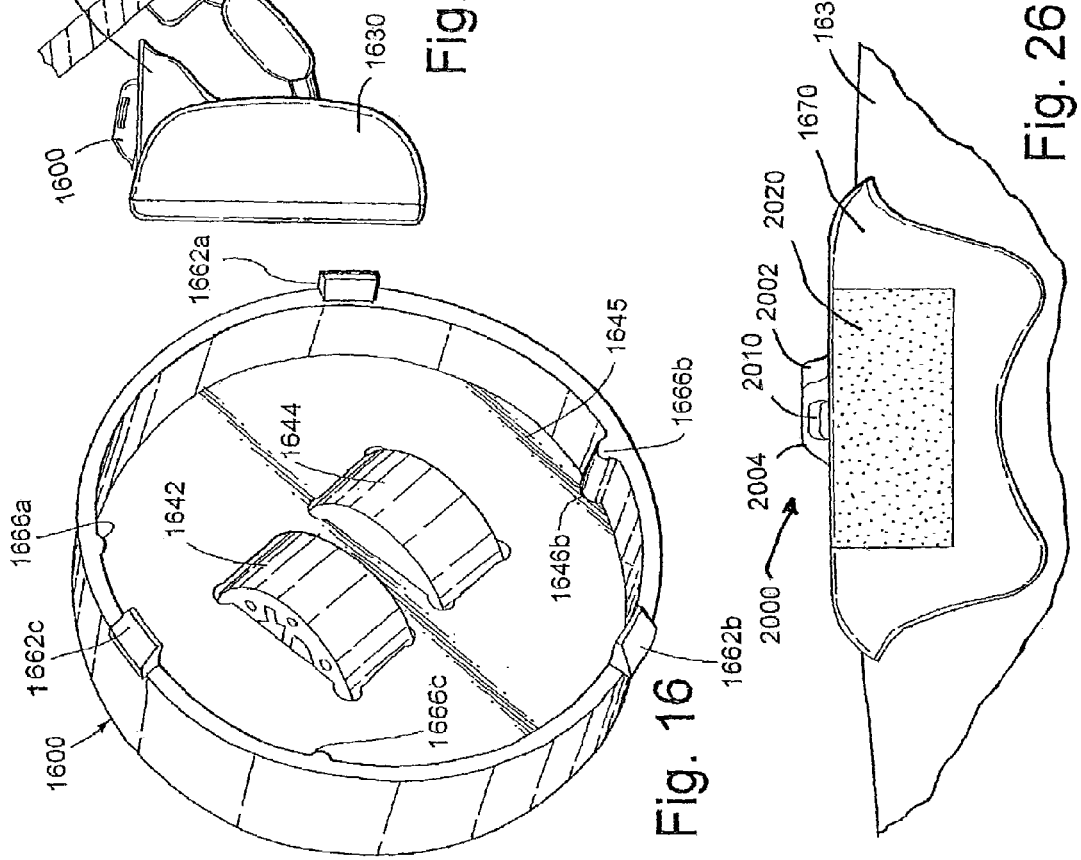

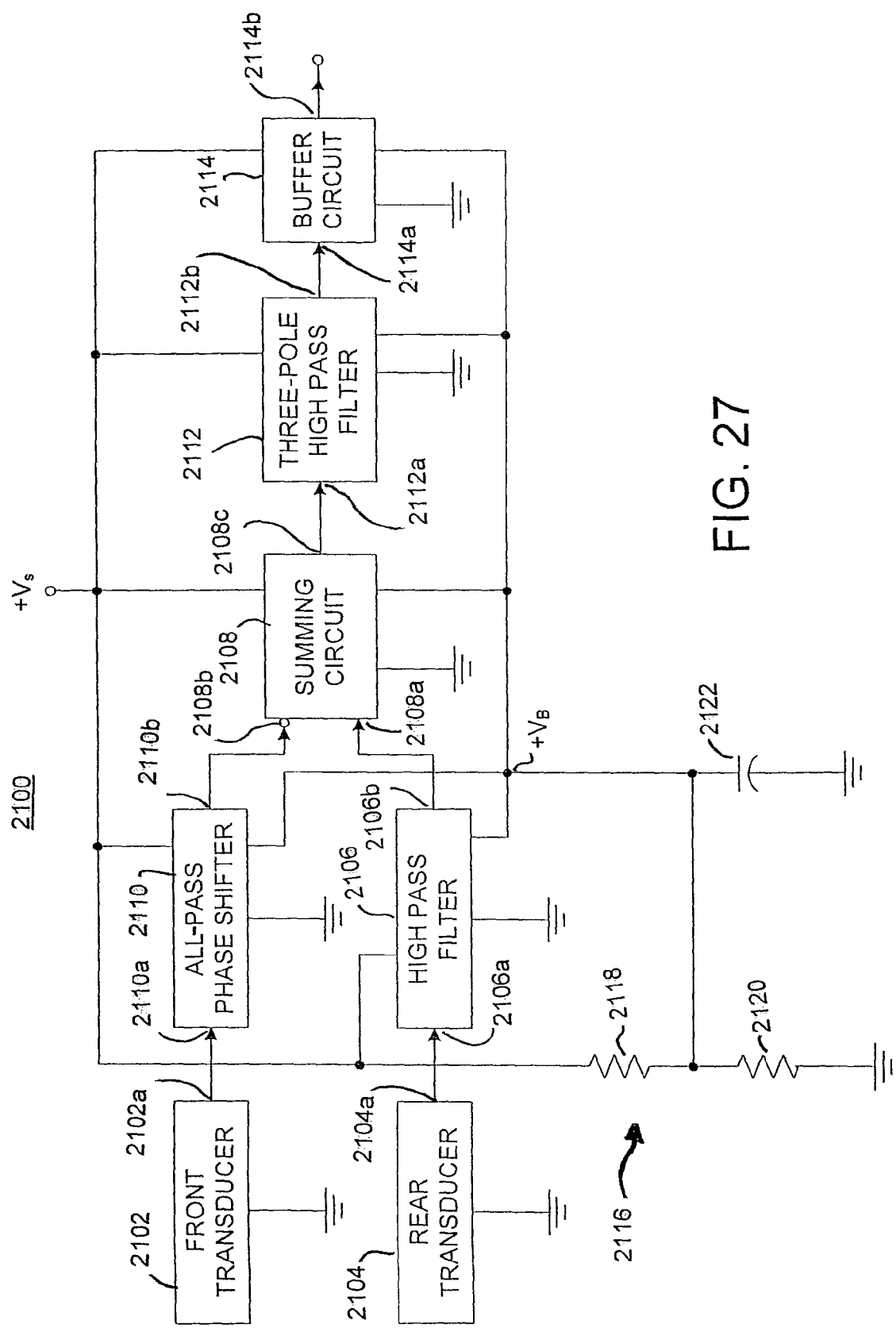

VEHICLE ACCESSORY MICROPHONE ASSEMBLY HAVING A WINDSCREEN WITH HYDROPHOBIC PROPERTIES

CROSS-REFERENCE TO RELATED APPLICATIONS

This application is a continuation of U.S. patent application Ser. No. 09/724,119, entitled "MICROPHONE ASSEMBLY HAVING A WINDSCREEN OF HIGH ACOUSTIC RESISTIVITY AND/OR HYDROPHOBIC MATERIAL," filed on Nov. 28, 2000 by Alan R. Watson et al., now U.S. Pat. No. 6,614,911 which issued Sep. 2, 2003, which is a continuation-in-part of U.S. patent application Ser. No. 09/444,176, entitled "VEHICLE ACCESSORY MICROPHONE," filed on Nov. 19, 1999 by Robert R. Turnbull et al., and which is continuation under 35 U.S.C. §120 of International PCT Application No. PCT/US00/31708, filed on Nov. 17, 2000. U.S. patent application Ser. No. 09/724,119 also claims priority under 35 U.S.C. §119(e) on U.S. Provisional Patent Application No. 60/195,509, entitled "VEHICLE REARVIEW MIRROR ASSEMBLY INCORPORATING A COMMUNICATION SYSTEM," filed on Apr. 6, 2000 by Robert R. Turnbull et al.; on U.S. Provisional Patent Application No. 60/216,297, entitled "VEHICLE REARVIEW MIRROR ASSEMBLY INCORPORATING A COMMUNICATION SYSTEM," filed on Jul. 6, 2000 by Robert R. Turnbull et al.; on U.S. Provisional Patent Application No. 60/221,307, entitled "AUTOMOTIVE MICROPHONE INTERFACE CIRCUIT," filed on Jul. 28, 2000 by Robert R. Turnbull et al.; and on U.S. Provisional Patent Application No. 60/242,465, entitled "VEHICLE REARVIEW MIRROR ASSEMBLY INCORPORATING A COMMUNICATION SYSTEM," filed on Oct. 23, 2000 by Robert R. Turnbull et al.

The disclosures of each of the above-referenced applications are incorporated herein in their entirety.

BACKGROUND OF THE INVENTION

The present invention pertains to microphones, and more particularly to a microphone associated with a vehicle accessory such as a rearview mirror assembly or the housing of a rear vision display device.

It has long been desired to provide improved microphone performance in devices such as communication devices and voice recognition devices that operate under a variety of different ambient noise conditions. Communication devices supporting hands-free operation permit the user to communicate through a microphone of a device that is not held by the user. Because of the distance between the user and the microphone, these microphones often detect undesirable noise in addition to the user's speech. The noise is difficult to attenuate. A particularly challenging hands-free application where dynamically varying ambient noise is present is a hands-free communication system for a vehicle. For example, bi-directional communication systems such as two-way radios, cellular telephones, satellite phones, and the like, are used in vehicles, such as automobiles, trains, airplanes and boats. For a variety of reasons, it is preferable for the communication devices of these systems to operate hands-free, such that the user need not hold the device while talking, even in the presence of high ambient noise levels subject to wide dynamic fluctuations.

Bi-directional communication systems include an audio speaker and a microphone. In order to improve hands-free performance in a vehicle communication system, a microphone is typically mounted near the driver's head. For example, a microphone is commonly attached to the vehicle visor or headliner using a fastener such as a clip, adhesive, hook and loop fastening tape (such as VELCRO® brand fastener), or the like. The audio speaker associated with the communication system is preferably positioned remote from the microphone to assist in minimizing feedback from the audio speaker to the microphone. It is common, for example, for the audio speaker to be located in a vehicle adaptor, such as a hang-up cup or a cigarette lighter plug used to provide energizing power from the vehicle electrical system to the communication device. Thus, although the communication system designer knows the position of the audio speaker in advance, the position of the microphone is unknown as the user can position the microphone where they choose. The position of the microphone relative to the person speaking will determine the level of the speech signal output by the microphone and may affect the signal-to-noise ratio. The position of the microphone relative to the audio speaker will impact on feedback between the speaker and microphone. Accordingly, the performance of the audio system is subject to the user's installation of the microphone. Additionally, the microphone will typically include a wire, which if it is mounted to the surface of the vehicle interior, will not be aesthetically pleasing. Alternatively, if the wire is to be mounted behind the interior lining, the vehicle interior must be disassembled and then reattached so that the wire can be hidden, which may result in parts that rattle loudly or hang loosely from the vehicle frame.

One potential solution to avoid these difficulties is disclosed in U.S. Pat. No. 4,930,742, entitled "REARVIEW MIRROR AND ACCESSORY MOUNT FOR VEHICLES", issued to Schofield et al. on Jun. 5, 1990, which uses a microphone in a mirror mounting support. Although locating the microphone in the mirror support provides the system designer with a microphone location that is known in advance, and avoids the problems associated with mounting the microphone after the vehicle is manufactured, there are a number of disadvantages to such an arrangement. Because the mirror is positioned between the microphone and the person speaking into the microphone, a direct unobstructed path from the user to the microphone is precluded. Additionally, the location of the microphone on the windshield detrimentally impacts on microphone design flexibility and overall noise performance of the microphone.

U.S. Pat. Nos. 5,940,503, 6,026,162, 5,566,224, 5,878,353, and D 402,905 disclose rearview mirror assemblies with a microphone mounted in the bezel of the mirror. None of these patents, however, discloses the use of acoustic ports facing multiple directions nor do they disclose microphone assemblies utilizing more than one microphone transducer. The disclosed microphone assemblies do not incorporate sufficient noise suppression components to provide output signals with relatively high signal-to-noise ratios, and do not provide a microphone having a directional sensitivity pattern or a main lobe directed forward of the housing and attenuating signals originating from the sides of the housing.

It is highly desirable to provide voice recognition systems in association with vehicle communication systems, and most preferably, such a system would enable hands-free operation. Hands-free operation of a device used in a voice recognition system is a particularly challenging application for microphones, as the accuracy of a voice recognition system is dependent upon the quality of the electrical signal representing the user's speech. Conventional hands-free microphones are not able to provide the consistency and predictability of microphone performance needed for such an application in a controlled environment such as an office, let alone in an uncontrolled environment such as an automobile.

Accordingly, there is a need for a microphone for a vehicle providing improved hands-free performance and preferably enabling voice recognition operation.

Historically, automotive microphones have utilized a two wire interface to provide an audio signal from the microphone assembly to an electronic assembly (e.g., an amplifier stage). This two wire interface has also provided a power source to the microphone assembly and a wetting current through the interface such that reliable continuity was maintained between the microphone and the electronic assembly (see FIG. 35 and the description below).

Digital signal processors (DSPs) or other more advanced circuitry that may be used within a microphone assembly require more power than can normally be delivered through a standard two wire interface. As such, microphone assemblies incorporating DSPs may also require an auxiliary power source to be incorporated within the microphone assembly. However, implementing an auxiliary power source within a microphone assembly can introduce ground loops. Further, when non-precious metal contacts are used in a connector of a microphone interface, the contacts of the interface are prone to oxidation, which eventually leads to a continuity problem between the microphone assembly and the electronic assembly.

Thus, what is needed is a microphone interface for automotive microphone assemblies that include a power source that provides reliable continuity.

SUMMARY OF THE INVENTION

An aspect of the present invention is to provide a vehicle accessory having superior speech separation in the presence of noise. Another aspect of the present invention is to provide a vehicle accessory with enhanced performance for use in hands-free devices, including highly sensitive applications such as voice recognition for a vehicle telecommunication system.

To achieve these and other aspects and advantages, the vehicle accessory of the present invention comprises a housing; at least one transducer functioning as a microphone, the at least one transducer positioned in the housing; and a circuit coupled to the transducer for outputting an electrical signal such that the microphone has a main lobe directed forward of the housing and attenuating signals originating from the sides of the housing.

According to another embodiment of the present invention, a rearview mirror assembly is provided for achieving the above and other aspects and advantages, which comprises a rearview mirror housing; a mirror positioned in the rearview mirror housing; a microphone housing mounted on the rearview mirror housing, the microphone housing having at least one front port and at least one rear port; and at least one transducer positioned in the microphone housing, the at least one transducer including openings ported to the at least one front port and at the at least one rear port such that the microphone has a directional sensitivity pattern.

Another embodiment of the inventive vehicle accessory comprises at least one first transducer; at least one second transducer, wherein the first and second transducers are positioned in spaced relation; and a circuit coupled to the first and second transducers for combining the output signal of the first and second transducers to produce an audio signal with a reduced noise component.

The vehicle accessory may include a housing in which the transducers are positioned. Additionally, the housing may be mounted on a vehicle rearview mirror assembly. According to one embodiment of the present invention, the housing includes a deflector disposed proximate the transducers to deflect airflow away from the transducers. The deflector or other part of the housing may optionally include a fine turbulence generator disposed on at least a portion of its surface to create fine turbulence in air flowing around the deflector. According to yet another embodiment, the housing has an acoustic port, and a windscreen sealed across the acoustic port. The windscreen may have hydrophobic properties to prevent water from penetrating the housing through the acoustic port. The windscreen preferably has an acoustic resistivity of at least about 1 acoustic $\Omega/cm^2$.

According to another embodiment, the vehicle accessory may include: a first housing having at least one acoustic port, wherein the first transducer is disposed in the first housing and acoustically coupled to the acoustic port of the first housing; a first windscreen disposed across the acoustic port of the first housing; a second housing having at least one acoustic port, wherein the second transducer is disposed in the second housing and acoustically coupled to the acoustic port of the second housing; and a second windscreen disposed across the acoustic port of the second housing. With this arrangement, the first and second windscreens may have different acoustic resistivity, and the acoustic ports of the first and second housings may be configured differently, to compensate for differences, or create differences, in the polar patterns of the transducers.

In one embodiment, the vehicle accessory further includes a circuit board having a hole sized to receive at least a portion of the first and second transducers, wherein the transducers are mounted within the hole in the circuit board such that a portion of the transducers extends below a bottom surface of the circuit board.

According to one embodiment of the invention, the first transducer is positioned in front of the second transducer to provide a second order microphone. According to another embodiment of the invention, the vehicle accessory may include a mechanical structure disposed between the transducers to increase the acoustic path length between the transducers. The circuit may be configured to subtract the signal from the at least one first transducer from the signal from the at least one second transducer.

In one embodiment, the vehicle accessory further includes a high pass filter for filtering out low frequency components of audio signal generated by the second transducer, and the combining circuit subtracts at least a portion of one audio signal from the other to generate an audio output signal.

According to another embodiment, the first transducer receives an audio signal including a speech signal and noise, and generates a first electrical signal representative of the received audio signal, while the second transducer receives an audio signal including noise, and generates a second electrical signal representative of the received audio signal. The vehicle accessory may further include a speech detector coupled to the first and second transducers for detecting the presence of speech; a variable gain amplifier coupled to the second transducer for selectively adjusting the gain of the second electrical signal in response to a gain adjustment signal; and a control circuit coupled to the first and second transducers, the speech detector, and the variable gain amplifier for generating the gain adjustment signal as a function of the levels of the first and second electrical signals received from the transducers and in response to a detection of speech by the speech detector.

Another aspect of the present invention is to provide an audio system having superior speech separation in the presence of noise. Another aspect of the present invention is to provide an audio system with enhanced performance for use in hands-free devices, including highly sensitive applications such as voice recognition for a telecommunication system.

To achieve these and other aspects and advantages, the audio system of the present invention comprises a microphone for receiving an audio signal including a speech signal and noise, and for generating an electrical signal representative of the received audio signal, and a filter coupled to the microphone for receiving the electrical signal generated by the microphone and filtering the electrical signal to significantly reduce the noise and produce a filtered electrical signal including the received speech signal. The filter includes a plurality of narrow passbands at frequencies spaced from each other by a predetermined frequency corresponding to a fundamental frequency in the speech signal. The filter thereby blocks frequency components of the received audio signal that lie between the plurality of narrow passbands.

According to another embodiment of the present invention, an adaptive filter is provided for removing noise from an audio signal including a speech component signal. The adaptive filter of the present invention comprises a digital signal processor configured to: convert a received analog signal into a digitized audio signal; identify a fundamental frequency and harmonics in the speech component of the digitized audio signal; provide an inverse comb filter; and pass the digitized audio signal through the inverse comb filter to filter out frequency components of the digitized audio signal that do not correspond to the identified harmonic frequencies. The digital signal processor may further be configured to convert the filtered digitized audio signal into an analog signal for output from the digital signal processor. The digital signal processor identifies the fundamental frequency by (a) performing a fast Fourier transform on the received audio signal, (b) identifying frequency components in the fast Fourier transform that have amplitudes exceeding a predetermined threshold, and (c) identifying the fundamental frequency as the difference in frequency of those frequency components having an amplitude above the predetermined threshold.

The present invention is also directed to a technique for providing reliable continuity through a two wire microphone interface that removably couples a microphone to an electronic assembly. The microphone includes a power source and the two wire microphone interface, which includes two contacts that provide an audio signal to the electronic assembly. A continuous direct current is provided through the two contacts such that a low impedance path is maintained between the microphone and the electronic assembly.

These and other features, advantages and objects of the present invention will be further understood and appreciated by those skilled in the art by reference to the following specification, claims, and appended drawings.

BRIEF DESCRIPTION OF THE DRAWINGS

The subject matter that is regarded as the invention is particularly pointed out and distinctly claimed in the claim portion that concludes the specification. The invention, together with further objects and advantages thereof, may best be understood by reference to the following description taken in conjunction with the accompanying drawings, where like numerals represent like components, and in which:

FIG. 8 is a circuit schematic partially in block diagram form illustrating a circuit employed with the microphone assembly of FIGS. 3–7;

FIG. 12 is a circuit schematic partially in block diagram form illustrating a circuit for use with the microphone according to claim 11;

FIG. 13 is a circuit schematic partially in block diagram form illustrating an auto-calibration circuit for use with the microphone assembly;

FIG. 16 is a perspective view of a microphone assembly constructed in accordance with another embodiment of the present invention;

FIG. 20 is a side elevation of the rearview mirror assembly shown in FIGS. 18 and 19;

FIG. 24 is a side elevational view of a portion of a rearview mirror assembly having a deflector, a fine turbulence generator and a microphone assembly according to another embodiment of the present invention;

FIG. 25 is a top view of the portion of the rearview mirror assembly having the deflector, the fine turbulence generator and the microphone assembly that are shown in FIG. 24;

FIG. 26 is a rear view of the portion of the rearview mirror assembly having the deflector, the fine turbulence generator and the microphone assembly that are shown in FIGS. 24 and 25;

FIG. 27 is an electrical circuit diagram in block form showing an embodiment of a microphone processing circuit of the present invention;

DETAILED DESCRIPTION OF THE INVENTION

The microphone assemblies of the present invention are associated with an interior rearview mirror and have superior performance even in the presence of noise. The microphone assemblies enhance the performance of hands-free devices with which they are associated, including highly sensitive applications such as voice recognition for a telecommunication system, by improving the signal-to-noise ratio of the microphone assembly output. The microphone assemblies eliminate mechanically induced noise and provide the designer with significant freedom with respect to selection of the microphone assembly's sensitivity, frequency response and polar pattern. Additionally, circuitry can be provided for the transducer to generate an audio signal from the transducer output that has a high signal-to-noise ratio.

Figure 1:
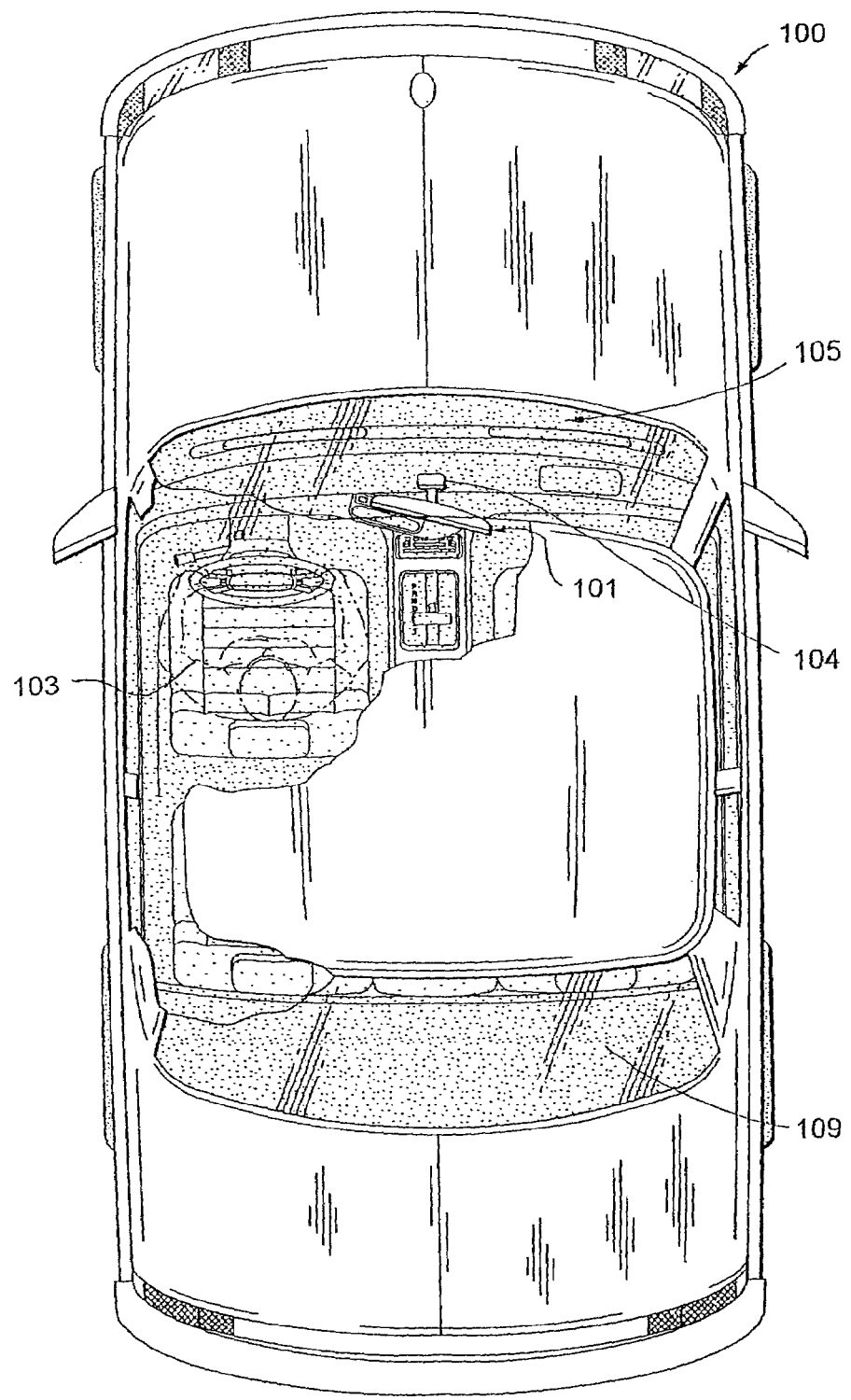
FIG. 1 is a top plan view illustrating a vehicle with a portion of the roof cut away.

A vehicle 100 (FIG. 1) includes an interior rearview mirror assembly 101 by which the vehicle operator 103 (illustrated in phantom) can view a portion of the road behind the vehicle 100 without having to turn around. The rearview mirror assembly 101 is mounted to the vehicle windshield 105, or the vehicle's headliner, via a mirror mounting support 104, in a conventional manner that facilitates electrical connection of the rearview mirror to the vehicle's electrical system and permits driver adjustment of the mirror-viewing angle.

Figure 2:
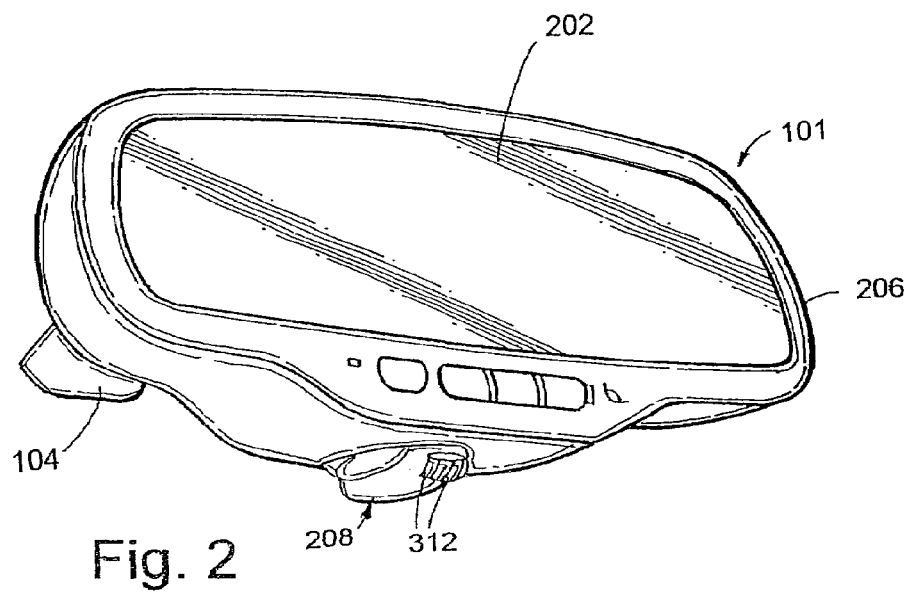
FIG. 2 is a front, bottom and left side perspective view illustrating a rearview mirror assembly and fragmentary mirror support used in the vehicle of FIG. 1.
Figure 3:
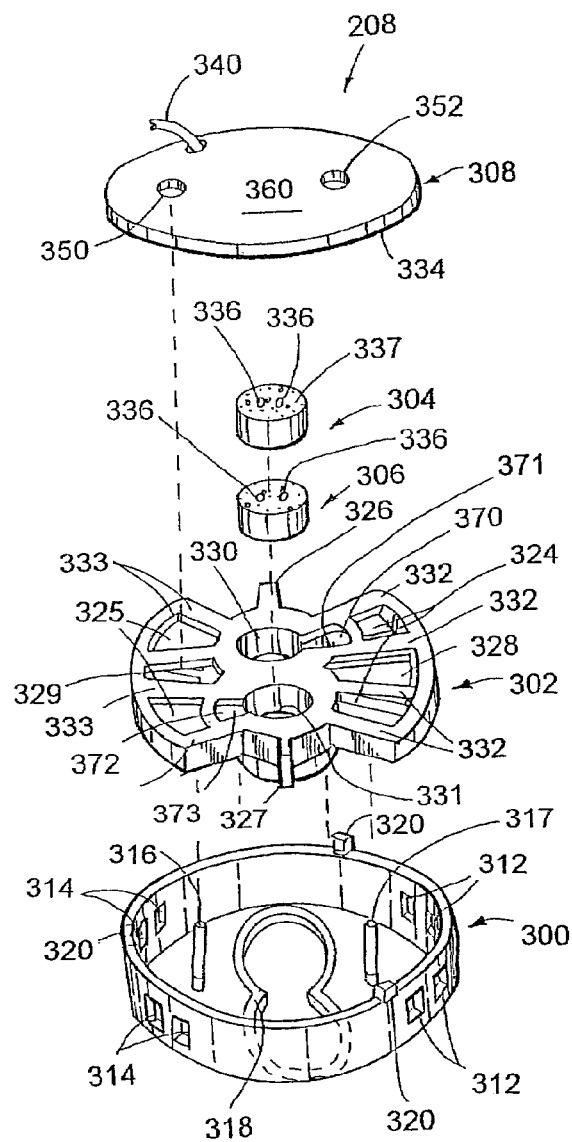
FIG. 3 is a top exploded view illustrating a microphone assembly used in the mirror according to FIG. 2.
Figure 4:
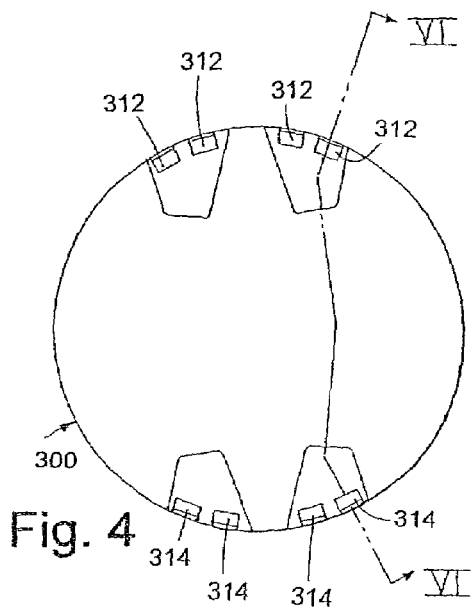
FIG. 4 is a bottom plan view illustrating the microphone assembly according to FIG. 2.

The rearview mirror assembly 101 is enlarged in FIG. 2. The mirror assembly 101 includes an elongated housing 206 pivotably carried on mirror support 104. The mirror 202 may be any conventional interior rearview mirror, such as a prismatic mirror of the type used with a mirror housing manually adjustable for daytime and nighttime operation, or a multiple element mirror effecting automatic reflectivity adjustment, such as an electrooptic or electrochromic mirror. The elongated housing 206 may be of any conventional manufacture such as integrally molded plastic.

The rearview mirror assembly 101 further includes a microphone assembly 208 that is preferably mounted to the housing 206 at a location visible to the vehicle driver 103 or at a position which is direct line of sight between the speaker's mouth and the microphone. It is advantageous for the microphone assembly 208 to be positioned on the mirror housing 206 as the mirror assembly is movably carried on the support 104. The driver 103 (FIG. 1) will typically adjust the position of the mirror 202 and housing 206 to reflect images visible through the rear window 109 of the vehicle 100. When making such an adjustment for viewing angle, the driver 103 adjusts the mirror 202 toward their eyes by moving housing 206, which will simultaneously direct the front of microphone assembly 208 toward the driver. However, the microphone assembly could be mounted in other vehicle accessories, such as a visor, an overhead console, a vehicle trim component such as a headliner or an A-pillar cover, a center console, or the like.

A first embodiment of the microphone assembly 208 will now be described in greater detail with respect to FIGS. 3–7. The microphone assembly includes a microphone housing 300, a transducer mount 302, a first transducer 304, a second transducer 306, and a circuit board 308. The microphone housing 300 (FIGS. 3 and 4) is generally cylindrical, having a round foot print and a low profile, although the housing could have a generally square foot print, an elongated elliptical or rectangular foot print, or any other shape desired by the microphone designer. The microphone housing 300 includes front ports 312 that face the driver 103 and rear ports 314 that face away from the driver 103. The ports 312 and 314 provide a sound passage through the microphone housing. The ports 312, 314 can have any suitable opening shape or size. The housing also includes posts 316, 317 used to hold the microphone assembly 208 together, as described in greater detail herein below. A rail 318 on the inside surface of housing 300 is shaped to receive a portion of mount 302. When received in the rail, mount 302 is positioned with the transducer 304 and 306 sound channels properly aligned with the ports 312, 314. The housing also includes mounting tabs 320 for insertion into openings (not shown) in the lower surface of housing 206. For example, the tabs can be generally L-shaped in profile for insertion into the housing 300. After tabs 320 are inserted into housing 206, the microphone housing 300 is locked to the mirror housing 206 by rotating the microphone to a locked position, thereby securing the microphone assembly 208 on the housing assembly 101. Alternately, the tabs 320 can be elongate snap connectors that slide into an opening (not shown) in the bottom surface of the mirror housing and snap into engagement with the inside surface of the mirror housing 206 after full insertion. The microphone housing 300 can be integrally molded plastic, stamped metal, or of any other suitable manufacture.

The transducer mount 302 is configured such that it is pressed into the housing 300 and is slightly compressed between circuit board 308 and housing 300. The transducer mount provides acoustic seals for the transducers 304 and 306, and with the circuit board 308 and housing 300, defines acoustic channels, or sound passages, to the front and rear faces of the transducers 304, 306, as described in greater detail below. The mount 302 includes webs 324 between walls 332 and webs 325 between walls 333 that extend outwardly from the core of mount 302 to provide sound passages, and also help to position mount 302 in the housing 300. Projections 326, 327 are located on opposite ends of mount 302 to help position mount 302 in housing 300. Openings 328, 329 are provided in the webbing 324, 325 of mount 302 for passage of posts 316, 317. Cylindrical wells 330, 331 are provided in the core of transducer mount 302 for receipt of transducers 304, 306, respectively. Each of the wells 330, 331 includes a terminating wall 501 (FIG. 5) against which the front faces 500 of the transducers 304, 306 sit. The terminating walls 501 each include a channel 506, 508 that extends radially outward from the center of the well, which is the location of the front transducer aperture. The mount 302 can be of any suitable manufacture, such as a molded elastomer. In particular the mount 302 is resilient and non-conductive, and provides acoustic isolation. For example, the transducer mount 302 can be manufactured of urethane commercially available from Mobay.

The transducers 304 and 306 are preferably substantially identical. The transducers include a front aperture 502 which passes sound to the front surface of a transducer diaphragm and openings 337 (FIG. 3) in the back face that port sound to the back surface of the transducer diaphragm. The transducers include electrical leads 336 on the back face thereof for electrical connection to the conductive layer of circuit board 208. The transducers 304 and 306 can be any suitable, conventional transducers, such as electret, piezoelectric, or condenser transducers. The transducers may be, for example, electret transducers such as those commercially available from Matsushita of America (doing business as Panasonic), and may advantageously be unidirectional transducers. If electret transducers are employed, the transducers can be suitably conditioned to better maintain transducer performance over the life of the microphone assembly 208. For example, the diaphragms of the transducers 304, 306 can be baked prior to assembly into the transducers.

The circuit board 308 has a conductive layer, on surface 334, etched and electrically connected to the transducer leads 336 of transducers 304, 306. The microphone leads 340 are connected to the transducer leads 336 by a circuit 800 (FIG. 8) mounted to the conductive layer of circuit board 308. Although circuit 800 can be mounted on the circuit board 308 in the microphone housing, it will be recognized that the circuit 800 can alternatively be mounted on a printed circuit board in the mirror housing 206, and further that in the case of an electrooptic mirror, such as an electrochromic mirror, the circuit 800 can be mounted on a common circuit board with the mirror electrical components, or the circuit 800 and the mirror electrical components can be mounted on separate circuit boards within the housing 206. The electrical connection of the microphone leads 340, the transducer leads 336, and the components of circuit 800, are preferably by electrical traces in the conductive layer of the circuit board, formed by conventional means such as etching, and vias extending through the dielectric substrate of the printed circuit board. The circuit board includes holes 350 and 352 for receipt of posts 316 and 317 on microphone housing 300. The posts 316, 317 are heat staked to the circuit board substrate after the posts are inserted through holes 350 and 352 to secure the connection of the circuit board to the housing 300 and insure that the microphone assembly provides acoustically isolated sound channels between the transducers 304, 306 and the ports 312, 314, as described in greater detail herein below.

To assemble the microphone assembly 208, the transducers 306 and 308 are mounted on the circuit board 308 by conventional means, such as by soldering transducer leads 336 to the conductive layer 334 of circuit board 308. It is envisioned that the transducer leads can alternatively be elongated posts that extend through vias in the printed circuit board, that the surface 360 can be a conductive layer, and that the components of circuit 800 can be located on surface 360 of the printed circuit board, connected between the transducer leads 336 and the microphone leads 340. Regardless of how the transducers 304 and 306 are mounted on the circuit board 308, the circuit board mounted transducers are pressed into the cylindrical wells 330, 331 in the mount 302. When fully inserted in the wells, the front faces 500 (FIG. 5) of the transducers 304, 306, are positioned against the terminating wall 501 of the wells 330, 331. The wall 501 of each of the wells 330, 331 includes a channel 506, 508 aligned with the openings 502 in the front face of the transducers 304, 306.

Figure 6:
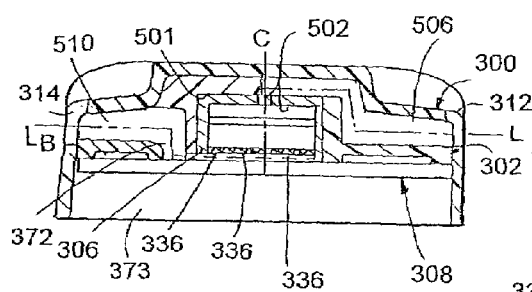
FIG. 6 is cross-sectional view taken along plane 6—6 in FIG. 4 illustrating the microphone assembly according to FIG. 3.
Figure 7:
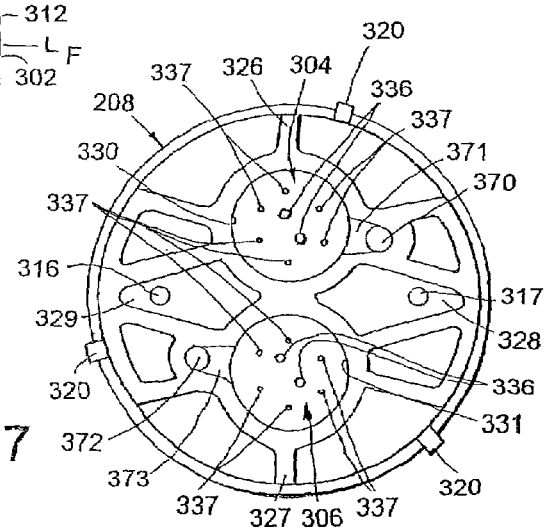
FIG. 7 is a top plan view illustrating the microphone assembly according to FIG. 5 with the circuit board removed to view show the transducers in transducer mount.

The partial assembly comprising mount 302, transducers 304, 306 and circuit board 308, is pressed into the housing 300. FIG. 7 illustrates the microphone assembly 208 with the printed circuit board 308 removed. The back surfaces of the transducers 304, 306, having multiple openings 337 and transducer leads 336, are visible from the open end of the cylindrical wells 330, 331. When the transducers 304, 306 are fully inserted in the well, such that the front face 500 of the transducers are juxtaposed with the wall 501 terminating the well, a chamber is formed between the back surface of each of the transducers 304, 306 and the circuit board 308, as best shown in FIG. 6. A wall of the mount circumscribes the periphery of the transducer 306, 307, and a short channel 371, 373 extends from the well 330, 331 to the aperture 370, 372. The circumscribing wall provides an acoustic seal with the circuit board 308. Apertures 370, 372 connect the chamber, between each of the transducers 304, 306 and the circuit board 308, with the channels 510, 512, respectively.

The chamber behind each of the transducers provides a sound passage from the back openings 337 of the transducers through channels 371, 373, 510, and 512 and ports 312, 314. When the mount 302 is fully inserted in the housing 300, the sound passages extending from the front face of each of the transducers to ports 312 and 314 are defined by the housing 300 and the mount 302. The sound passages extending from the back face of each of the transducers to ports 312 and 314 are defined by the housing 300, mount 302 and circuit board 308.

Figure 5:
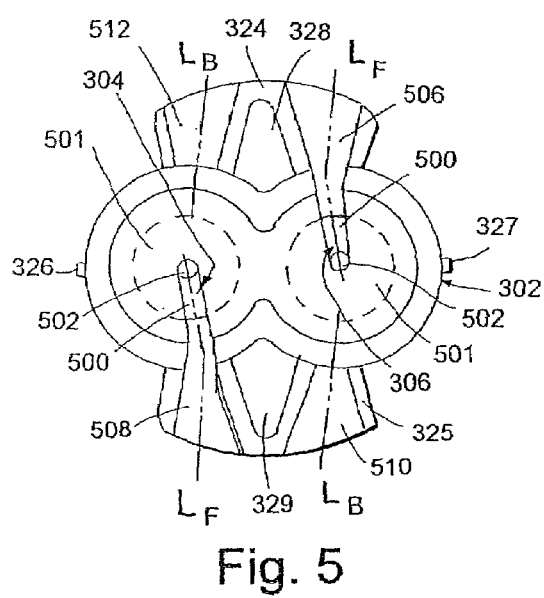
FIG. 5 is a bottom plan view illustrating a transducer mount in the microphone assembly according to FIG. 3.

In particular the front opening 502 of transducer 306 is connected to the front ports 312 of the microphone housing 300 via the sound passage 506 as best shown in FIG. 6. The rear face openings 337 of the transducer 306 is acoustically coupled to the rear ports 314 via sound channel 373, aperture 372 and channel 510. Transducer 304 is coupled to the front ports 312 and the rear ports 314 in the same manner, but in the opposite phase. In particular, the front face of transducer 304 is acoustically coupled to the rear ports 314 via acoustic channel 508 (FIG. 5). The rear face openings 337 of the transducer 304 are acoustically coupled to the front ports 312 via channel 371, aperture 370, and channel 512. Signals originating from the front of the microphone assembly, which is the surface of the microphone assembly facing the driver, enter the front of transducer 306 and the back of transducer 304, whereas sound originating from the rear of the microphone assembly enter the front face of transducer 304 and the back face of transducer 306. Omni-directional sounds will be detected equally by the transducers, at opposite phases.

As illustrated in FIG. 6, the center axes C of the transducers 304, 306 are oriented at an angle of 90 degrees with respect to the longitudinal axes $L_B$ and $L_F$ of the channels 506, 508, 510, 512. Thus, the acoustic outputs from the two transducers lie on a common axis facing in opposite directions and perpendicular to the center axis C of the transducers.

The transducers 304 and 306 are electrically coupled to an operational amplifier 802 (FIG. 8) of circuit 800. In particular, transducer 306 is coupled to the inverting input of the operational amplifier 802 and transducer 304 is coupled to the non-inverting input of the operational amplifier. Resistor R8, connected between the transducer 306 and the inverting input of the operational amplifier 802, is preferably a potentiometer to permit manual balancing of the transducers. Alternatively, the resistor R12 connected between transducer 304 and the non-inverting input of the operational amplifier, or both resistors R10 and R12, can be implemented by potentiometers. It is also envisioned that a variable gain amplifier with an associated manually adjustable potentiometer can be inserted in one or both of the paths between transducers 304, 306 and operational amplifier 802. The operational amplifier may be implemented using any suitable operational amplifier, such as the TLC271 operational amplifier available from Texas Instruments. The manually adjustable potentiometer R8 is provided for varying the gain of the transducer path to permit adjustment of the signal level from transducer 306 such that both transducer 304, 306 paths produce the same signal gain (i.e., the signal gain through both transducers is equal). By providing identical gain through both transducers, omni-directional noise detected by both transducers will be completely cancelled at the output of the operational amplifier 802. Acoustic signals generated by the vehicle driver, such as the driver's speech, will be input to the front of transducer 306 and the back of transducer 304, such that the speech will be present in the audio signal at the output of operational amplifier 302. Sound from the sides of the microphone assembly will be cancelled by the transducers 304, 306 and the operational amplifier 802. The most intense noise in a vehicle tends to originate from the sides and/or of the vehicle. The microphone assembly 208 mounted on the rearview mirror 206, including amplifier 802, will significantly reduce noise as the bi-directional microphone assembly is not responsive to noise originating from the sides of the vehicle when mounted in the mirror assembly 101 which is generally aligned with the longitudinal axis of the vehicle. Furthermore, mechanical noise, such as that originating in the rearview mirror assembly 101, will be detected by both transducers 304, 306 equally, and thus will be cancelled out by the operational amplifier 802.

The output of the operational amplifier 802 is input to a 3-pole high pass filter and unity gain follower 804, having a cut-off at approximately 100-300 Hz, and preferably at 150 Hz. The filter removes noise below the voice frequency. Terminals 340 are coupled to the vehicle's electrical circuitry, which may for example include voice recognition circuitry, a cellular transceiver, a two-way radio, or any other control circuitry. The transistors Q1 and Q2 can be implemented using any suitable commercially available transistor elements, such as FFB2227 commercially available from Fairchild Semiconductor.

In summary, the bi-directional microphone assembly 208 is very responsive to voice signals from the driver 103 located in front of the mirror assembly 101, as signals from the front of the mirror will sum in operational amplifier 802. As a consequence, on-axis sound will experience a gain and the microphone assembly will have a high signal-to-noise ratio. It is envisioned that a gain of approximately 6 dB can be achieved by bi-directional microphone assembly 208. The microphone is highly directional, such that off-axis sound is attenuated, and even nulled, by the microphone. Further, the bi-directional microphone assembly 208 can employ any type of directional transducer, so long as identical transducers are employed.

Figure 11:
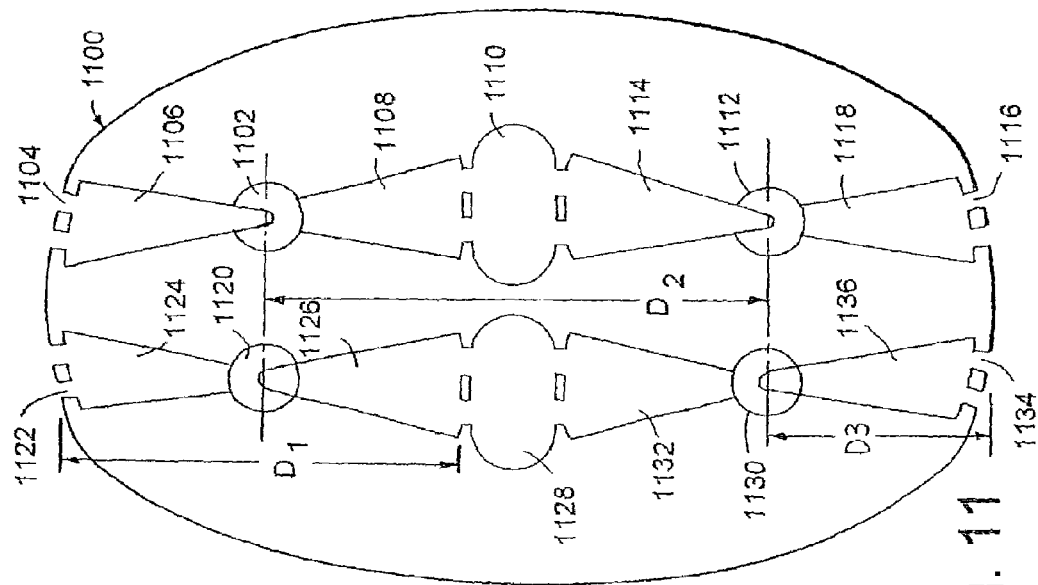
FIG. 11 is a top plan view schematic representation illustrating the sound channel for another alternate transducer arrangement for the microphone assembly.
Figure 10:
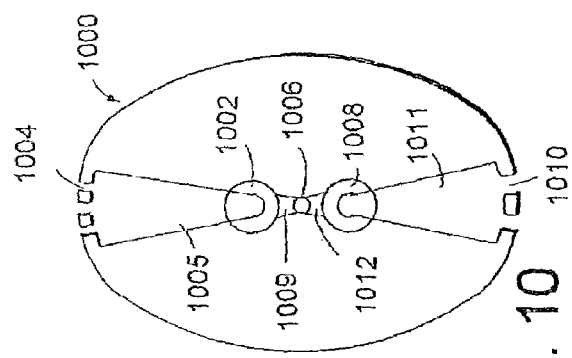
FIG. 10 is a top plan view schematic representation illustrating the sound channel for an alternate transducer arrangement for the microphone assembly.
Figure 9:
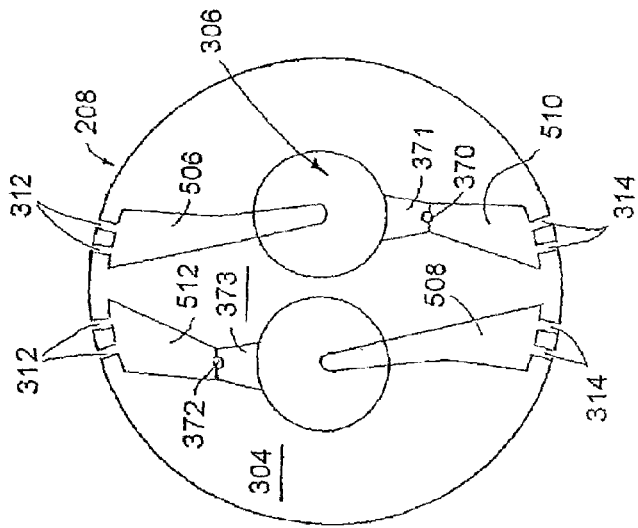
FIG. 9 is a top plan view schematic representation illustrating the sound channel for the transducers of the microphone assembly according to FIGS. 1–7.

The bi-directional microphone assembly 208 is schematically illustrated in FIG. 9, and alternate embodiments are schematically illustrated in FIGS. 10 and 11. As described above, the bi-directional microphone assembly 208 includes transducer 306, having its front face opening ported to the front ports 312 through channel 506 and its back face openings ported to the back ports 314 through channels 370, 371 and 510, and transducer 304, having its front face ported to the rear ports 314 through channel 508 and its rear face ported to the front port 312 through channels 372, 373 and 512. The bi-directional microphone assembly 208 thus has transducers mounted on the same lateral axis, but at opposite phases. An alternative to the bi-directional microphone assembly 208, is the hyper cardioid microphone assembly 1000 illustrated in FIG. 10. The hyper cardioid microphone assembly 1000 includes a front transducer 1002 having its front face acoustically coupled to port 1004 through channel 1005 and its back face acoustically coupled to port 1006 through channel 1009. The front face of a rear transducer 1008 is acoustically coupled to ports 1010 through channel 1011 and the rear face of transducer 1008 is acoustically coupled to port 1006 through channel 1012. The transducers are electrically coupled to an operational amplifier in the same manner that the transducers 304 and 306 are electrically coupled to operational amplifier 802. However, unlike bi-directional microphone assembly 208, for which identical transducers are selected, the transducers 1002 and 1008, and the variable gain balance circuit 802, are selected and operated such that the front transducer 1002 produces a greater sensitivity than the back transducer 1008 while maintaining a null of the vibration created signals.

The microphone assembly 1000 may be advantageous in applications wherein the noise incident on the microphone assembly is generally random and omni directional, or in an environment where the front lobe of the microphone needs to be larger to accommodate off-axis noise sources. Microphone assembly 1000 will be better suited for use in vehicles where the person speaking, such as the driver, is not positioned in front of the rearview mirror assembly, because the bi-directional microphone 208 may attenuate the speech from the person speaking. As noted above, the most intense noise in a vehicle originates from the side of the vehicle, which the bi-directional microphone assembly 208 mounted to the mirror assembly 101 will better reject than the hyper cardioid microphone assembly 1000. Another problematic environmental condition better resolved by the bi-directional microphone assembly 208 than the hyper cardioid microphone assembly 1000, is small room reverberation effect. Reverberation causes noise, with a wavelength long relative to room dimensions, such that it is omni-directional. Microphone assembly 208, having two identical transducers will effectively null omni-directional components, such that all the reverberating noise will be cancelled. The hyper cardioid microphone assembly 1000 will not completely cancel such reverberation noise, due to the differential on-axis sensitivity for the front and rear transducers 1002, 1008.

Whereas bi-directional microphone assembly 208 requires matched transducers such that the noise is cancelled, the hyper cardioid requires transducers producing different on-axis sensitivity. In particular, the transducer sensitivity differential for transducers 1002 and 1008 needs to be 5 to 15 dB, and may for example be 10 dB. The transducer control and damping values, which should be considered for the hyper cardioid microphone assembly 1000, will not be important for the bi-directional polar microphone assembly 208 so long as the transducers are the same. So long as identical transducers are provided, the out of phase and the omni-directional contents, such as mechanical vibration, reverberations, sound having a frequency such that it is non-directional, will null, in microphone assembly 208. The hyper cardioid microphone assembly 1000 requires two different sensitivities from the front and back transducers 1002 and 1008. The transducers must be carefully selected to have the desired sensitivity differential. Microphone assembly 1000 preferably uses higher quality transducers for the front and back transducers 1002, 1008, so that the desired performance can be achieved and sustained, than need be used for the bi-directional microphone assembly 208.

A second order microphone assembly 1100 according to another alternate embodiment is disclosed in FIG. 11. The microphone assembly 1100 includes transducers 1102 and 1112. The front face of transducer 1102 is coupled to a port 1104 through an acoustic channel 1106. The rear face of transducer 1102 is acoustically coupled to port 1110 through channel 1108. The front face of rear transducer 1112 is coupled to port 1110 through channel 1114. The rear face of transducer 1112 is coupled to port 1116 through channel 1118.

The transducers 1102 and 1112 are electrically coupled to a circuit 1200 (FIG. 12). The sound from the front transducer 1102 is input to the non-inverting input of an operational amplifier 802. The signal from transducer 1112 is input to a time delay 1202 prior to being input to the amplifier 802. The time delay circuit 1202 introduces a time delay equal to the time period required for sound to travel distance D2, which is the distance from the center of the front transducer 1102 to the center of the rear transducer 1112. The delayed signal is input to the inverting input of the operational amplifier 802 through potentiometer R8.

In operation, the signals originating from the front of the microphone assembly 1100 will reach the rear transducer 1112 a short time period after reaching the front transducer 1102. This time delay is equal to the time required for sound to travel from the center of the front transducer 1102 to the center of the rear transducer 1112. Since the signal entering the rear transducer is electronically delayed in time delay circuit 1202 by an amount equal to the time period required for sound to travel distance D2, the rear signal will arrive at the inverting input of the operational amplifier 802 delayed by a time period equal to twice the time required for sound to travel distance D2. Sound originating from the rear, however will reach front transducer 1102 delayed by a time period equal to the time required for sound to travel distance D2. Because the signal from the rear transducer 1112 signal is delayed electronically, in delay 1202, by a time period equal to the time required for sound to travel distance D2, the signal originating from the back sensed by both transducers 1102 and 1112 will be input to both the non-inverting and inverting inputs of the operational amplifier 802 at the same time, such that they are cancelled by the amplifier 802. Accordingly, a null is provided for signals originating from the rear of the microphone assembly. It will be recognized that the greater distances D1 and D2 for the second order microphone assembly 1100, the greater the sensitivity of the microphone assembly. Additionally, for every distance D2, there is a crossover frequency above which the difference in phase no longer adds to the output, such that the highest upper frequency desired sets the maximum distance D2. Above the crossover frequency, the microphone will lose its directional properties and suffer frequency response anomalies. It is envisioned that the maximum distance D2 for the second order microphone assembly 1100 will be between 0.75 and 1.4 inches, and may be for example be approximately 1 inch.

One issue with respect to this implementation, is the phase shift that will occur. In particular, the higher the frequency, the greater the phase shift that the signal will experience between the front transducer and the rear transducer. Low frequency signals will experience little phase shift, whereas high frequency signals will experience a large phase shift. Since acoustic sensitivity increases with additional phase shift, low frequency sensitivity will be very low. However, because the signals of interest are voice signals, which are relatively high frequency signals, the signals of interest will not be significantly affected by this phase shift. Additionally, it is envisioned that equalization techniques can be used to compensate for the phase shift and low frequency roll-off in bass sensitivity of the microphone 1100. The front and back transducers 1102 and 1112 achieve a second order directional function by their spacing. Additionally, the two transducers face the same direction, such that the front face of both the front and rear transducers port forwardly and the back of both the front and rear transducers port rearwardly. The transducers 1102 and 1112 are spaced by a distance D2, which is a dimension close to D1 of the front transducer 1102, and may also be a dimension close to the D3 for the rear transducer 1112. The greatest output from the microphone will occur responsive to on-axis sound in front of the microphone assembly 1100, where the arrival delay is doubled as is the signal strength.

The vibration null and additional acoustic advantages of microphone 208 can be gained for the microphone assemblies 1000 and 1100 by using four transducers, as illustrated in FIG. 11 for microphone assembly 1100. In particular, optional transducers 1120 and 1130 are provided in addition to transducers 1102 and 1112. The rear face of transducer 1120 is coupled to the front port 1122 via channel 1124 and the front face of transducer 1120 is coupled to port 1128 via channel 1126. The front face of rear transducer 1130 is coupled to rear port 1134 via channel 1136 and the back of transducer 1130 is coupled to port 1128 via channel 1132. The front transducers 1102 and 1120 are connected to opposite inputs of the operational amplifier without delay so as to cancel omni-directional noise. The rear transducers 1112 and 1130 are similarly connected to opposite inputs of the operational amplifier, after being delayed by the time period required for sound to travel distance D2, so as to cancel omni-directional noise. Using two pairs of transducers, each pair will achieve a bi-directional pattern and be devoid of vibration noise. In particular, nulls will occur at 90, 180, 270 degrees. The one main lobe of the microphone assembly 1100 is narrow and forwardly directed, being narrower than the bi-directional microphone assembly 208 forward lobe, and having better off-axis noise cancellation.

An automatic balancing circuit 1300 (FIG. 13) can be used in place of, or in addition to, the manual balancing potentiometer R8. Automatic balancing circuit includes a controller 1302 coupled to receive the output of transducer 304 and variable gain amplifier 1304. The controller generates a gain control signal applied to a variable gain amplifier 1304.

Figure 14:
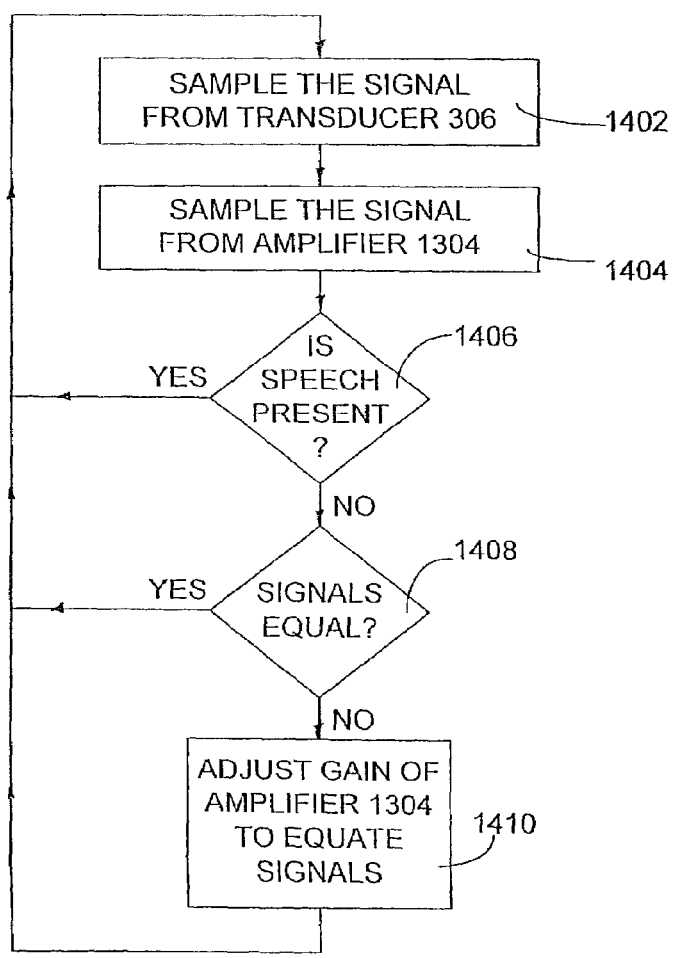
FIG. 14 is a flow chart representing operation of the controller of FIG. 12.

In operation, the controller monitors the signal levels output by the transducer 304 and the variable gain amplifier 1304, as indicated in blocks 1402 and 1404 of FIG. 14. The controller monitors for the presence of speech in step 1406. If speech is present, the controller does not adjust the gain of the variable gain amplifier 1304. If speech is not present, the controller determines whether the output of the variable gain amplifier 1304 is equal to the output of transducer 304, in step 1408. If it is not equal, the gain of variable gain amplifier 1304 is adjusted in proportion to the difference between the signal level at the output of transducer 304 and the signal level at the output of amplifier 1304, as indicated in step 1410. The output of the variable gain control will thus be equal to the signal level at the output of transducer 306, thereby providing noise cancellation. Variation in the relative performance of the transducers 304, 306 over time or temperature can thus be compensated automatically by the automatic gain control circuit 1300.

Figure 15:
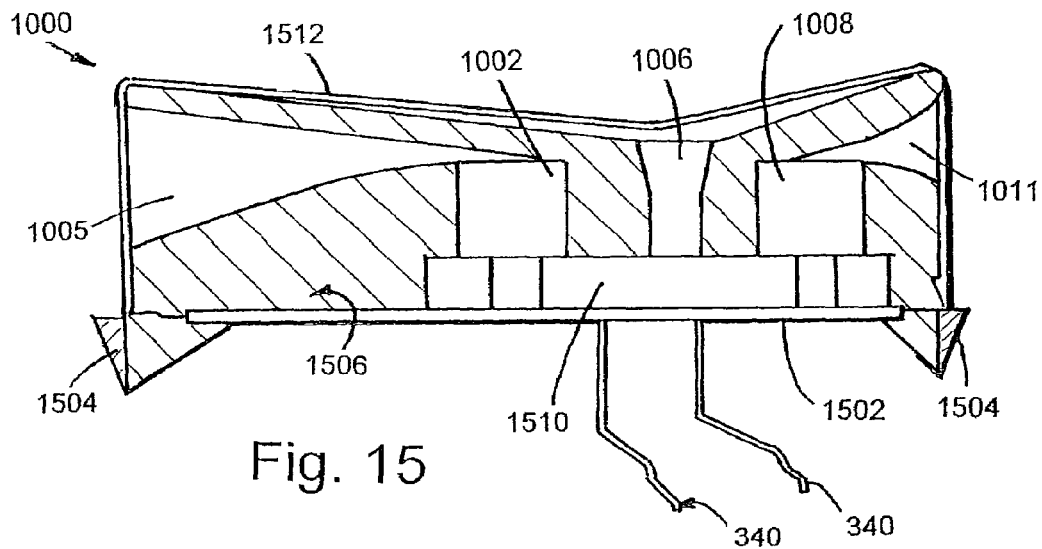
FIG. 15 is a cross-sectional view of the microphone according to FIG. 10 taken along the longitudinal axis of the microphone.

The microphone assemblies 1000 and 1100 can be manufactured in the same manner as the microphone assembly 208, but with different spatial relations for the transducers. For example, whereas the transducers 304 and 306 of microphone assembly 208 are positioned laterally an equal distance from the front and back ports 312, 314, the transducers 1002 and 1008 are positioned one behind the other between the front and back ports 1004, 1010, and may for example be positioned along the longitudinal axis of the microphone assembly 1000, through which the cross section of FIG. 15 is taken. In particular, the microphone assembly 1000 includes an elastomeric transducer mount 1506 into which transducers 1002, 1008 are mounted. The front of transducer 1002 ports through channel 1005 and the rear of transducer 1008 ports through chamber 1510 and channel 1006. The front face of rear transducer 1008 ports through channel 1011 and the rear surface ports through chamber 1510 and channel 1006. A substantially rigid microphone housing 1512 encloses the transducer mount 1506, and includes mechanical connectors 1504 for connection to the mirror housing 206, as well as bottom, front and rear ports for sound to enter the microphone for passage to the transducers. The connectors 1504 can be snap connectors or connectors that rotate into engagement with the mirror housing in the same manner as connectors 320. The transducer mount 1506 provides acoustic seal with the transducers 1002, 1008, and the circuit board 1502.

Figure 17:
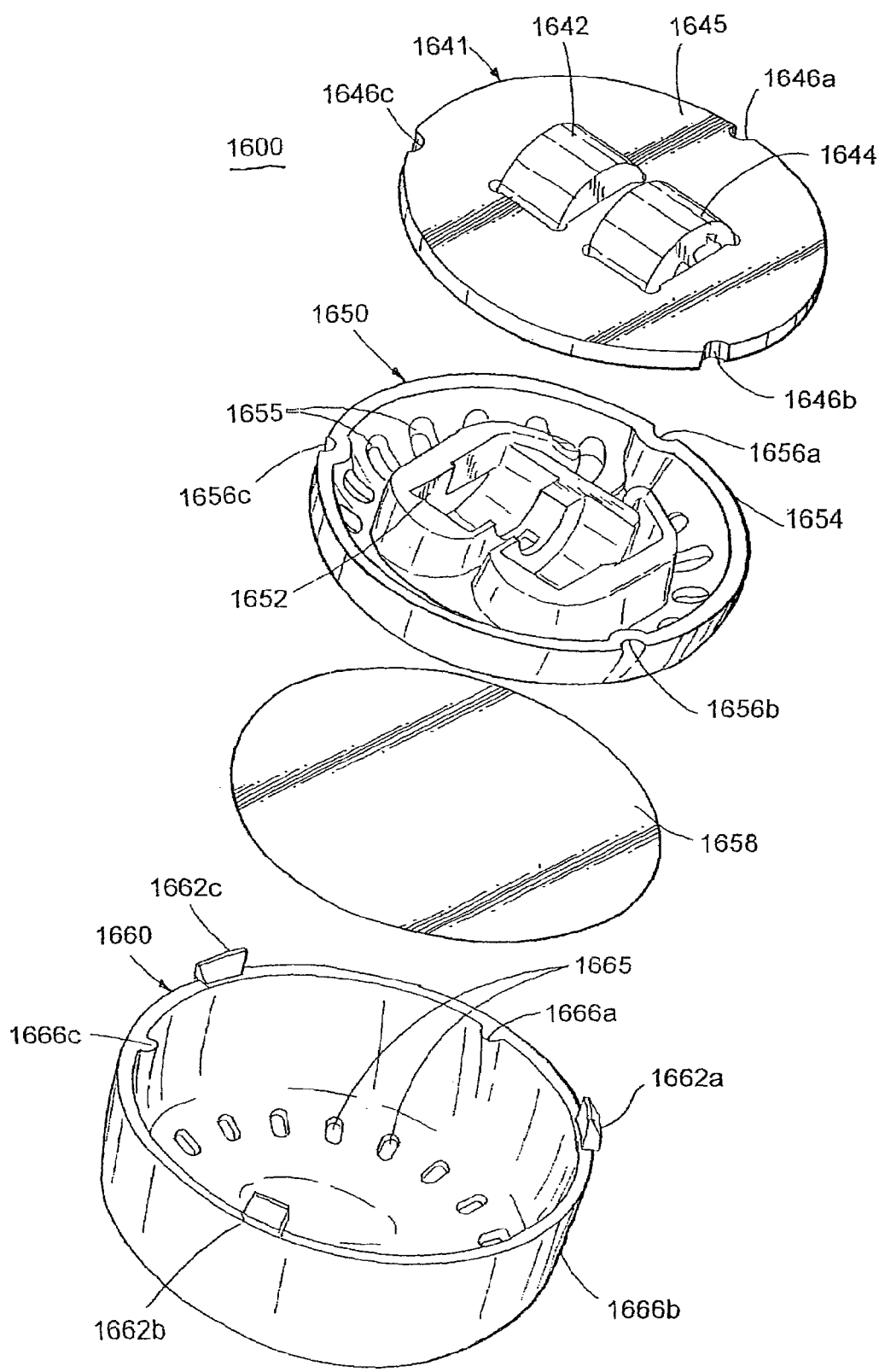
FIG. 17 is an exploded perspective view of a microphone assembly shown in FIG. 16.

FIGS. 16 and 17 show an alternative structure for microphone subassembly 1600. Microphone subassembly 1600, as illustrated, includes an electronic portion 1641 which includes a first microphone transducer 142 and a second microphone transducer 1644 mounted to a printed circuit board 1645.

Microphone transducers 1642 and 1644 are preferably mounted facing one another or facing away from one another with their central axes aligned coaxially. By mounting microphones 1642 and 1644 to face opposite directions, the sensed pressure waves caused by the vibrations are sensed 180 degrees out of phase from one another. By mounting the microphone subassembly to the vehicle such that the common central axis of the transducers is generally aligned with the driver's mouth, the assembly effectively cancels the noise produced by mechanical vibrations of windshield 20 and the rearview mirror assembly of the vehicle while increasing the gain of the driver's speech. A microphone processor circuit adds the outputs from the two transducers to one another thereby nulling any vibration-induced noise.

As shown in FIG. 17, transducers 1642 and 1644 may be mounted on their sides and the subassembly may include acoustic ports that are 90 degrees relative to the mechanical axes of the transducers. This allows both of the natural transducer front ports to face the redirected front port of the assembly.

According to another embodiment, the inventive microphone assembly utilizes two microphone transducers facing in opposite directions. The output of the rear facing transducer preferentially receives noise signals while the output of the forward facing transducer preferentially receives voice signals. Via appropriate electronic processing the presence of significant voice signals can be determined. During periods when there are no significant voice signals, output can be reduced with no harm to voice quality.

If this processing is done on a frequency band basis, noise dominated bands can be removed with no harm to voice quality since those bands containing significant voice signals will be passed into the output with no alteration.

Microphone transducers 1642 and 1644 are mounted sideways through holes formed in printed circuit board 1645. Portions of transducers 1642 and 1644 extend below the bottom surface of circuit board 1645 and portions also extend above a top surface of printed circuit board 1645. Mounting the transducers in this orientation and position relative to the circuit board provides several advantages. First, the electrical contacts on the transducers may be directly soldered to traces on the printed circuit board. This avoids the need for manually connecting wires to the transducer contacts and subsequently manually connecting those wires to the circuit board. Thus, the transducers may be mounted to the circuit board using conventional circuit board populating devices.

Another advantage of mounting the transducers such that they extend above and below the surfaces of the printed circuit board is that one side of the circuit board may include a conductive layer serving as a ground plane. Such a ground plane may shield the transducers from electromagnetic interference (EMI) that may be produced by other components within the rearview mirror assembly or in other components within the vehicle. Such EMI can introduce significant noise into the signal delivered by the transducers.

As shown in FIGS. 16 and 17, microphone subassembly 1600 further includes an acoustic cup 1650 having a pair of central recesses 1652 and 1654 arranged to accept the portions of microphones 1642 and 1644, respectively, that extend below the bottom surface of printed circuit board 1645. Microphone subassembly 1600 further includes a plurality of ports 1655 disposed about the peripheral bottom portion of acoustic cup 1650.

Microphone subassembly 1640 further includes a cloth 1658, which serves as a windscreen and protects the microphones from the external environment. Cloth 1658 is preferably made of a hydrophobic material and is secured to cup 1650 across ports 1665 to keep water from reaching microphones 1642 and 1644.

Microphone subassembly 1600 also includes the outer microphone housing 1660 formed in the shape of a cup with a plurality of acoustic ports 1665 disposed about the bottom and sides of the housing. Ports 1665 are preferably aligned with ports 1655 of acoustic cup 1650. Housing 1660 preferably includes one or more posts 1666a–1666c that aligns and mates with grooves 1656a–1656c in acoustic cup 1650 and grooves 1646a–1646c of printed circuit board 1645. The posts and grooves serve to align ports 1655 and 1665 while also ensuring that the microphone transducers cannot rotate or change orientation within housing 1660. Housing 1660 further includes a plurality of tabs 1662a–1662c that resiliently engage the peripheral edge of an aperture formed in housing 206 (FIG. 2). Housing 206 would preferably include corresponding slots for receiving resilient tabs 1662a–1662c to ensure that microphones 1642 and 1644 are optimally aligned relative to the vehicle.

Figure 18:
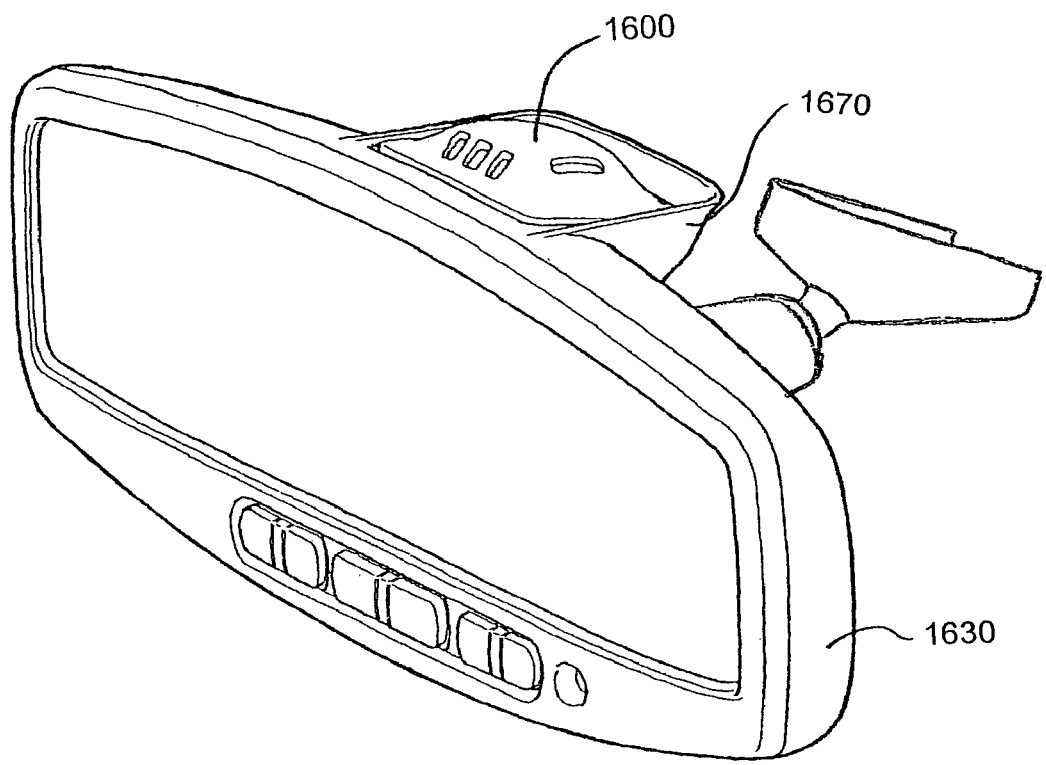
FIG. 18 is a front isometric view of an embodiment of a rearview mirror assembly constructed in accordance with another embodiment of the present invention.
Figure 19:
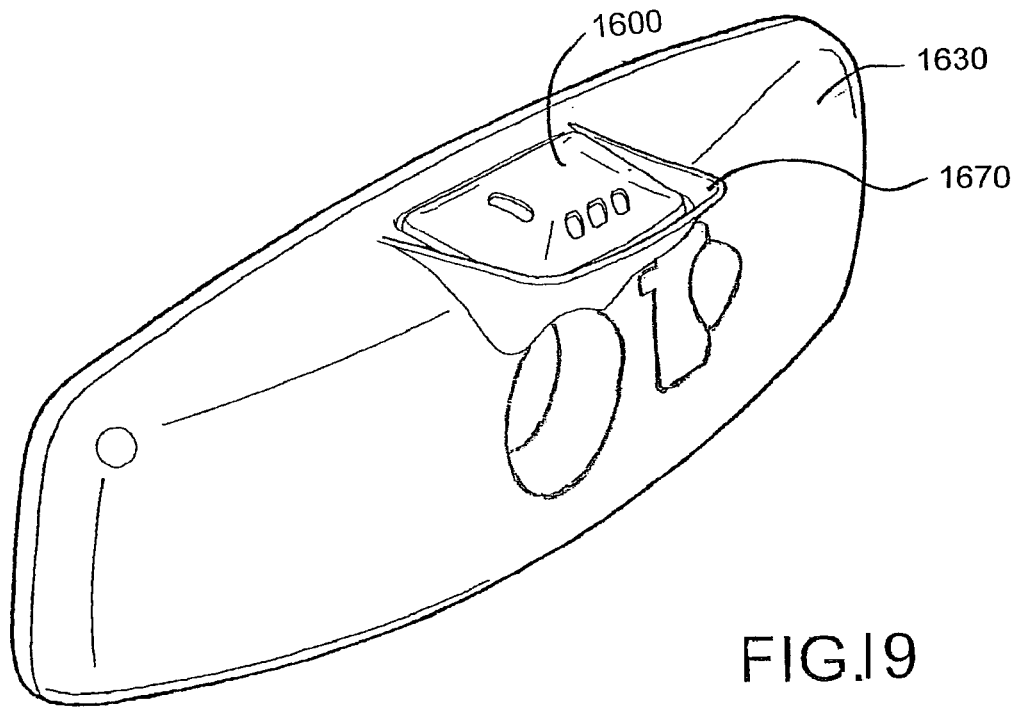
FIG. 19 is a rear isometric view of an embodiment of a rearview mirror assembly shown in FIG. 18.

While the microphone subassembly is shown in FIG. 2 as being mounted to the bottom of the mirror housing, it should be noted that the preferred location is actually on the top of the housing. An example of a rearview mirror assembly having a microphone subassembly 1600 mounted on the top of the housing is shown in FIGS. 18–20. Microphone subassemblies mounted on a housing receive not only direct sounds from the driver, but also sounds reflected off the windshield. When the microphone subassembly is mounted on the bottom of the housing, there is more of a time difference between the arrival of the direct sound and the reflected sound than when the microphone subassembly is mounted on the top of the housing. When the arrival times are far enough apart, the resulting combination produces a frequency response that has a series of frequencies with no output. The series, when plotted, resembles a comb, and hence is often referred to as the "comb effect."

Mounting the microphone subassembly on top of the housing avoids the comb effect in the desired pass band. As shown in the side view in FIG. 20, the distance between the windshield and the top of the housing is much smaller than that at the bottom of the mirror housing and thus the reflected sound adds correctly to the direct sound creating a louder, but otherwise unaffected, version of the direct sound. The end result being a higher signal-to-noise ratio and better tonal quality. These are very important attributes in hands-free telephony and vocal recognition in an automotive environment.

A problem with mounting the microphone subassembly to the top of the housing results from the fact that the microphone assembly is closer to the windshield. When the windshield defroster is activated, a sheet of air travels upward along the windshield. Thus, when the microphone subassembly is placed on top of the housing, it is exposed to more airflow as the air from the defroster passes between the housing and the window past the microphone subassembly. This airflow creates turbulence as it passes over the microphone subassembly, which creates a significant amount of white noise. To solve this problem, a deflector 1670 extends upward from the rear of housing 1630 so as to smoothly deflect the airflow from the defroster over and/or beside microphone subassembly 1600 so that it does not impact the transducers or create any turbulence as it passes over and around the microphone subassembly. Because the airflow primarily would enter the rear of the microphone subassembly, the deflector may be designed to redirect the air with minimal impact on the frequency response of the microphone subassembly. This is important for high intelligibility in the motor vehicle environment. With no direct air impact and the avoidance of turbulence near the microphone subassembly, mounting the microphone subassembly on the top of the housing can offer superior resistance to airflow-generated noise.

As an additional measure, a signal may be transmitted over the vehicle bus or other discrete wire or wireless communication link, which indicates that the windshield defroster has been activated. This signal could be received and processed by the microphone processor and used to subtract an exemplary white noise waveform that corresponds to that detected when the windshield defroster is activated. Alternatively, when the system determines that the driver is speaking into the microphone and that the windshield defroster is activated, the system will temporarily turn down or turn off the defroster, or otherwise produce a synthesized speech signal advising the driver to turn down the defroster. The voice recognition circuitry within the mirror may also be utilized for purposes of recognizing noise generated by the defroster such that the system will be able to either advise the driver to turn the defroster down or off or to perform that task automatically.

In addition to recognizing the sound produced by the windshield defroster, the microphone may also be used to recognize the sources of various other sounds and hence subtract them from the sound received while the driver is speaking. For example, the microphone may be used to detect low pass response to determine whether the vehicle is moving. Additionally, the microphone may be used to recognize other events, such as a door closing or whether the air bags have been inflated. Upon detecting that the air bags have been inflated, the telematics rearview mirror assembly may be programmed to call 911 and to transmit the vehicle location in a distress signal.

Figure 21:
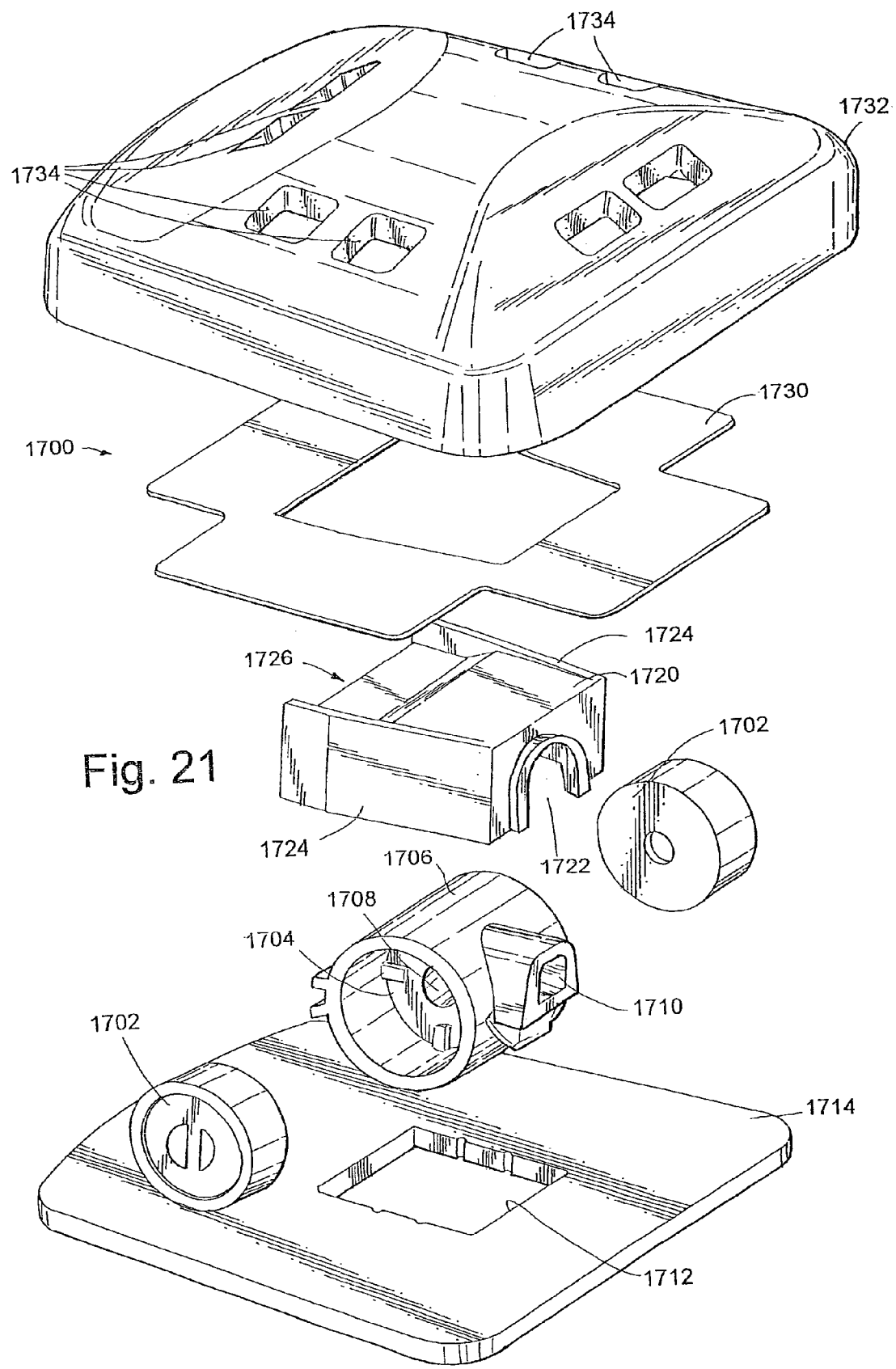
FIG. 21 is an exploded perspective view of a microphone assembly constructed in accordance with another embodiment of the present invention.

FIG. 21 shows an exploded view of a microphone assembly 1700 constructed in accordance with another embodiment of the present invention. Microphone assembly 1700 includes a pair of transducers 1702 disposed in apertures 1704 at opposite ends of a transducer boot 1706. Transducer boot 1706 includes an inner cavity 1708 by which the front surfaces of transducers 1702 are acoustically coupled and to a forward-facing port 1710 in boot 1706. Transducer boot 1706 is mounted in an aperture 1712 of a circuit board 1714. Thus, a portion of transducer boot 1706 extends below circuit board 1714 while the remaining portion is positioned above circuit board 1714 with port 1710 extending out and resting upon the upper surface of circuit board 1714.

Microphone assembly 1700 further includes a boot cover 1720. Boot cover 1720 includes a forward opening 1722 that extends over the protruding port 1710 of transducer boot 1706 so as to allow port 1710 to extend and open outside of boot cover 1720. Boot cover 1720 further includes a pair of tapered side walls 1724 that slope farther apart toward the rear of transducer boot 1720 where a rear opening 1726 is provided. In this manner, an acoustic port is provided at the rear of the microphone assembly, which is acoustically coupled via the tapered side walls 1724 to the rear surfaces of transducers 1702.

Microphone assembly 1700 further includes a windscreen 1730, which is preferably a hydrophobic and heat-sensitive adhesive-coated fabric. Windscreen 1730 is adhesively attached to the underside of a microphone assembly cover 1732 so as to extend across ports 1734 provided in cover 1732. Cover 1732 is preferably tightly bonded about circuit board 1714 to provide a water-impervious enclosure for transducers 1702.

Microphone cover 1732 is shown in FIG. 21 as having a generally square shape. It should be noted, however, that cover 1732 may be a rectangle or other shape and the size and shape of apertures 1734 may be changed so as to adjust the directionality of the microphone. Further, the acoustic resistivity of windscreen 1730 may be varied to also vary the directionality and polarity of the microphone assembly. Specifically, the acoustic resistivity of windscreen 1730 may be increased to at least about 1 acoustic $\Omega/cm^2$ and preferably has an acoustic resistivity of at least about 2 acoustic $\Omega/cm^2$.

Figure 22A:
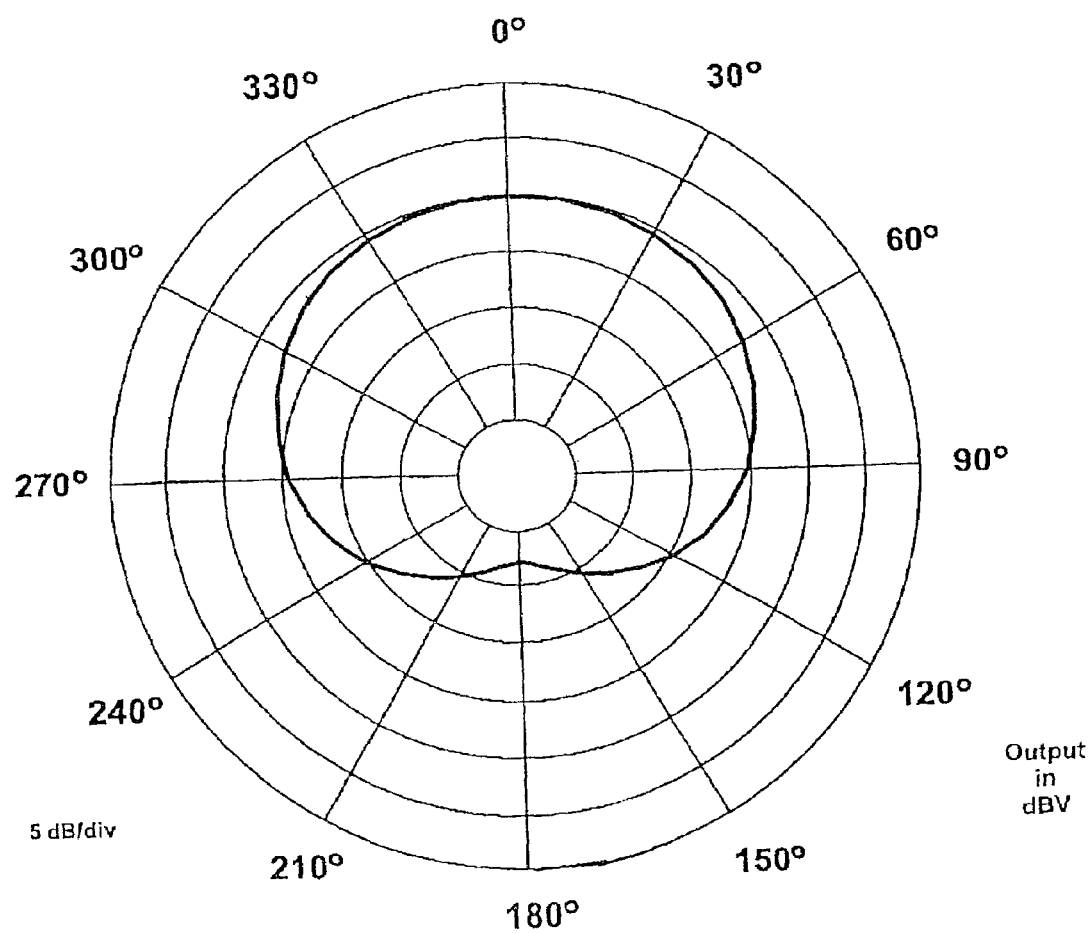
FIGS. 22A–22D are plots of polar patterns at different frequencies as obtained from a microphone assembly constructed in accordance with the present invention with a cover over the transducers.
Figure 22B:
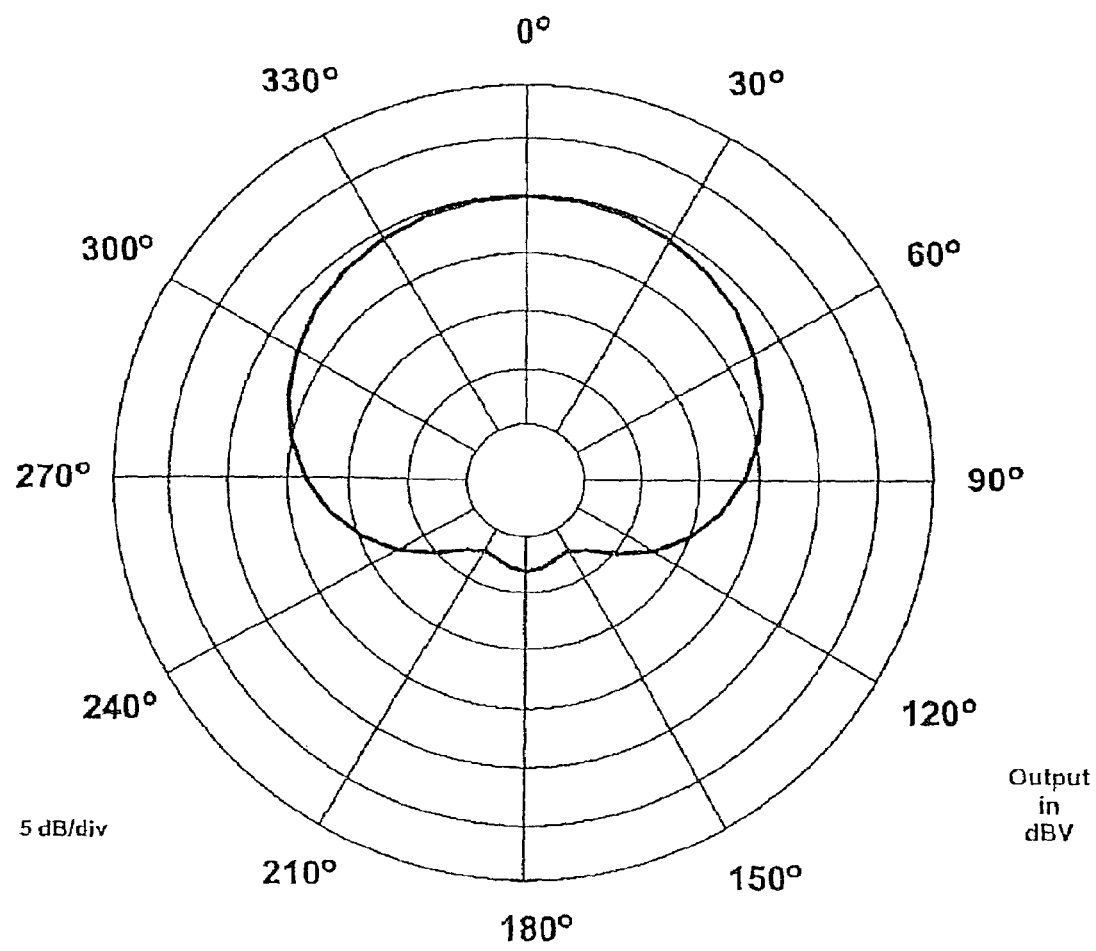
Figure 22C:
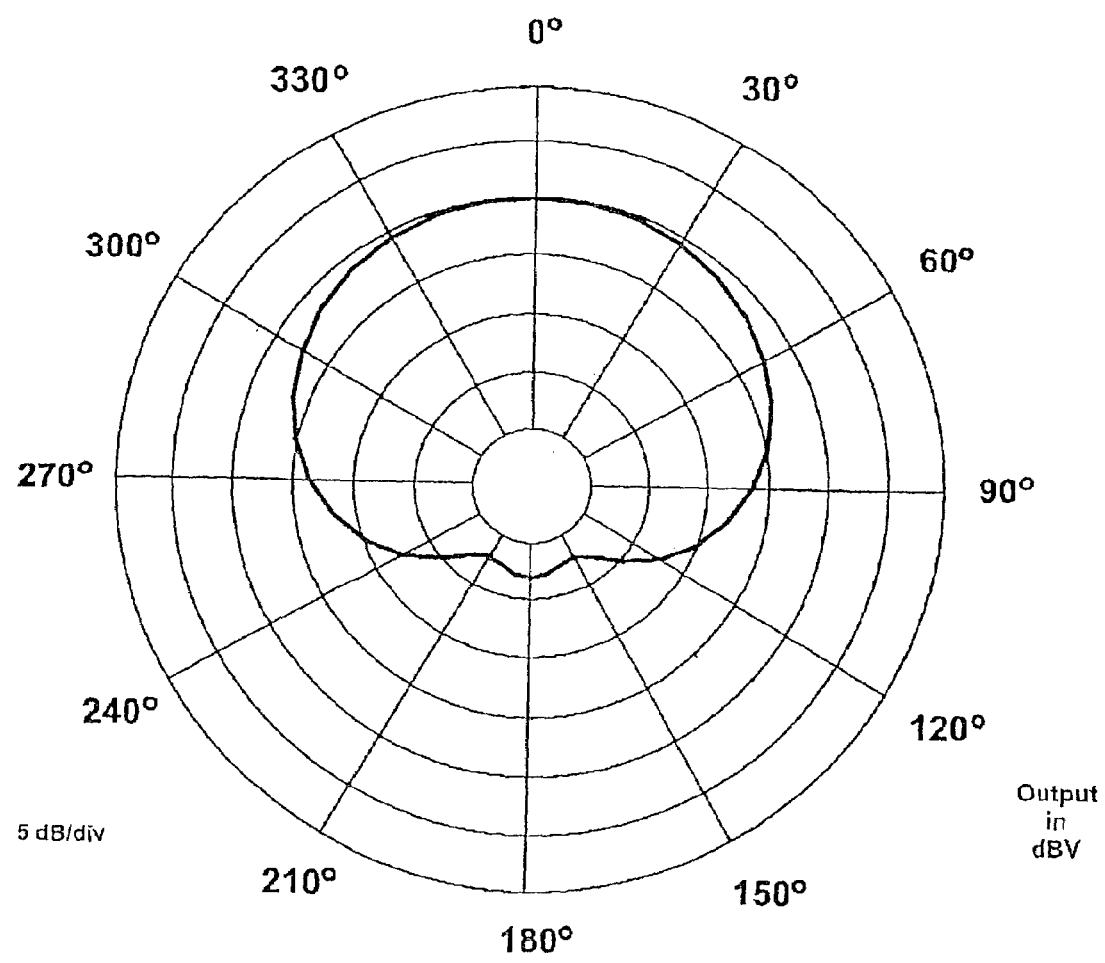
Figure 22D:
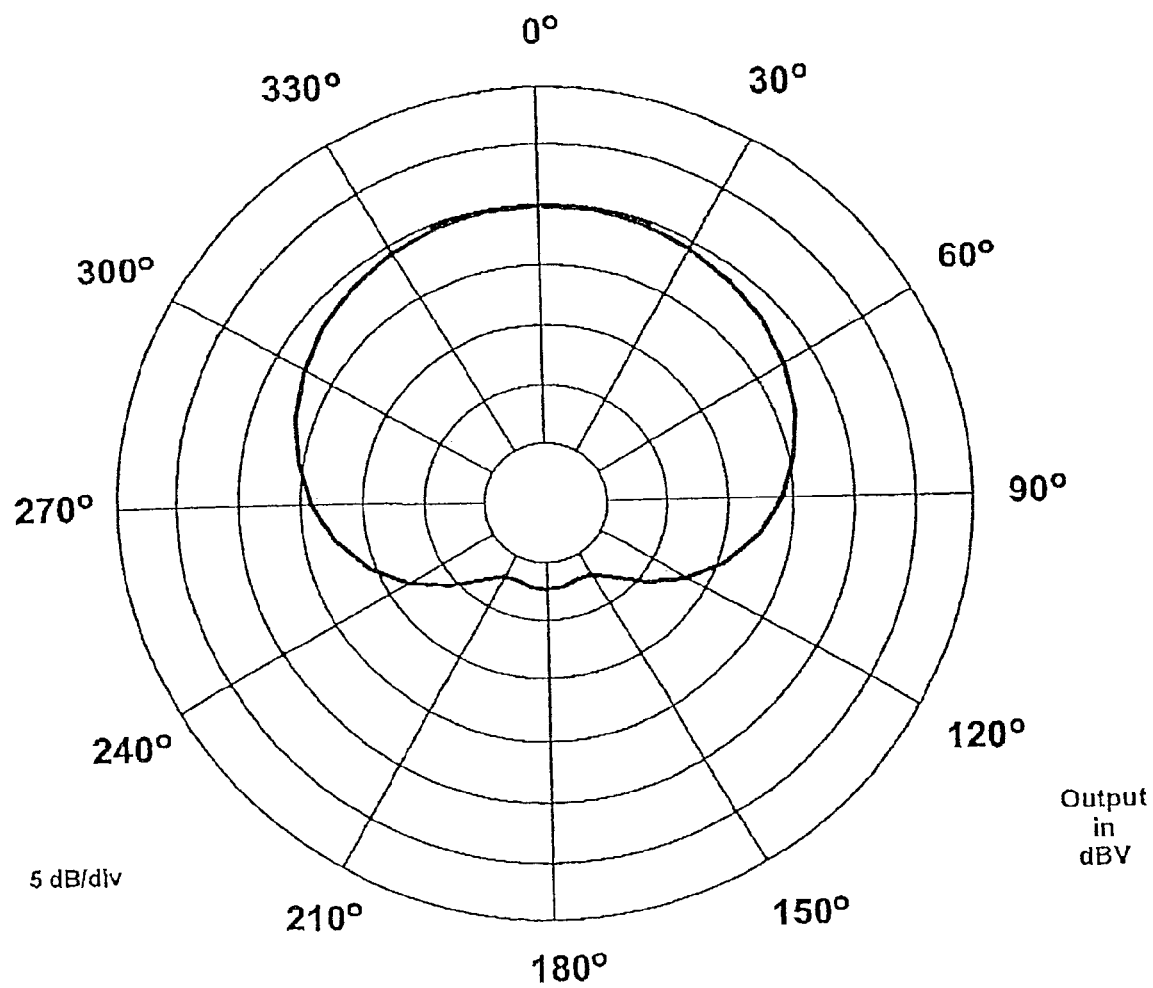
Figure 23A:
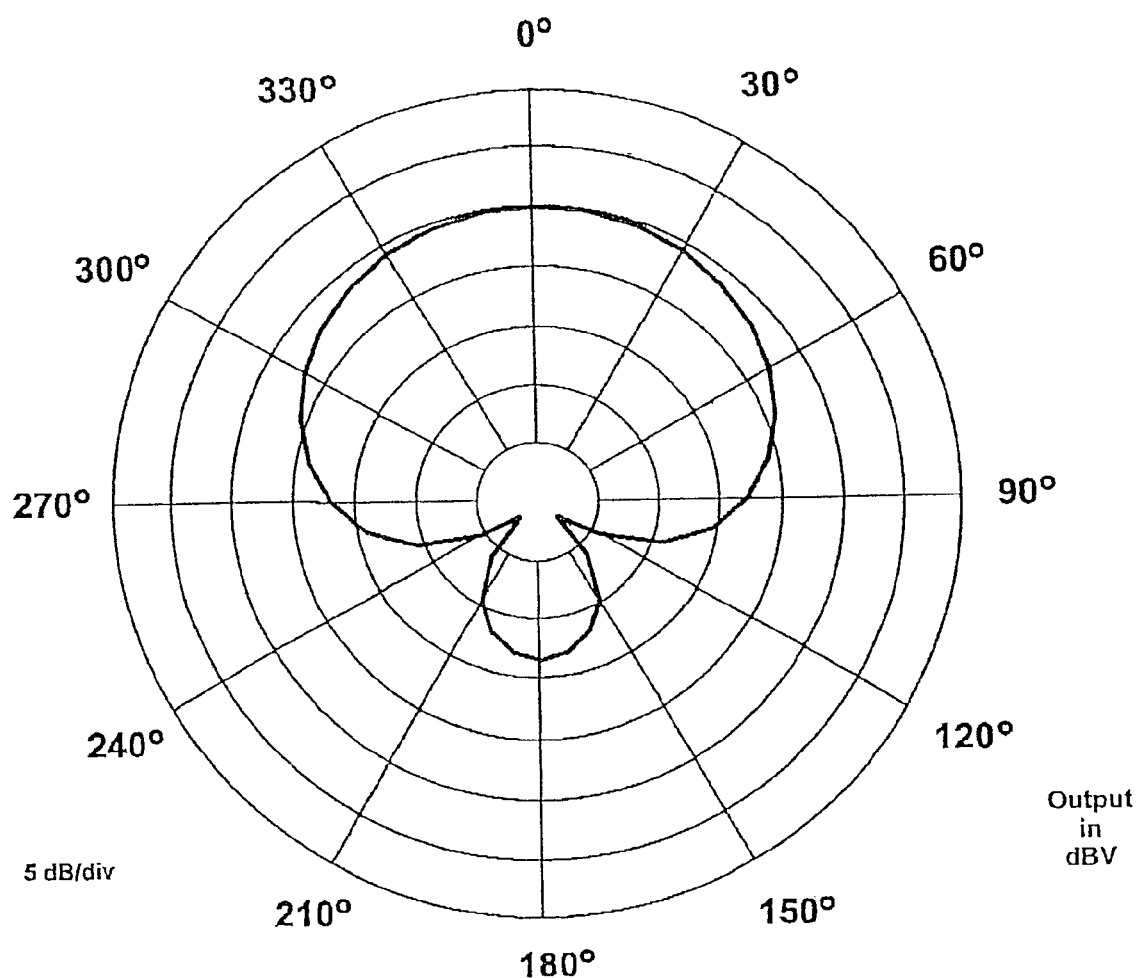
FIGS. 23A–23D are plots of polar patterns at different frequencies as obtained from a microphone assembly constructed in accordance with the present invention without a cover over the transducers.
Figure 23B:
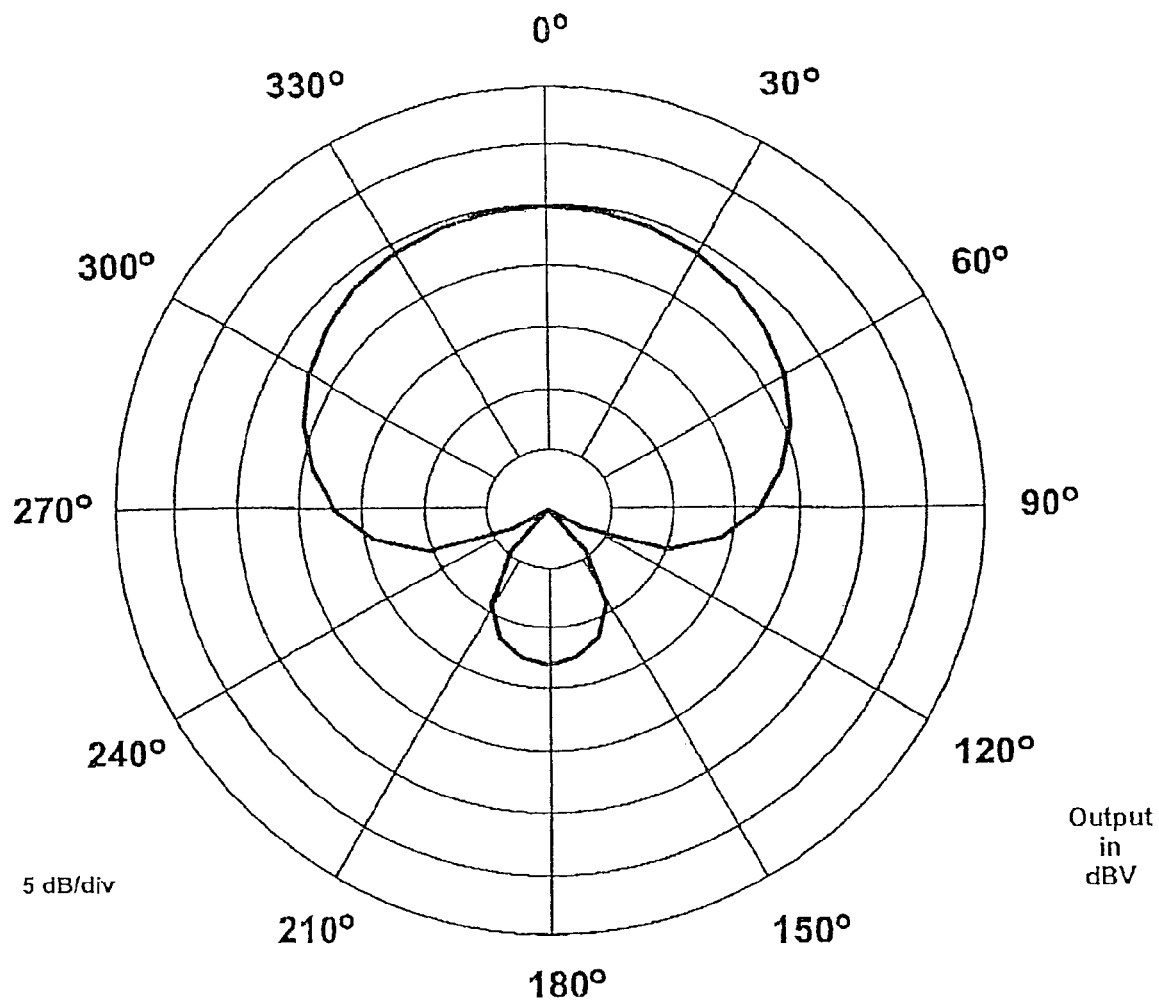
Figure 23C:
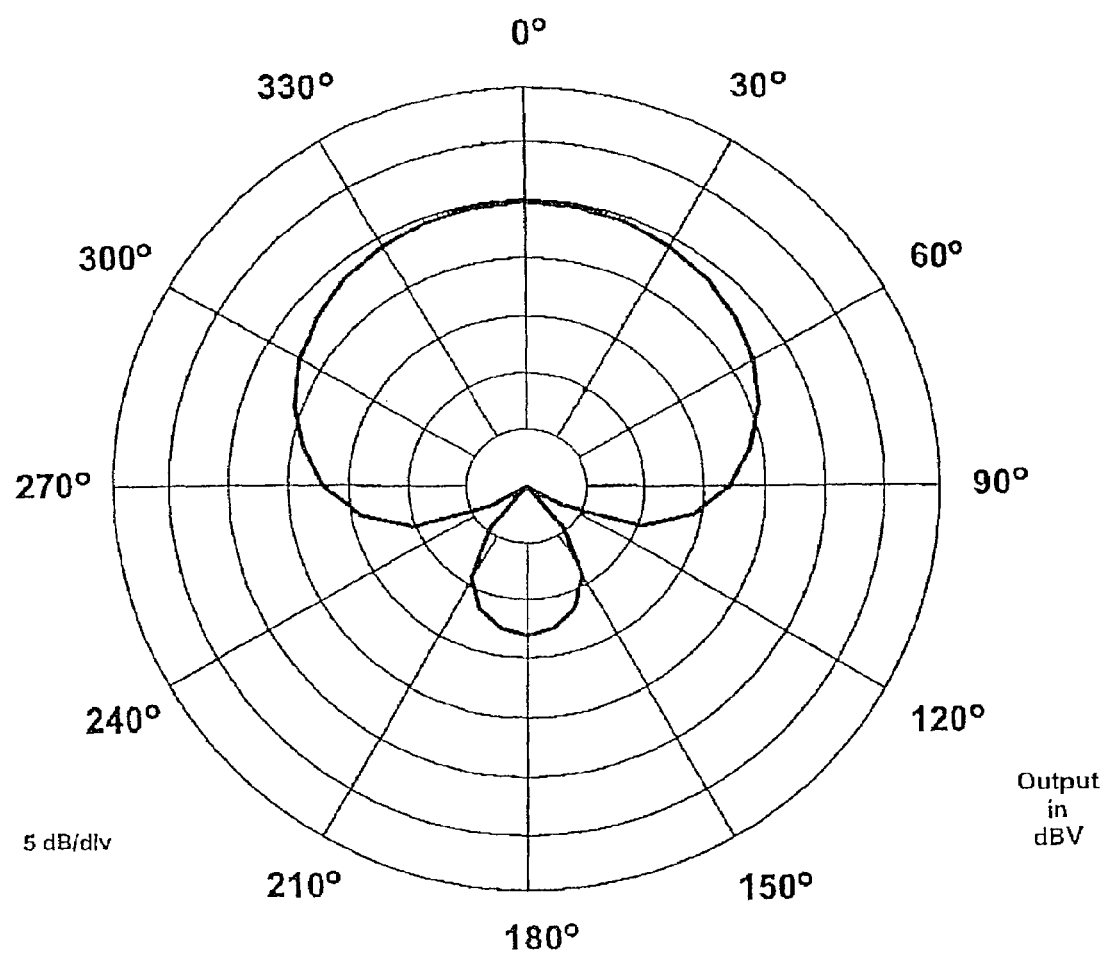
Figure 23D:
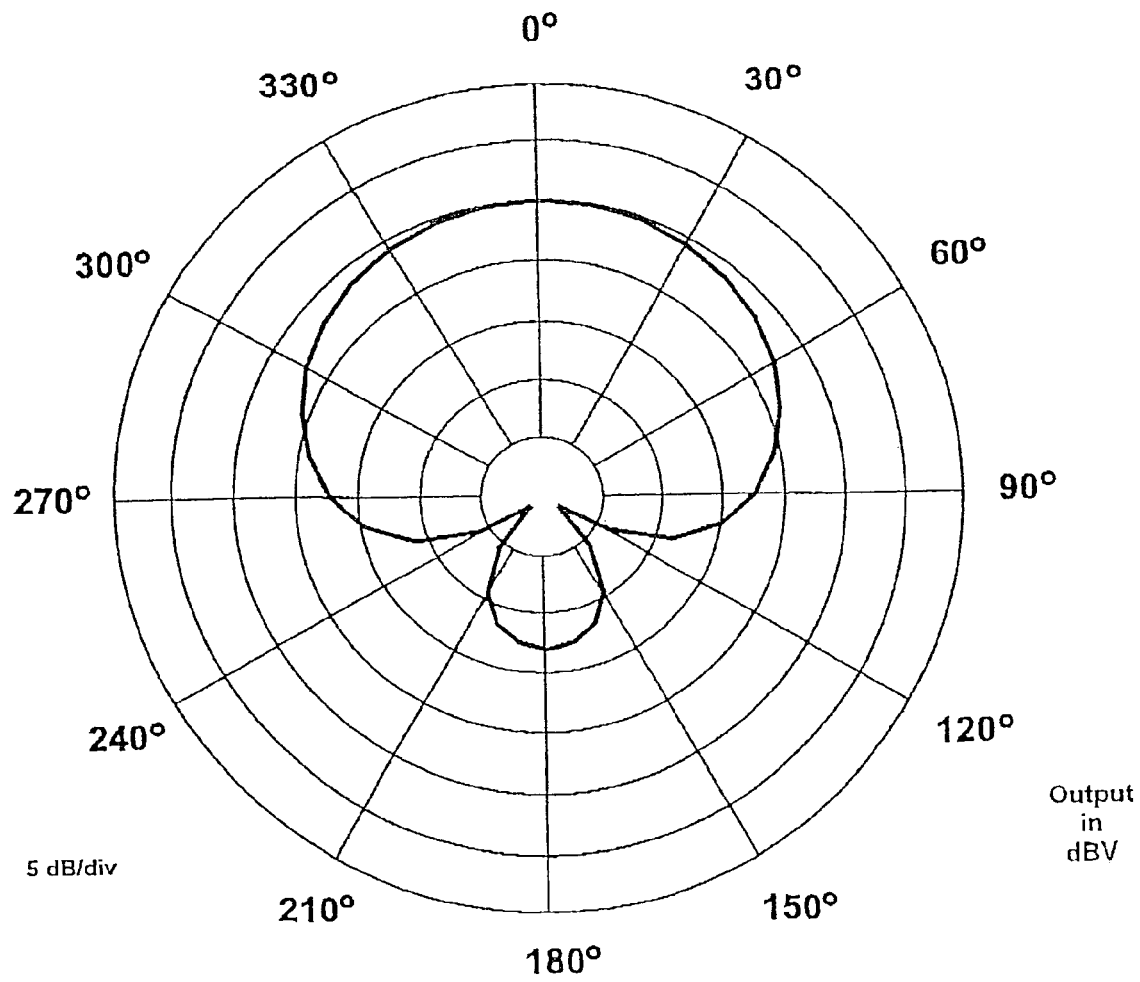

To illustrate the effect of adjusting the acoustic resistivity of the windscreen and the size and positioning of the ports in the microphone housing cover, the polar patterns were plotted for the microphone assembly with and without the cover and windscreen surrounding the microphone transducers at four different frequencies, which are plotted in FIGS. 22A–22D and in FIGS. 23A–23D. The polar patterns (FIGS. 22A–22D) were plotted with the cover and windscreen in place, and then, the cover and windscreen were removed and the polar patterns were plotted for the same four frequencies, which are shown in FIGS. 23A–23D. Specifically, the polar patterns shown in FIGS. 22A and 23A show the microphone characteristics at 250 Hz, the polar patterns shown in FIGS. 22B and 23B were taken at 500 Hz, the polar patterns shown in FIGS. 22C and 23C were taken at 1000 Hz, and the polar patterns shown in FIGS. 22D and 23D were taken at 2000 Hz. As apparent from a comparison of the respective polar patterns, the rear lobe that is present when the cover is not provided over the transducers is effectively eliminated by appropriately configuring the cover and windscreen.

While it has been typical in conventional microphones to minimize the acoustic resistivity of a windscreen by increasing the porosity of the windscreen, the microphone assembly of the present invention advantageously utilizes a windscreen with a higher acoustic resistivity by decreasing the porosity of windscreen and yet obtaining not only better water-resistant properties, but to also improved the acoustic characteristics for the microphone assembly. The reduction of the rear lobe of the polar pattern of the microphone assembly is particular advantageous when the microphone assembly is mounted on a rearview mirror assembly since significant noise may be introduced from the windshield defroster where such noise is typically to the rear and sides of the microphone assembly.

When the microphone transducers are sealed in separate housings having their own cover and windscreens, the cover ports and acoustic resistivity of the windscreens may be different for the different transducers so as to compensate for any effects experienced by the transducers as a result of the positioning of the transducers on the vehicle accessory. For example, when one transducer is mounted closer to the face of the rearview mirror, its polar pattern is different from that of a transducer spaced farther from the mirror surface. Thus, by selecting an appropriate cover design and windscreen resistivity, the effects of the differences resulting from the positioning of the transducers may be compensated such that the transducers exhibit substantially similar polar patterns and other characteristics. While the windscreen has been described above as consisting of a hydrophobic fabric, it will be appreciated that the windscreen may be molded integrally across the ports of the microphone assembly cover. Such an arrangement would simplify the manufacturing of the microphone assembly by requiring less parts and less manufacturing steps. Further, it would more likely provide more effective seal between the windscreen and the cover.

FIG. 24 shows yet another embodiment of a microphone assembly 2000. As illustrated, microphone assembly 2000 is positioned on the top of a rearview mirror assembly housing 1630 in a manner similar to that shown in FIGS. 18–20. Similar to that embodiment, a deflector 1670 is provided that extends from the upper rear portion of housing 1630 so as to provide a relatively flat surface 2005 on which the microphone assembly 2000 may be mounted.

Microphone assembly 2000 includes two separate microphone housings. A first microphone housing 2002 is positioned forward of a second microphone housing 2004 and is positioned closer to the face of the rearview mirror assembly and hence closer to the driver of the vehicle. First microphone housing 2002 includes a cover 2012 having a plurality of ports 2008 through which sound may pass. Second microphone housing 2004 likewise may include a cover 2014 having a plurality of acoustic ports 2010. Both housings preferably include a windscreen similar to that discussed above. The configuration of the ports on the covers and the acoustic resistivity of the windscreens may be different for each of housings 2002 and 2004 so as to compensate for any effects caused by the positioning of the transducers on the rearview mirror assembly.

Each of microphone housings 2002 and 2004 preferably include a single transducer having its front surface facing the driver of the vehicle. As shown in FIG. 25, the central axes of the transducers and covers 2012 and 2014 may be aligned along a common axis that is at an angle $\theta$ relative to a perpendicular bisector to the rearview mirror surface. This is to ensure the transducers are coaxially aligned with the driver's mouth, since the rearview mirror surface would be at more of an angle to allow viewing through the rear window of the vehicle. It should be noted that the transducers need not be aligned coaxially, but may be skewed with respect to one another.

As discussed further below, microphone assembly 2000 is preferably a second order microphone assembly with the centers of the two transducers physically separated by between about 0.75 and 1.4 inches, and preferably at 1.3 inches. By spacing the transducers 1.3 inches apart, the distance between the transducers is approximately one-half the wavelength of sound at 5 kHz. Because of the frequency response of components in existing telephone networks, it may be beneficial to increase the separation distance between the transducers to between 1.7 and 1.9 inches. Because space may be limited on the accessory surface on which the transducers are mounted, it may not be possible to physically separate the transducers by such a distance. To overcome this problem, a mechanical structure 2006 may be disposed between the first transducer and the second transducer to increase the acoustic path length between the first and second transducers. Mechanical structure 2006 may have any symmetrical conical structure and is shown in FIG. 25 as having the shape of a pyramid. As apparent from FIG. 24, any on-axis sound passing by the first housing 2002 towards the second microphone housing 2004 must pass up and over mechanical structure 2006. On the other hand, any sound coming off-axis from the sides will still be received at the same time by both microphone structures 2002 and 2004 regardless of the presence of mechanical structure 2006. Test results have shown that a pyramid-shaped mechanical structure 2006 having a height of 0.35 inch and side dimensions of 0.70 inch with a 45-degree incline of the side surfaces toward the peak that the acoustic path length may be increased by approximately 0.35 inch. Thus, greater acoustic separation of the two transducers may be obtained without having to physically separate the transducers by a greater distance. This enables the structure to be mounted on relatively small surfaces.

It should be noted that an additional common cover for the microphone assembly 2000 shown in FIGS. 24–26 may be secured over the illustrated structure provided that the common housing is substantially acoustically transparent so as to not effect the arrival times of the sound to the two transducers.

As shown in FIGS. 24 and 26, a surface of deflector 1670 may include a structure designated as 2020 that is hereinafter referred to as a "fine turbulence generator." Fine turbulence generator 2020 may be implemented using a fabric or other fine structure so as to create fine turbulence between deflector 1670 and the laminar airflow along the windshield defroster as it passes over deflector 1670. A preferred fine turbulence deflector may be implemented using the loop portion of a hook-and-loop-type fastener such as the VELCRO® hook-and-loop fastener. Alternatively, the corresponding surface of deflector 1670 may simply be roughened to create similar turbulence.

While turbulence generally is undesirable due to the noise it produces, creating very fine turbulence in the manner proposed creates turbulence having frequency components that exceed the audible limits of humans while reducing the turbulence of the air passing by deflector 1670 that would produce lower frequency components within the audible limits of humans. Because of the fine turbulence created along the surface of deflector 1670, the laminar airflow is deflected by the fine turbulence that is created rather than the deflector itself. This reduces the friction of the deflector as seen by the laminar airflow and therefore reduces the turbulence created by the airflow that would otherwise tend to create lower frequency noise within the audible frequencies.

FIG. 27 shows a block diagram of a preferred microphone processing circuit 2100 to be used with the second order microphone assembly 2000 as depicted in FIGS. 24–26. It will be appreciated, however, that microphone processing circuit 2100 may be used with any second order microphone assembly regardless of whether it is incorporated in a rearview mirror assembly, in another vehicle accessory, or in any other audio application outside of the vehicle environment.

Circuit 2100 includes a front transducer 2102 and a rear transducer 2104. As discussed above, for a second order microphone assembly, front and rear transducers are preferably disposed with their front surfaces facing the direction of the person speaking. The output 2104a of rear transducer 2104 is coupled to the input 2106a of a high pass filter 2106. The output of high pass filter 2106b is coupled to a first input 2108a of a summing circuit 2108.

The output 2102a of front transducer 2102 is coupled to the input of 2110a of an all-pass phase shifter 2110. The output of all-pass phase shifter 2110b is coupled to an inverting input 2108b of summing circuit 2108. As discussed further below, phase shifter 2110 is provided to shift the phase of the signal from front transducer 2102 by an amount equivalent to the phase shift inherent in high-pass filter 2106 such that the signals from front and rear transducers 2102 and 2104 have their phase shifted by equal amounts prior to application to summing circuit 2108 where the signal from front transducer 2102 is inverted and summed with the filtered signal from rear transducer 2104 (i.e., the signals are effectively subtracted). The output 2108c of summing circuit 2108 is coupled to the input 2112a of a three-pole high-pass filter 2112. The output 2112b of three-pole high-pass filter 2112 may be coupled to the input 2114a of an optional buffer circuit 2114. The output 2114b of buffer circuit 2114 represents the output of the inventive microphone processing circuit.

Microphone processing circuit 2100 as shown in FIG. 27, includes a biasing circuit 2116, which produces a bias voltage $V_B$ that is applied to each of components 2106–2114, as more apparent from the schematic representations of each of those components. Biasing circuit 2116 includes a pair of series-connected resistors 2118 and 2120 coupled between a supply voltage $V_S$ and ground. Resistors 2118 and 2120 preferably have a resistance of 10 kΩ. Biasing circuit 2116 further includes a capacitor 2122 coupled between the output of biasing circuit 2116 and ground. Capacitor 2122 preferably has a capacitance of 2.2 μf.

The details of components 2106–2114 are shown schematically in FIGS. 28A–28E, and are discussed in further detail below following a description of the general circuit operation.

Figure 29A:
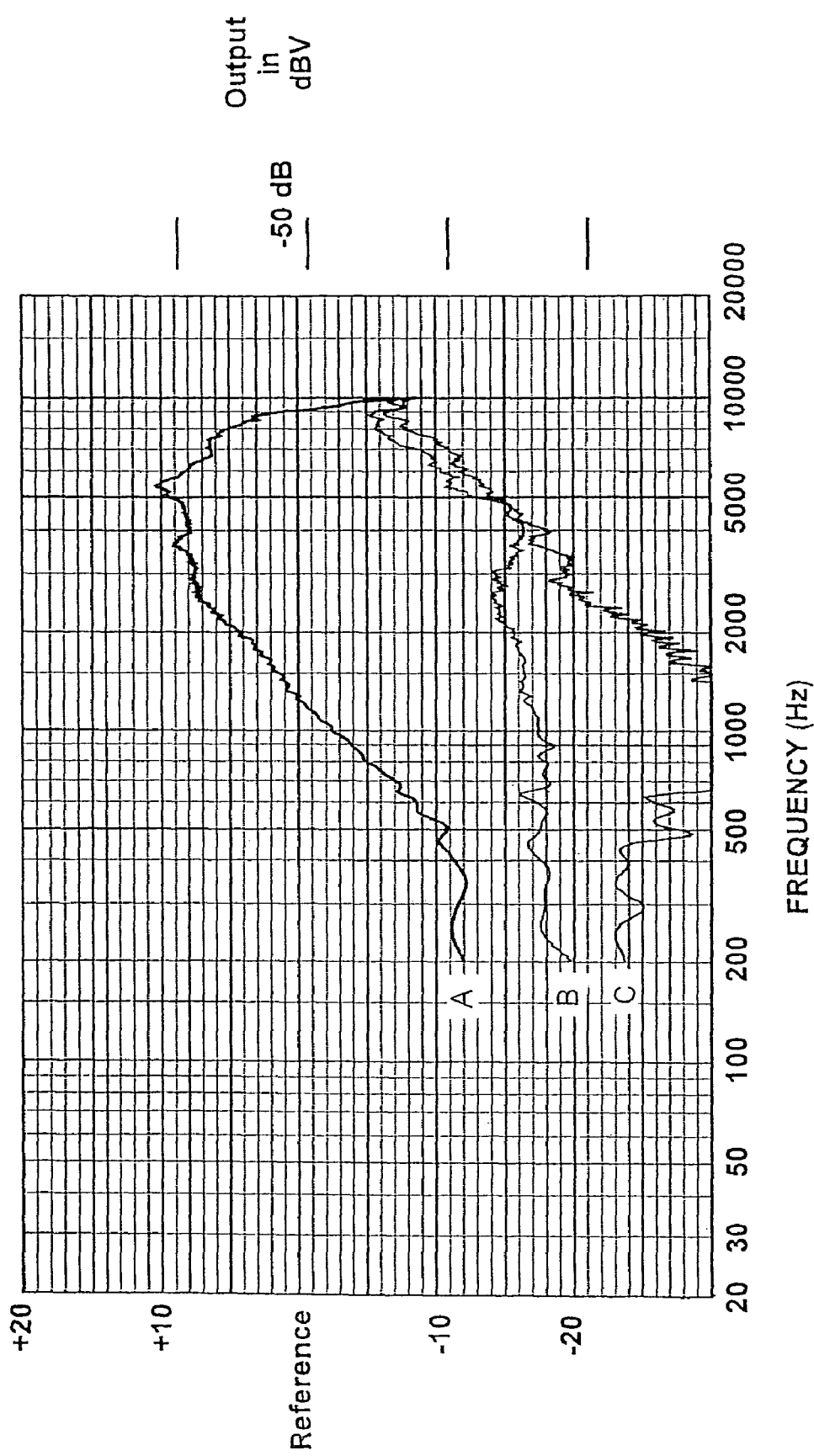
FIG. 29A is a plot of three frequency response curves of a second order microphone assembly with sound originating from three different directions.

To understand the performance and advantages of the inventive microphone processing circuit 2100, it is first necessary to understand the operation of a conventional circuit used with second order microphone assemblies. In prior second-order microphone processing circuits, the output of the front transducer was simply inverted and provided to a summing circuit where the signal was summed with the signal directly supplied from the rear transducer. The frequency response of such a processing circuit is shown in FIG. 29A. In FIG. 29A, plot A shows the sensitivity of the second order microphone assembly at various frequencies with the sound originating on-axis. Plot B shows the microphone sensitivity at various frequencies with the sound originating 180 degrees from the axes (i.e., from behind the microphone assembly). Plot C shows the microphone sensitivity for various frequencies arriving at an angle 90 degrees from the central axes of the transducers (i.e., directly from the side of the microphone assembly). As apparent from FIG. 29A, such a microphone circuit is very sensitive to higher frequencies, but is not very sensitive to lower frequencies within the audible band for those sounds originating on-axis. To compensate for the low frequency sensitivity, a high-pass filter may be added at the output of the summing circuit. While such an arrangement serves to provide a more uniform sensitivity across the frequencies in the audible range, the introduction of the filter renders the assembly extremely sensitive to vibration-induced noise. More specifically, torsional vibration of the transducers is amplified using such a configuration.

Figure 29B:
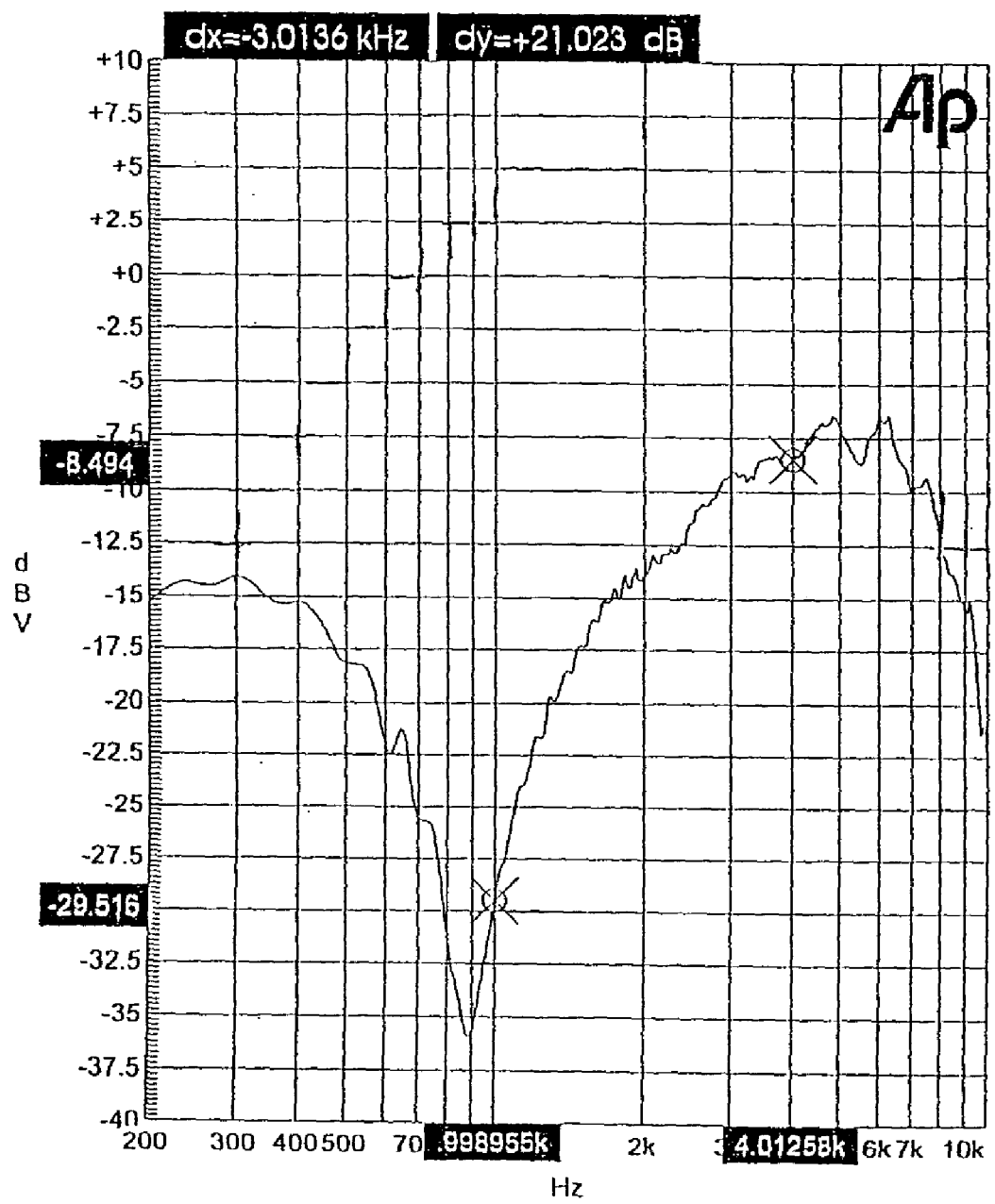
FIG. 29B is a plot of a frequency response curve of the second order microphone processing circuit shown in FIG. 27 but without the all-pass phase shifter.

To overcome these problems, the inventive microphone processing circuit utilizes a high-pass filter 2106 between one of the transducers and summing circuit 2108. High-pass filter 2106 could be placed at the output of either front transducer 2102 or rear transducer 2104. High-pass filter 2106 preferably has a characteristic cut-off frequency at about 1 kHz. By filtering the output of one of the transducers to reduce its bass frequency components prior to subtraction from the other transducer output, the bass of the resultant output is reduced by a smaller amount than it otherwise would in the absence of filter 2106. As discussed above, all-pass phase shifter 2110 is provided in the path of the other transducer so as to ensure that the phase of the signals from front and rear transducer 2102 and 2104 are shifted by the same amount prior to reaching summing circuit 2108. FIG. 29B illustrates the frequency response of the system when phase shifter 2110 is not utilized. As apparent from FIG. 29B, there is a steep drop off in response at the middle of the audible range, which results from the phase difference of the signals that would otherwise be applied to summing circuit 2108.

Figure 28A:
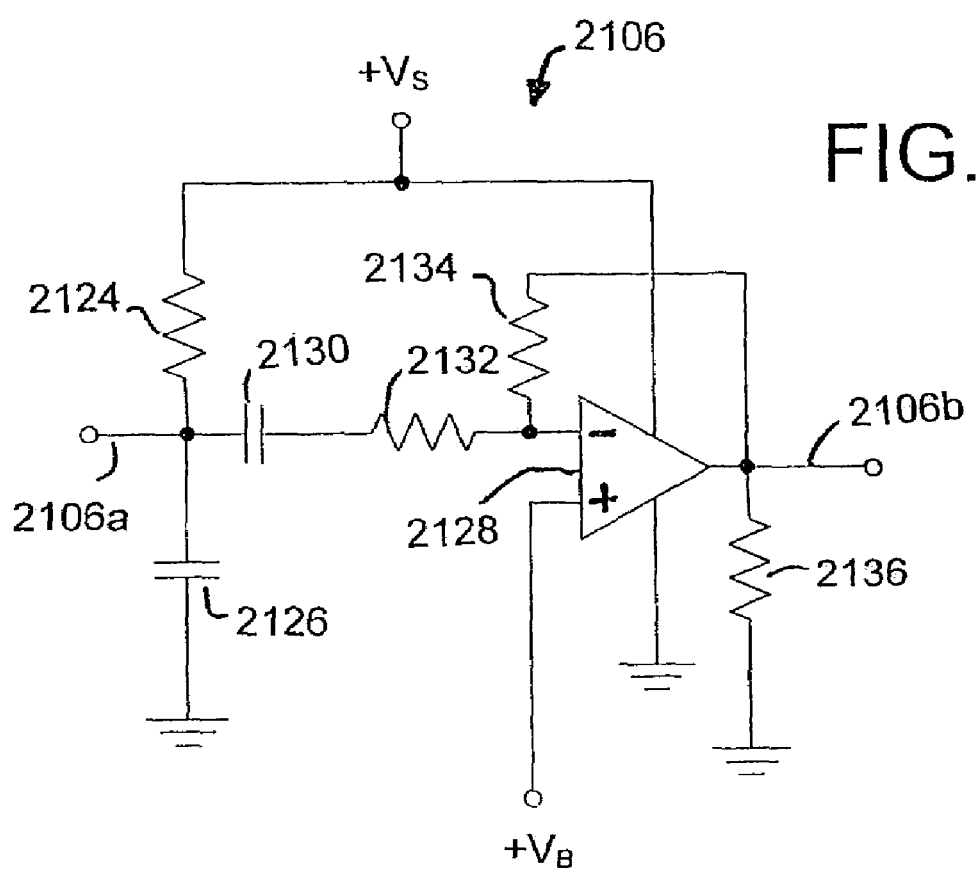
FIG. 28A is an electrical circuit diagram in schematic form showing an examplary high pass filter that may be used in the circuit shown in FIG. 27.
Figure 28B:
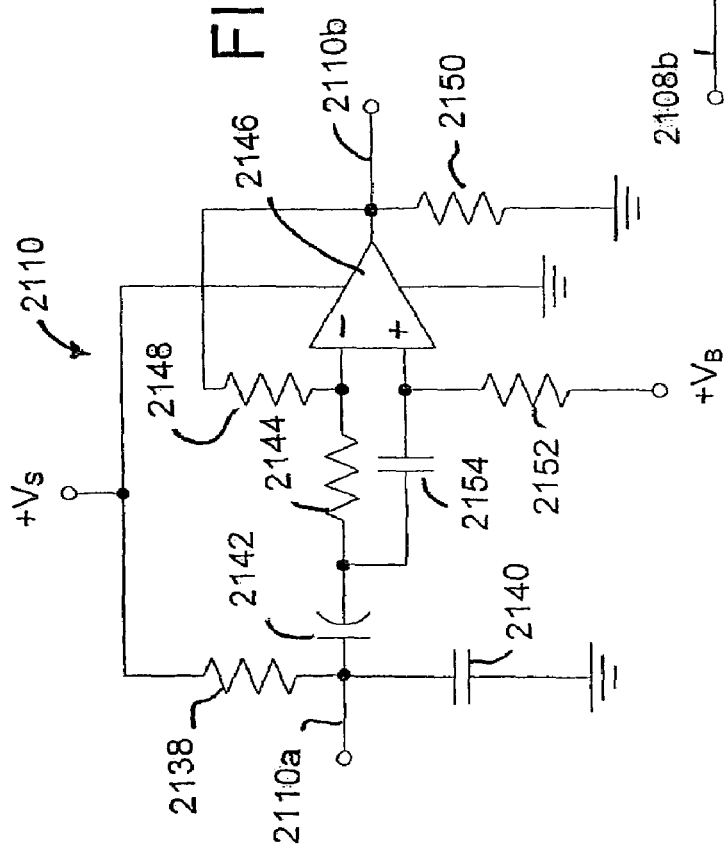
FIG. 28B is an electrical circuit diagram in schematic form showing an examplary all-pass phase shifter that may be used in the circuit shown in FIG. 27.
Figure 28C:
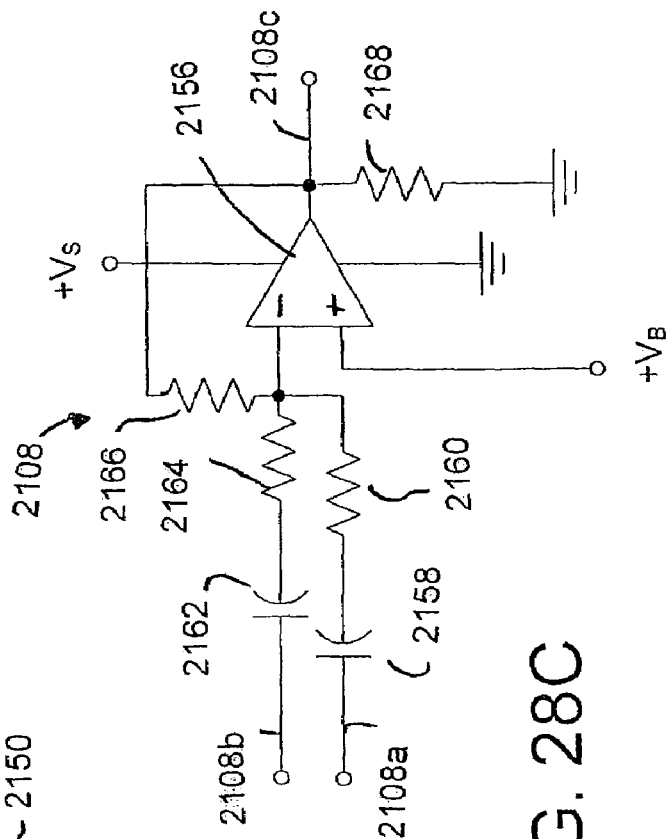
FIG. 28C is an electrical circuit diagram in schematic form showing an examplary summing circuit that may be used in the circuit shown in FIG. 27.
Figure 28D:
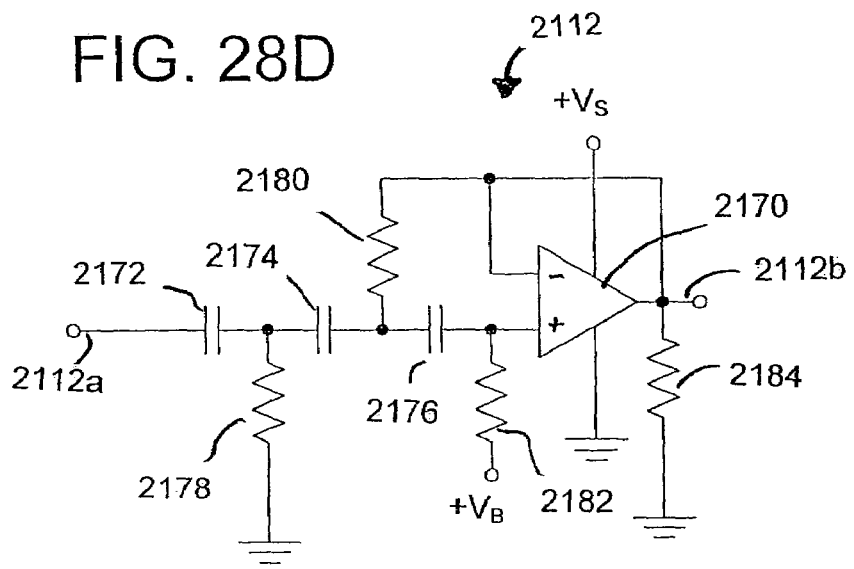
FIG. 28D is an electrical circuit diagram in schematic form showing an examplary three-pole high pass filter that may be used in the circuit shown in FIG. 27.
Figure 28E:
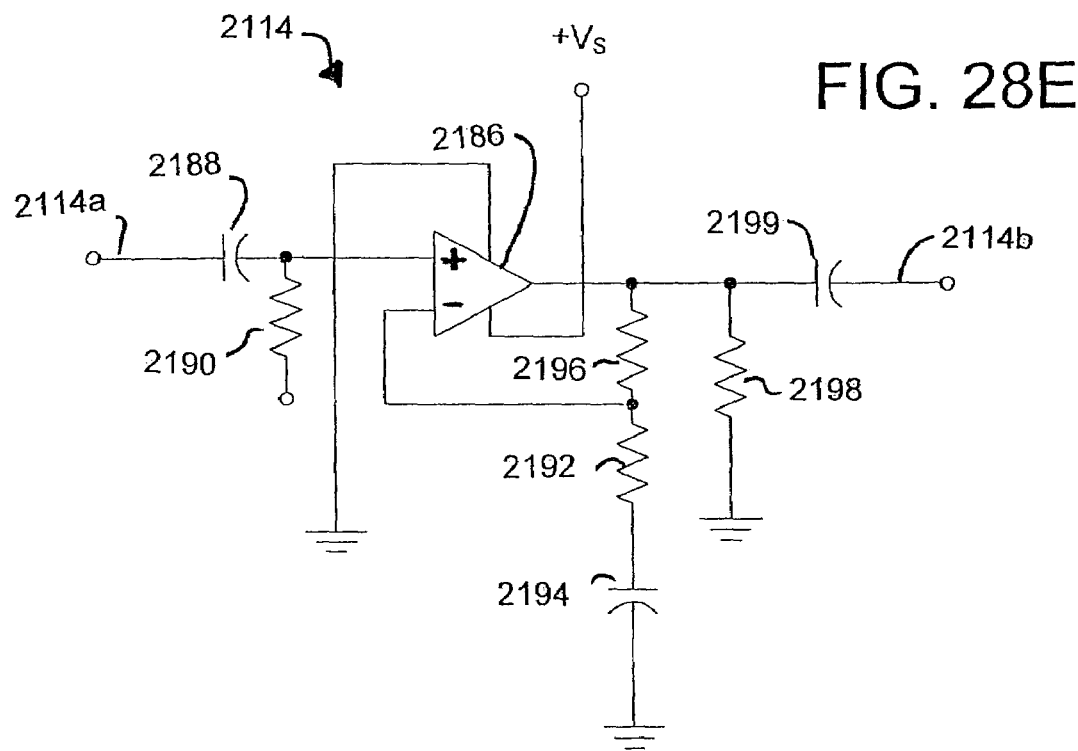
FIG. 28E is an electrical circuit diagram in schematic form showing an examplary buffer circuit that may be used in the circuit shown in FIG. 27.
Figure 29C:
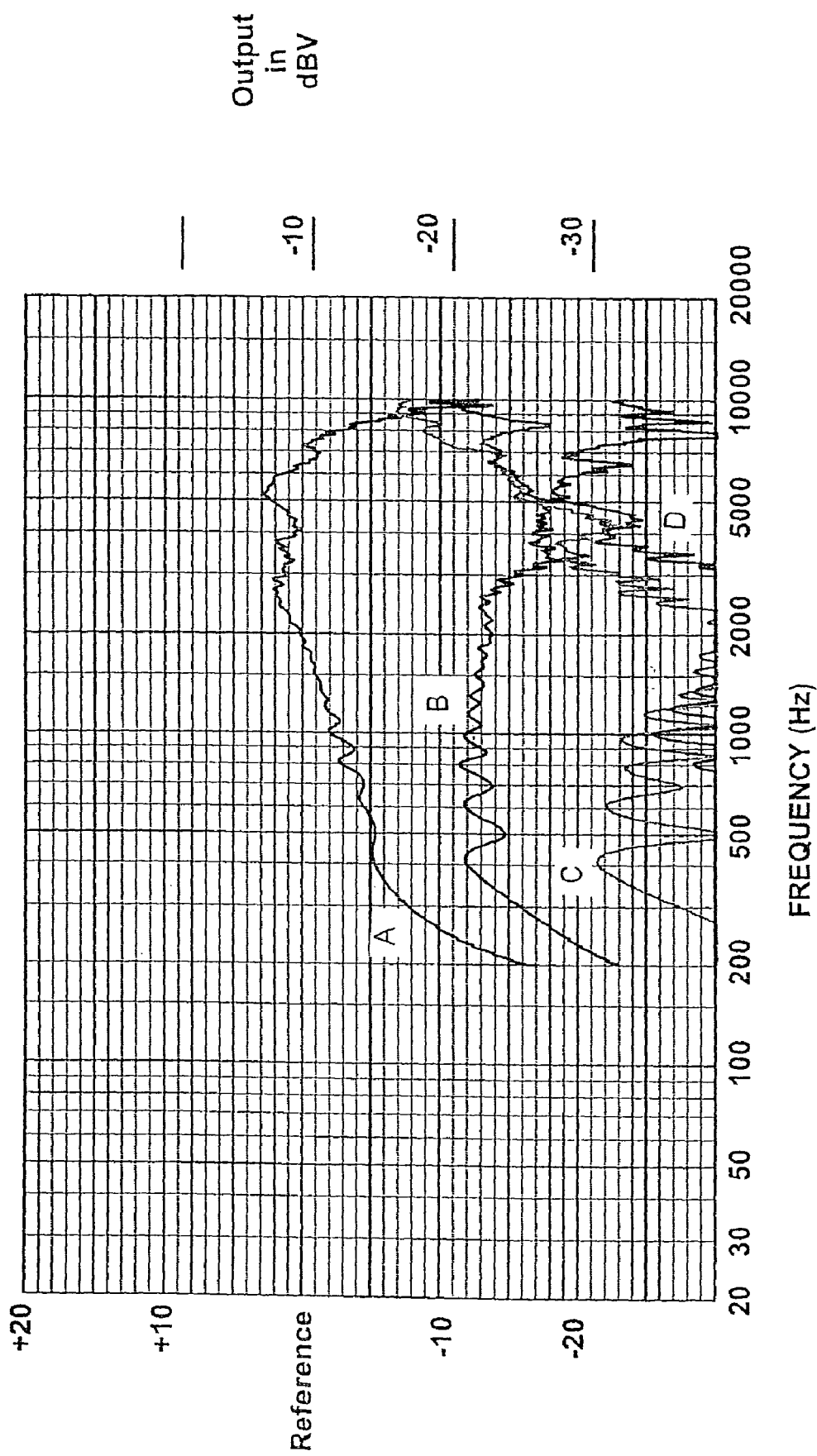
FIG. 29C is a plot of four frequency response curves of the second order microphone processing circuit shown in FIG. 27 with sound originating from four different directions.

FIG. 29C shows the frequency response of the inventive microphone processing circuit 2100 having the construction shown generally in FIG. 27 and specifically in FIGS. 28A–28E and described further below. As apparent from FIG. 29C, the sensitivity of the microphone assembly to on-axis sound is relatively uniform across the audible range. The on-axis sensitivity is referenced in FIG. 29 as plot A. The 180-degree off-axis sound sensitivity is designated in FIG. 29C as plot B. Plot C represents the microphone assembly sensitivity to sound arriving off-axis at 145 degrees while plot D represents sound originating from a point 90 degrees off-axis. As apparent from a comparison of these plots, the second order microphone assembly of the present invention is significantly more sensitive to on-axis sound while is clearly less sensitive to off-axis sound, particularly at lower frequencies. As noted above, in an automobile environment, most the noise arrives off-axis towards the sides of the microphone assembly. Thus, the above described second order microphone assembly 2000 and circuitry 2100 is significantly less sensitive to noise originating from those directions.

FIG. 28A is a schematic diagram showing the preferred construction for high-pass filter 2106. High pass filter 2106 includes a first resistor 2124, preferably having a resistance of 8.2 kΩ, which is coupled between filter input 2106a and supply voltage $V_S$. A capacitor 2126, preferably having a capacitance of 0.001 μf, is coupled between input 2106a and ground. High-pass filter 2106 also includes an operational amplifier 2128, preferably part No. LM2904, having its non-inverting input terminal coupled to bias voltage $V_B$, and its inverting input coupled to input terminal 2106a via series-connected capacitor 2130 and resistor 2132. Capacitor 2130 preferably is a 0.01 μf capacitor while resistor 2132 preferably has a resistance of 10 kΩ. High-pass filter 2106 also preferably includes a feedback resistor 2134 coupled between the inverting input and the output of amplifier 2128. Another resistor 2136 is coupled between the output of amplifier 2128 and ground. Preferably, resistors 2134 and 2136 both have a resistance of 10 kΩ. The output of amplifier 2128 serves as the output 2106b of high-pass filter 2106.

FIG. 28B shows the preferred construction of all-pass phase shifter 2110. Phase shifter 2110 includes a first resistor 2138 that is coupled between input terminal 2110a and supply voltage $V_S$. Resistor 2138 preferably has a resistance of 8.2 kΩ. A capacitor 2140, preferably having a capacitance of 0.001 μf, is coupled between input terminal 2110a and ground. A capacitor 2142 and a resistor 2144 are coupled in series between input terminal 2110a and an inverting input of an amplifier 2146. Capacitor 2142 preferably has a capacitance of 1 μf. A feedback resistor 2148 is coupled between the inverting input and the output of amplifier 2146. A resistor 2150 is coupled between the output of amplifier 2146 and ground. Amplifier 2146 is preferably part No. LM2904. Another resistor 2152 is coupled between the non-inverting input of amplifier 2146 and biasing circuit 2116. A capacitor 2154 is coupled between the non-inverting input of amplifier 2146 and a terminal between capacitor 2142 and resistor 2144. Capacitor 2154 preferably has a capacitance of 0.01 μf. Resistors 2144, 2148, 2150, and 2152 all preferably have resistances of 10 kΩ. The output of amplifier 2146 serves as the output 2110b of phase shifter 2110.

FIG. 28C shows a preferred construction for summing circuit 2108. Summing circuit 2108 includes an amplifier 2156 having its non-inverting input coupled to biasing circuit 2116 so as to receive a bias voltage $V_B$. Input terminal 2108a is coupled to the inverting input of amplifier 2156 via series-connected capacitor 2158 and resistor 2160. Similarly, input terminal 2108b is coupled to the inverting input of amplifier 2156 via series-connected capacitor 2162 and resistor 2164. Capacitors 2158 and 2162 preferably have a capacitance of 1 μf. A resistor 2166 is coupled between the inverting input and the output of amplifier 2156. A resistor 2168 is preferably coupled between the output of amplifier 2156 and ground. Resistors 2160, 2164, and 2168 all preferably have a resistance of 10 kΩ while resistor 2166 has a resistance of 100 kΩ. Amplifier 2156 is preferably part No. LM2904. The output of amplifier 2156 serves as the output 2108c from summing circuit 2108.

FIG. 28D illustrates a preferred construction for three-pole high-pass filter 2112. Bypass filter 2112 preferably includes an amplifier 2170 and three capacitors 2172, 2174, and 2176 coupled in series between input 2112a and the non-inverting input of amplifier 2170. Capacitors 2172, 2174, and 2176 preferably have capacitances of 0.33 μf. A resistor 2178 is coupled between ground and a terminal between capacitors 2172 and 2174, a resistor 2180 is coupled between the inverting input of amplifier 2170 and a terminal between capacitors 2174 and 2176, and a resistor 2182 is coupled between the non-inverting input of amplifier 2170 and bias circuit 2116. A resistor 2184 is coupled between the output of amplifier 2170 and ground. The inverting input and output of amplifier 2170 are electrically coupled. Resistor 2178 preferably has a resistance of 6.8 kΩ, resistor 2180 preferably has a resistance of 1.1 kΩ, resistor 2182 preferably has a resistance of 270 kΩ, and resistor 2182 preferably has a resistance of 10 kΩ. Amplifier 2170 is preferably part No. LM2904. The output of amplifier 2170 serves as the output 2112b of filter 2112. Having this construction, the cut-off frequency of this high-pass filter is about 300 Hz. It should be noted that a different cut-off frequency could be utilized in microphone processing circuit 2100.

FIG. 28E illustrates a preferred construction for buffer circuit 2114. Buffer circuit 2114 preferably includes an amplifier 2186 having its non-inverting input coupled to input terminal 2114a via a capacitor 2188. A resistor 2190 is coupled between the non-inverting input of amplifier 2186 and bias circuit 2116. The inverting input of amplifier 2186 is coupled to ground via series-connected resistor 2192 and capacitor 2194. A resistor 2196 is coupled between the inverting input and the output of amplifier 2186. A resistor 2198 is coupled between the output of amplifier 2186 and ground. A capacitor 2199 is coupled between the output of amplifier 2186 and the output 2114b of buffer circuit 2114.

While the specific circuit implementation is described above for microphone processing circuit 2100, it will be appreciated by those skilled in the art that other configurations may be utilized without departing from the scope of the invention.

Figure 30:
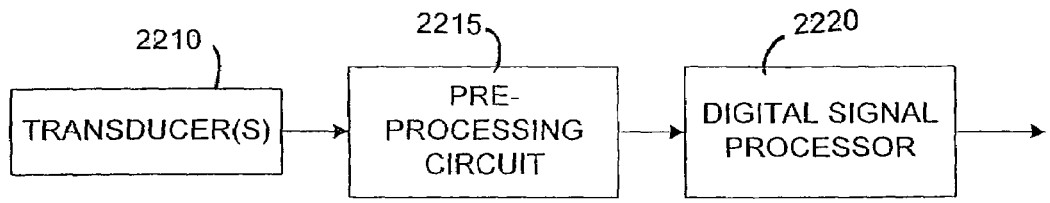
FIG. 30 is block diagram illustrating a microphone system constructed in accordance with the present invention.

FIG. 30 shows an alternative microphone processing circuit that utilizes a digital signal processor (DSP).

As shown in FIG. 30, the microphone assembly may include one or more transducers 2210. The microphone processing circuit of the microphone assembly includes a DSP 2220 and may optionally include a pre-processing circuit 2215 disposed between an input to DSP 2220 and an output of transducer(s) 2210. Alternatively, DSP 2220 could be coupled between pre-processing circuit 2215 and transducer(s) 2210. The output of DSP 2220 may be applied to various devices such as a voice recognition device, a recording device, or to a transceiver of a radio or cellular telephone.

DSP 2220 may be any appropriately configured DSP, but is preferably either of part nos. TMS320VC5X 5409 or 5402 available from Texas Instruments. The microphone preferably, but not necessarily, includes two or more transducers arranged as disclosed above, while a corresponding pre-processing circuit such as those disclosed above may also be used for circuit 2215. By using two transducers with one spaced farther away from the person speaking, the arrival time of sounds picked up by the transducers may be used to determine the likely source of the sounds. For example, the transducer closest to the person speaking will detect a sound originating from that person before the furthest transducer. Conversely, any sound that is first detected by the furthest transducer may be identified as noise. Likewise, any sounds arriving off-axis and received by both transducers at the same time may also be discarded as noise.

Human vocal cords resonate and thereby create a single frequency with overtones (also known as harmonics). All vocal cord energy is therefore confined to the harmonics of the vocal cord fundamental frequency. For a human male, the fundamental frequency is typically between 35 and 120 Hz, and for a female, the fundamental frequency is typically between 85 and 350 Hz. The DSP filter 2220 of the present invention identifies the fundamental frequency of the speech signals received by transducer(s) 2210 and use the identified fundamental frequency to compute the coefficients for an inverse comb filter that will pass only the harmonics of the vocal cords of the person(s) whose speech signals are received. In contrast to conventional noise filters that try to identify the noise, the inventive filter identifies the speech. The inventive filter may also be used to separate one talking person from another as long as both have different fundamental frequencies.

Figure 32:
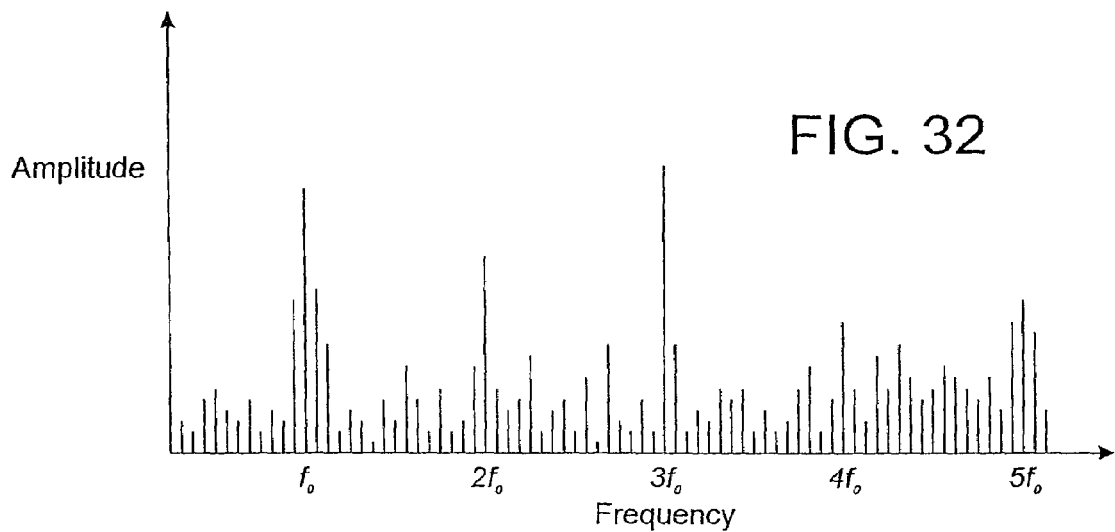
FIG. 32 is an examplary plot of a FFT of an audio signal received from a typical transducer while receiving both noise and a user's speech.
Figure 31:
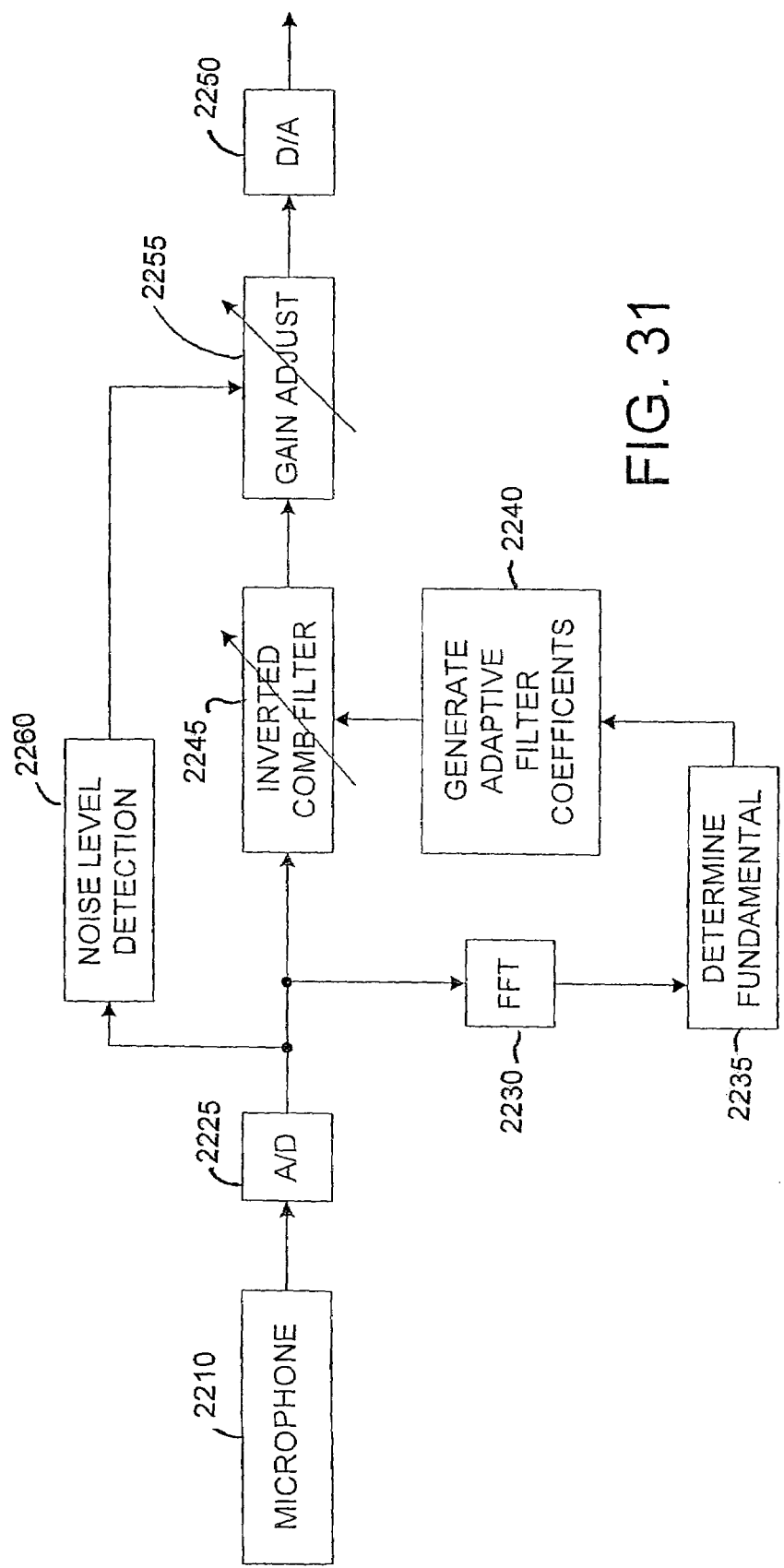
FIG. 31 is a process diagram for the digital signal processor shown in FIG. 30 according to a first embodiment.

FIG. 31 shows a process diagram for the adaptive filter as implemented in DSP 2220. As depicted in block 2225, the analog audio signal from transducer(s) 2210 is converted into a digital audio signal. A fast Fourier transform (FFT) is then performed on the digitized audio signal as shown in block 2230. An example of an FFT of an audio signal including a speech signal and noise is shown in FIG. 32. Using the FFT of the digitized audio signal, the fundamental frequency of the speech signal is determined as depicted in block 2235. DSP 2220 identifies the fundamental frequency by identifying frequency components in the FFT that have amplitudes exceeding a predetermined threshold, and then identifying the fundamental frequency as the difference in frequency of those frequency components having an amplitude above the predetermined threshold. As apparent from the examplary FFT shown in FIG. 32, the highest peaks are separated by an amount equal to the fundamental frequency $f_O$ and appear at frequencies that are at multiples of the fundamental frequency. Those peaks in the FFT correspond to the harmonic frequency components of a person's speech.

Figure 33:
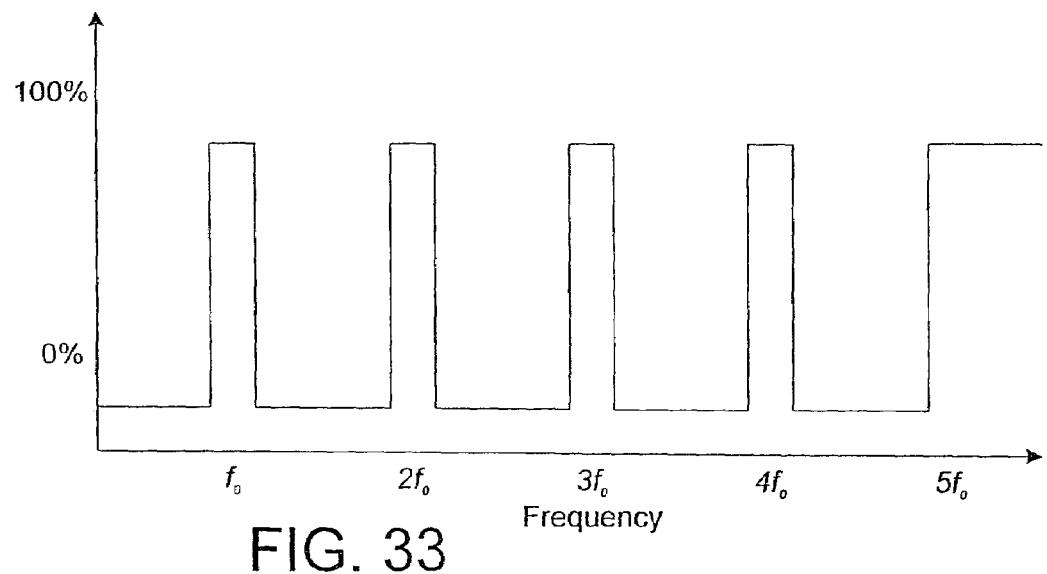
FIG. 33 is a graph of an ideal inverted comb filter for filtering the audio signal whose FFT is illustrated in FIG. 32.

After the fundamental frequency is determined in block 2235, adaptive filter coefficients are generated (block 2240) and used to configure an inverse comb filter (block 2245) that is used to filter the digitized audio signal supplied by transducer(s) 2210. An example of an inverse comb filter characteristic is shown in FIG. 33 that is suitable for filtering a signal having the FFT shown in FIG. 32. The filtered digital signal may then be converted to an analog speech signal as depicted in block 2250. For a discussion of how an inverse comb filter may be configured in a DSP, see *Digital Signal Processing Primer*, by Ken Steiglitz, 1996, ISBN 0-8053-1684-1.

As shown in FIG. 33, the inverse comb filter passes all frequency components above a predetermined frequency, such as 2500 Hz. This may be desirable because certain higher frequency sounds in human speech such as "S," "Sh," "T," and "P" sounds, may not be at a harmonic frequency of the vocal cords. In a vehicle environment where much of the noise is at lower frequencies, passing all higher frequency components typically does not present a problem. As described further below, DSP 2220 may be configured to predict and hence separate such "S," "Sh," "T," and "P" sounds in human speech from noise at those higher frequencies. Filtering, such as spectral subtraction, can be employed in the region above the inverted comb filtering frequencies to reduce noise in this band.

By continuously monitoring the incoming audio signal for any changes in the fundamental frequency, DSP 2220 may adjust the filter coefficients in response to any detected change in the fundamental frequency. The manner in which DSP 2220 adjusts filter components may be pre-configured to prevent abrupt changes that may occur when, for example, another occupant of the vehicle begins speaking. The desired frequency response of the person speaking may thus be estimated and maintained. Consistency in response is an important factor in speech recognition. This adjustment is made by comparing the relative intensity of the harmonics over the reference time interval. This relationship will then be maintained. For example, in the first few utterances, the second average harmonic peak value may be 3 dB greater than that of the third. If this relationship drifts, the original value will be restored. This concept can also be applied to the relative intensity of the sibilance utterances and the vocal cord levels. The resulting speech output may not exactly reproduce a person's normal tonality, but it will reproduce a consistent one. Combined with output level, this adjustment should help vocal recognition by removing two very important variables.

It should also be noted that DSP 2220 may configure two or more superimposed inverse comb filters each corresponding to the harmonics of different individuals in the vehicle. The system may also be taught to default to the fundamental frequency most often, or last, identified upon being activated so as to limit any delay caused by the subsequent identification of the fundamental frequency.

Blocks 2255 and 2260 of FIG. 31 illustrate an inventive variable gain adjustment that may optionally be implemented in DSP 2220. The gain of the filtered digitized signal may be varied (block 2255) prior to conversion into an analog signal. The amount that the gain is varied is a function of the noise level detected in the digitized audio signal received from transducer(s) 2210 corresponding to a polar pattern with a null facing the direction of the driver, preferably a cardioid or super cardioid.

Figure 34:
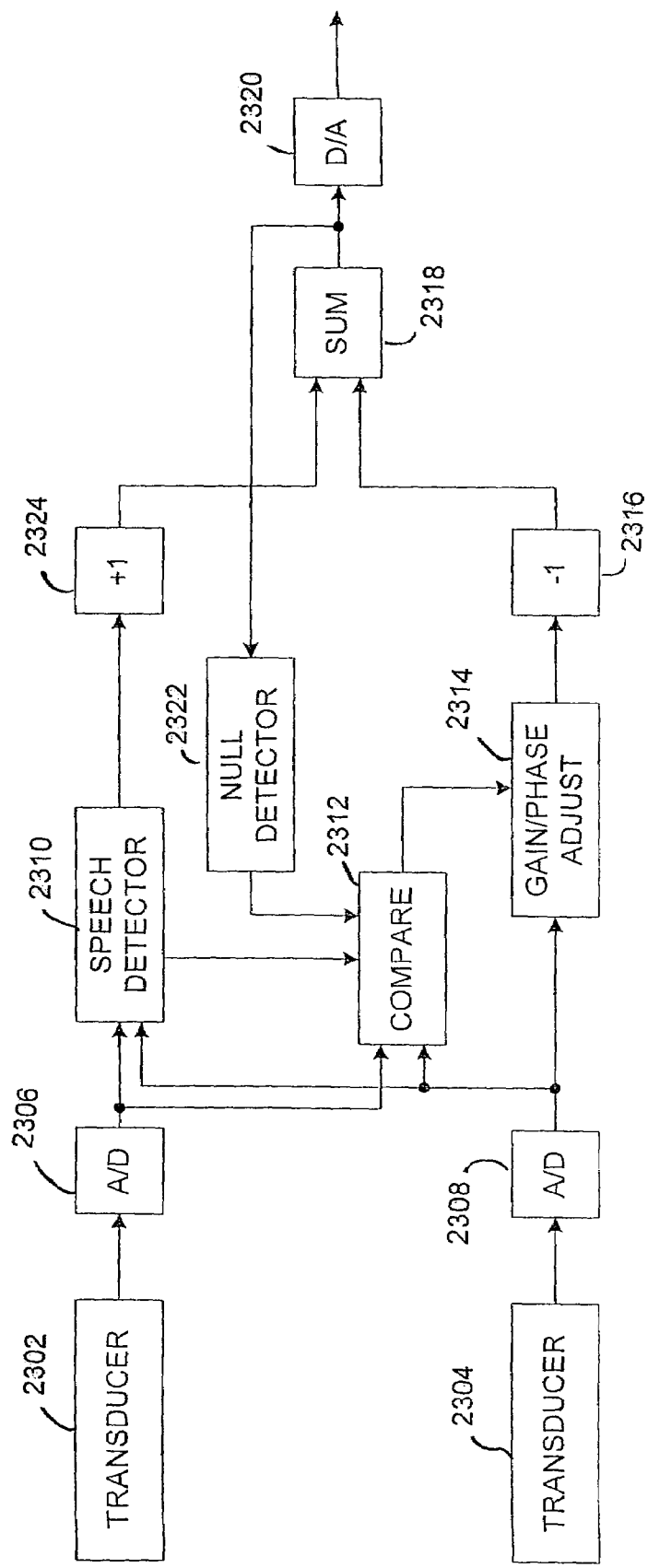
FIG. 34 is a process diagram for the digital signal processor shown in FIG. 30 according to a second embodiment.

A second configuration for DSP 2220 is shown in FIG. 34. According to the second configuration, two transducers are used each having a polar pattern corresponding to a super-cardioid. The first transducer 2302 is directed on axis towards the person speaking (typically the driver in an automotive environment), while the second transducer 2304 is positioned in the opposite direction with a null in the polar facing the person speaking. In this manner, while first transducer 2302 will pick-up the person's speech as well as some noise, second transducer 2304 will not pick-up the person's speech, but will only pick up noise including much of the same noise picked-up by first transducer 2302. Thus, the output signal of second transducer 2304 may be subtracted from that of first transducer 2302 to remove unwanted noise. Second transducer 2304 may alternatively haven an omni-directional polar pattern.

The diagram in FIG. 34 shows that the audio signal of first transducer 2302 is converted into a digital audio signal (block 2306) and that the audio signal of second transducer 2304 is also converted into a digital, audio signal (block 2308). The digitized audio signals from both transducers are processed to detect the presence of speech (block 2310) and are also both compared to one another (block 2312). In response to the comparison of the signals from first and second transducers 2302 and 2304, the gain/phase of the signal from transducer 2304 is selectively adjusted (block 2314). The gain/phase adjusted signal from second transducer 2304 is inverted (block 2316) and is summed with the digitized signal from first transducer 2302 (block 2318). The resultant summed signal may optionally be converted into an analog signal (block 2320). Because the summed signal actually corresponds to the subtraction of an adjusted audio signal from second transducer 2304 from that first transducer, the summed signal should represent the speech (if present) with any noise removed. When speech is not present, however, the summed signal should be a null. Speech may be detected by performing a FFT on the received audio signal and looking from a fundamental frequency in the range of that expected for a human.

To appropriately adjust the gain/phase of the signal from second transducer 2304, the detection of the presence of speech (block 2310) may be used in the determination of the appropriate gain/phase adjustment to be made. Further, nulls may be detected in the summed signal (block 2322) for use in adjusting the gain/phase of the signal from second transducer 2304.

As shown in FIG. 34, some phase adjustment (block 2324) may be desired to introduce a phase delay into the audio signal from first transducer 2302 that corresponds to that inherently introduced during inversion (block 2316) of the audio signal from second transducer 2304.

The system in FIG. 34 may be configured to adjust the gain of the signal only when speech is detected to ensure that the gain is not suddenly boosted during periods between speech and thereby avoid boosting the noise level during those periods. This configuration overcomes the problems typically associated with using automatic gain control in which the gain is automatically increased during periods between speech and thereby unnecessarily amplifying noise.

It should be noted that both the functions outlined in FIGS. 31 and 34 may be combined in whole or in part to achieve various significant improvements in speech processing.

The present invention also may use the time relationship between vocal cord events and sibilance occurrences to identify the spoken phoneme and recreate it correctly. This may add processing delay but significantly improves vocal recognition. Knowing when the vocal event occurred the system can look for minor differences relative to the preceding time interval. There are a limited number of possibilities and due to noise, nature can be recreated more universally than the more unique vocal cord noises. For example, the system can determine that a "Sh" sound was uttered and recreate a perfect "Sh" sound. Other utterances include the "S," "T," and "P" sounds. These are all simple noise bursts of well defined nature.

The environment around separated transducers significantly disturbs the frequency response and polar of each transducer. For example, a transducer located closer to the front surface of a mirror in a rearview mirror assembly will experience a different polar and frequency response than a transducer located farther back. The inventive system can combine acoustic adjustments and adaptive adjustment to compensate for these errors. The transducer balance may be adjusted on an adaptive band by band basis to minimize the dominant acoustic noise in each band. This assures the greatest noise reduction possible. Such an adjustment is preferably performed only during the intervals between speech utterances. Any resulting reduction in speech level will be compensated automatically. Noise reduction will be greater than any speech level loss. This assures a maximum signal-to-noise ratio.

According to another aspect of the present invention, reliable continuity is provided through a two wire microphone interface that removably couples a microphone assembly to an electronic assembly. The microphone assembly includes a power source and a two wire microphone interface. The microphone interface includes two contacts that provide an audio signal to the electronic assembly. A continuous direct current is provided through the two contacts such that a low impedance path is maintained between the microphone assembly and the electronic assembly.

Figure 35:
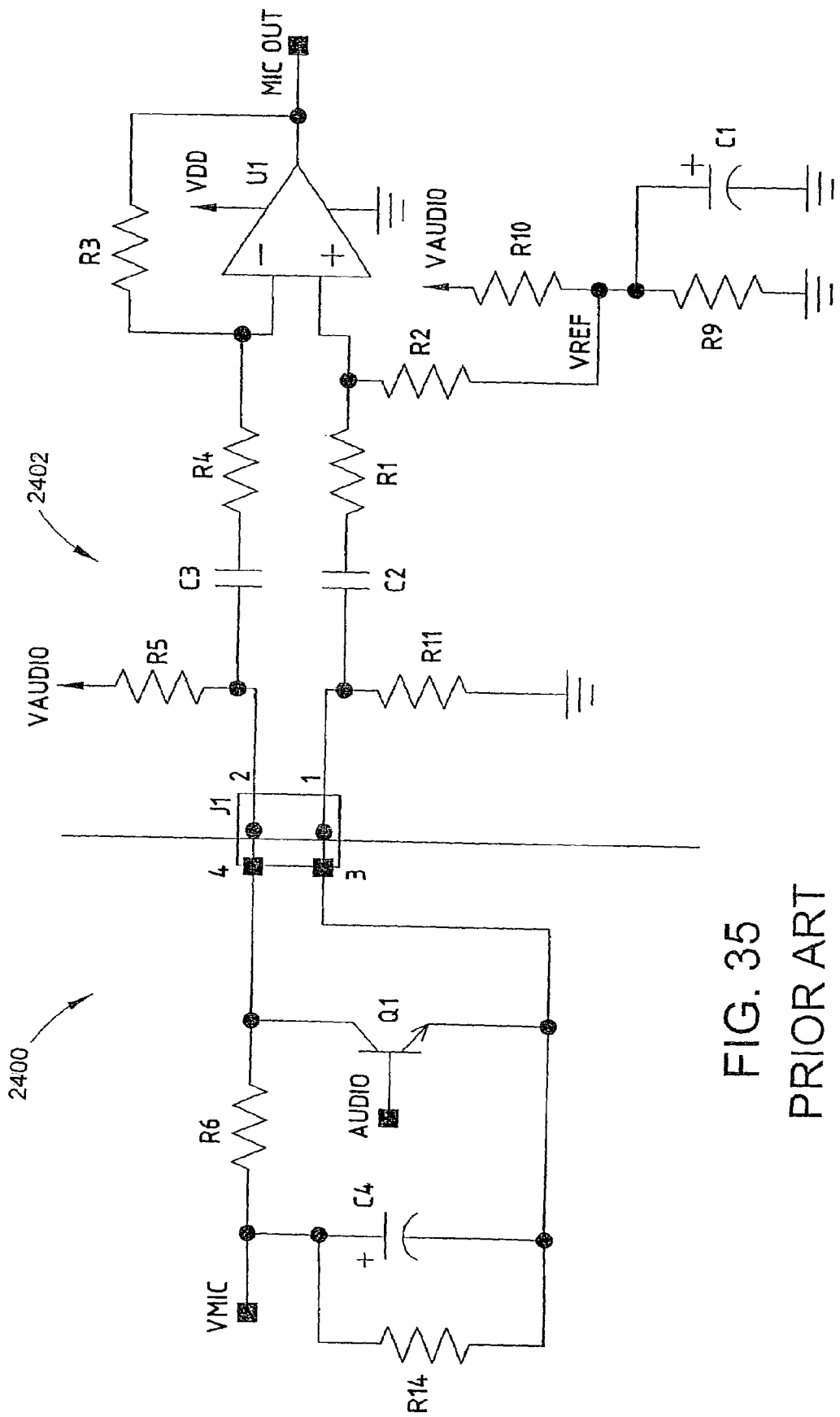
FIG. 35 is a simplified electrical schematic of a prior art microphone assembly coupled to an electronic assembly.

FIG. 35 depicts a simplified electrical schematic of a microphone assembly (including a prior art microphone interface) 2400 coupled to an electronic assembly 2402 (e.g., a differential amplifier stage). As shown in the circuit of FIG. 35, power is provided to the microphone 2400 via a power source (VAUDIO). VAUDIO is coupled to a first end of a resistor R5. A second end of resistor R5 is coupled to a contact 2 of a connector J1. When mated, contact 2 of connector J1 is coupled to a contact 4 of connector J1 and to a first end of a resistor R6. A second end of resistor R6 is coupled to a first end of a resistor R14. A second end of resistor R14 is coupled to a contact 3 of connector J1. Contact 3 of connector J1 is coupled to a contact 1 of connector J1, which is coupled to a first end of a resistor R11. A second end of resistor R11 is coupled to a common ground of the electronic assembly 2402.

In brief, VAUDIO provides power to the microphone assembly via a resistor R5. The current through resistors R5 and R6 provides a charging current to capacitor C4, which serves to provide a filtered microphone power supply (VMIC). A continuous wetting current (DC) is provided by VAUDIO through resistor R5, contacts 2 and 4 of connector J1, resistors R6 and R14, contacts 3 and 1 of connector J1 and resistor R11. Transistor Q1, which is coupled to the first end of resistor R6 and the second end of resistor R14, represents the load presented by a microphone preamplifier.

Figure 36:
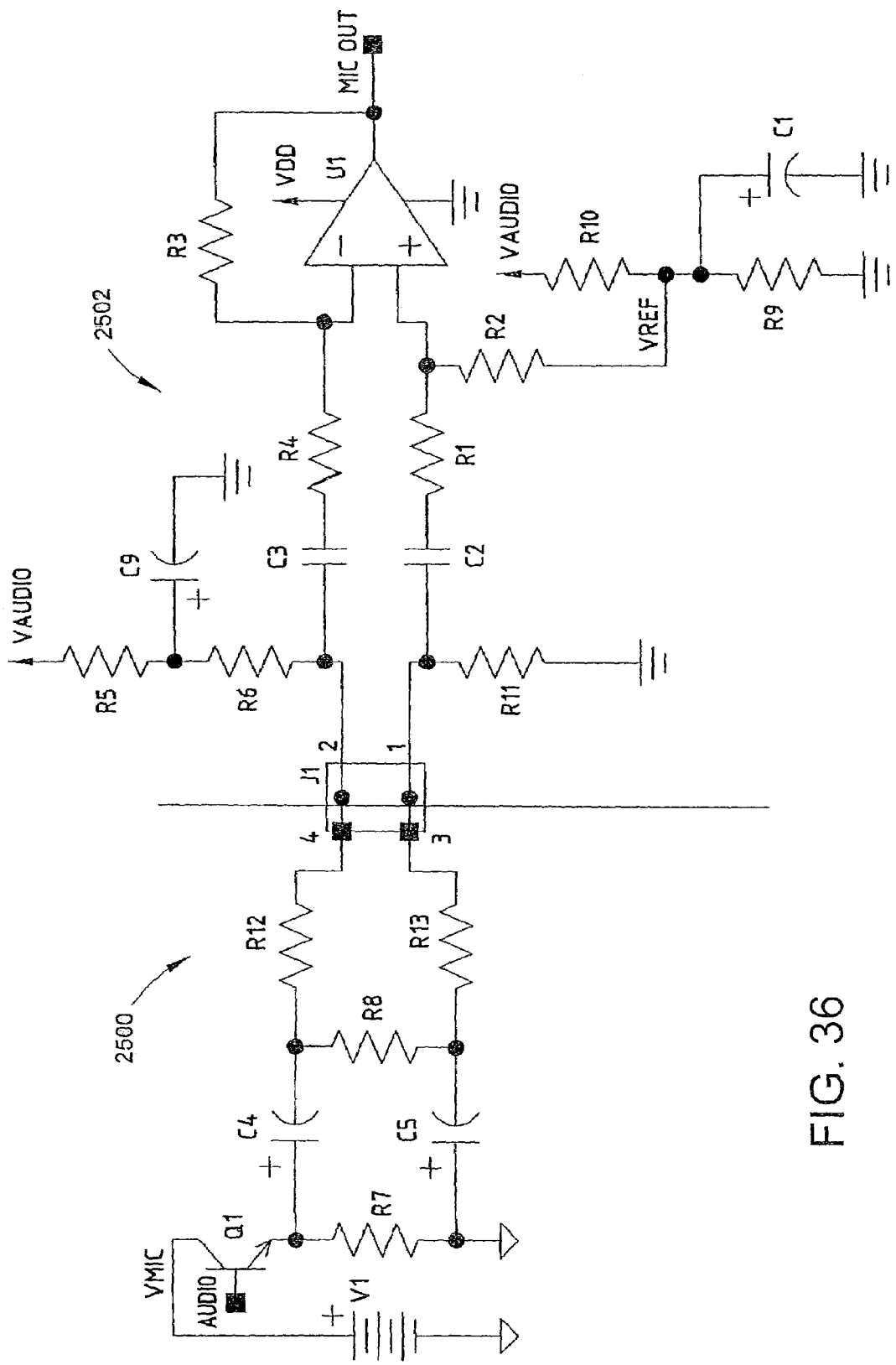
FIG. 36 is a simplified electrical schematic of a microphone assembly coupled to an electronic assembly through a microphone interface, according to an embodiment of the present invention.

Turning to FIG. 36, a simplified electrical schematic of a microphone assembly 2500 (including a microphone interface, according to an embodiment of the present invention) coupled to an electronic assembly 2502 (e.g., a differential amplifier stage) is shown. VAUDIO is coupled to a first end of a resistor R5. A second end of resistor R5 is coupled to a first end of a resistor R6. A second end of resistor R6 is coupled to a contact 2 of a connector J1. When mated, contact 2 of connector J1 is coupled to a contact 4 of connector J1 and a first end of a resistor R12. A second end of resistor R12 is coupled to a first end of a resistor R8. A second end of resistor R8 is coupled to a first end of a resistor R13. A second end of resistor R13 is coupled to a contact 3 of connector J1, which is coupled to contact 1 of connector J1. Contact 1 of connector J1 is coupled to a first end of a resistor R11. A second end of resistor R11 is coupled to a common ground of the electronic assembly 2502.

As shown in FIG. 36, while an auxiliary power supply (V1) provides power to the microphone assembly 2500 (or at least a portion of microphone assembly 2500), the wetting current (DC) is supplied by the electronic assembly 2502 power source VAUDIO. The wetting current (DC) is supplied from VAUDIO through resistors R5 and R6, contacts 2 and 4 of connector J1, resistors R12, R8, R13 and resistor R11. The microphone interface, according to the present invention, provides a wetting current for more sophisticated microphone assemblies, such as those that incorporate digital signal processors (DSPs), which receive power from an auxiliary power source. The present invention allows connectors to be used that have non-precious metal contacts, which reduces the cost of the interface while at the same time providing a reliable connection between the microphone assembly 2500 and the electronic assembly 2502. The possible selection of values for resistors R5, R6, R8, R11, R12 and R13 can widely vary provided that the gain and bandwidth of the microphone assembly and any associated amplifiers are not adversely affected. If desired, one of resistors R5 or R6 can be replaced with a short. Also, resistors R11, R12 and R13 can be replaced with shorts, if desired. The value for resistors R8 and R5 or R6 are then selected to provide an appropriate amount of wetting current. For example, if VAUDIO is twelve volts and a one milliampere wetting current is desired; if a 2 kΩ resistor is selected for resistor R5 and resistors R6, R11, R12 and R13 are shorts, then a 10 kΩ resistor is selected for resistor R8. One of ordinary skill in the art will appreciate that resistors can be more generally an impedance (e.g., R8 can be a choke or active circuit). The component values indicated in FIG. 36 provide generally acceptable performance for the microphone assembly utilized.

Figure 37:
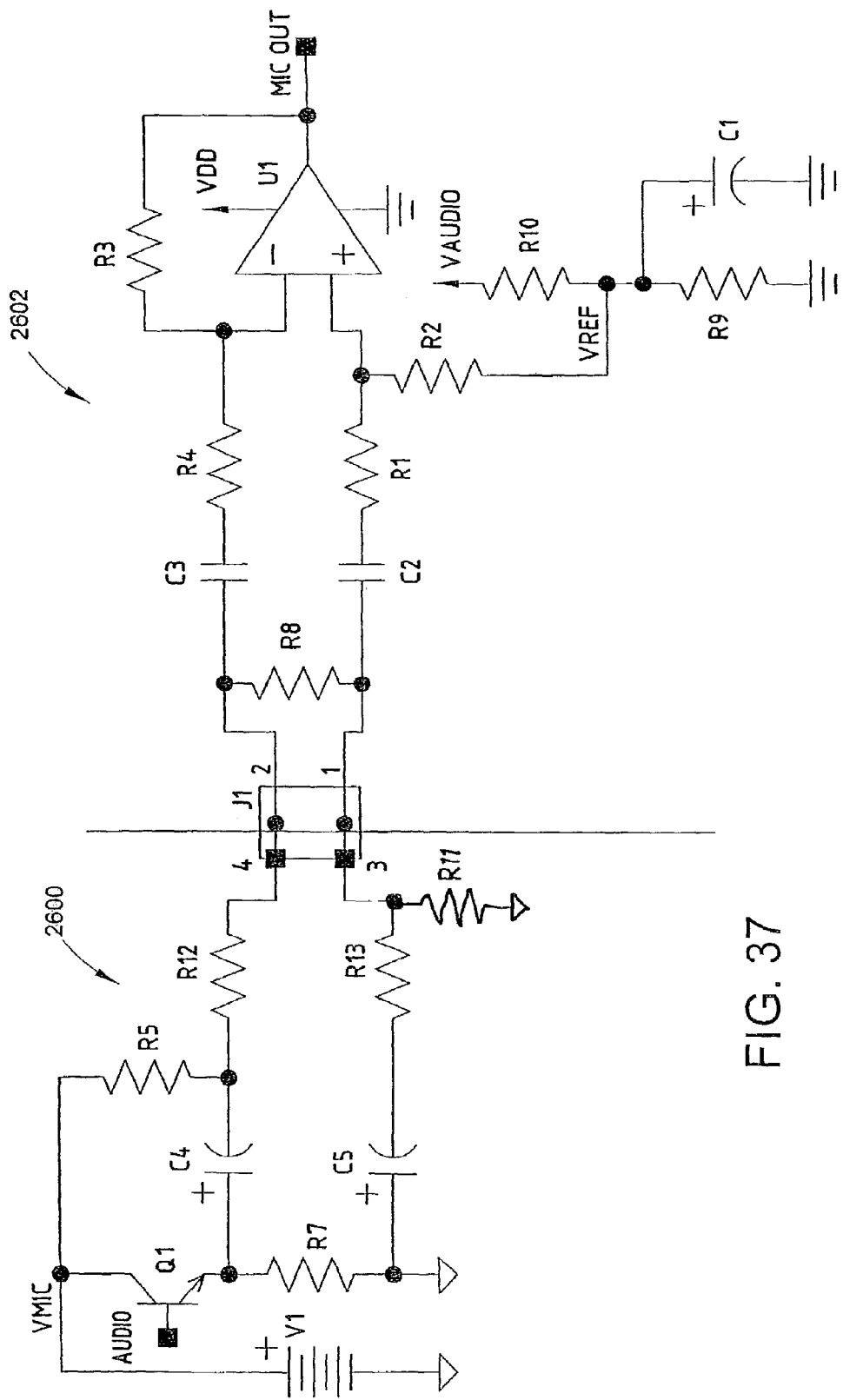
FIG. 37 is a simplified electrical schematic of a microphone assembly coupled to an electronic assembly through a microphone interface, according to another embodiment of the present invention.

FIG. 37 depicts yet another embodiment of the present invention where the wetting current is supplied from the auxiliary power supply (V1). The wetting current (DC) is supplied from power supply V1 through resistors R5 and R12, contacts 4 and 2 of a connector J1, a resistor R8, contacts 1 and 3 of connector J1 and a resistor R11. If desired, resistors R11, R12 and R13 can be replaced with shorts. The value for resistors R5 and R8 are then selected to provide an appropriate amount of wetting current. The embodiment of FIG. 37 is particularly useful, from the view point of the manufacturer of microphone assembly 2600, in that the only component that a manufacturer of electronic assembly 2602 need provide is resistor R8, across contacts 1 and 2 of connector J1.

Figure 38:
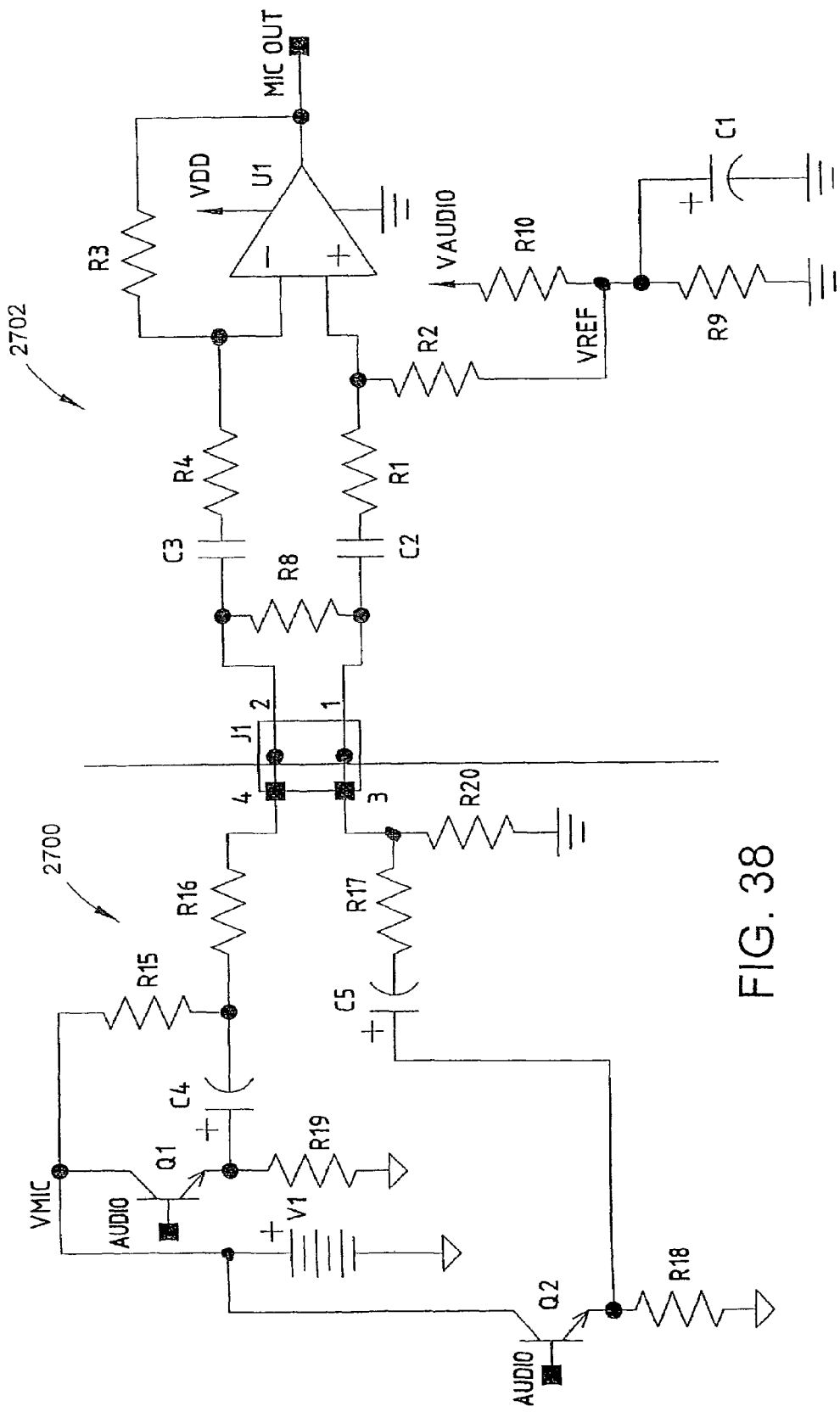
FIG. 38 is a simplified electrical schematic of a microphone assembly coupled to an electronic assembly through a microphone interface, according to yet another embodiment of the present invention.

FIG. 38 depicts yet another embodiment of the present invention wherein the input to the electronic assembly 2702, provided from microphone assembly 2700, is balanced. The wetting current (DC) is supplied from power supply (V1) through a resistor R15, a resistor R16, contacts 4 and 2 of connector J1, a resistor R8, contacts 1 and 3 of connector J1 and a resistor R20. If desired, resistors R16, R17 and R20 can be replaced with shorts. The value for resistors R8 and R15 are then selected to provide an appropriate amount of wetting current. The wetting current (DC) can be supplied from a voltage supply, a resistor, a constant current source, inductor or other power source connected to one of the microphone assembly leads. Providing that the microphone has a DC path for it to complete the wetting current circuit, the source of the current is immaterial.

As shown in FIG. 38, the audio is AC coupled from the microphone assembly output stage to the electronic assembly 2702. The present invention can be extended to multiple connectors that may be included within a microphone assembly or an electronic assembly. According to the present invention, all connectors have a DC current flowing through them to maintain a wetting circuit. Thus, oxidation of the contacts will not disadvantageously affect the circuits utilizing embodiments of the present invention. Additionally, the DC voltage of the microphone input can be used to verify interface continuity for built in test capability.

The microphone assembly can be incorporated anywhere in the interior of a vehicle. For example, the microphone assembly can be located in the interior trim of a vehicle, in an overhead console, within a visor or within a rearview mirror or the housing of an electronic rear vision display. In a preferred embodiment, the microphone assembly is incorporated within an automotive rearview mirror. If desired, the contacts of the connector that couples the microphone assembly to the electronic assembly can be plated with a precious metal (e.g., gold or silver) to facilitate improved continuity.

Thus, it can be seen that an improved microphone assembly for vehicles is disclosed. It is envisioned that the microphone assembly may be applied to a wide variety of performance applications, in that the microphone assembly can include a single transducer or multiple transducers. By using multiple transducers, significantly improved performance is achieved. Use of one transducer, having a single diaphragm or multiple diaphragms suitably ported to achieve a desired directional pattern, offers a lower cost microphone that can be used in the same mount and housing as the multiple transducer microphone assembly, in applications where the higher performance is not required.

While the invention has been described in detail herein in accordance with certain embodiments thereof, many modifications and changes may be effected by those skilled in the art without departing from the spirit of the invention. Accordingly, it is our intent to be limited only by the scope of the appending claims and not by way of details and instrumentalities describing the embodiments shown herein.

What is claimed is:

1. A rearview mirror assembly for a vehicle, comprising:
   a mirror subassembly including a mirror housing and adapted to be attached to the vehicle;
   a mirror disposed in said mirror housing; and
   a microphone assembly mounted to, on, or within said mirror housing comprising:
   a microphone housing having at least one acoustic port;
   a transducer disposed in said microphone housing, wherein said transducer includes a transducer housing having at least one port; and
   a windscreen sealed across said acoustic port, said windscreen having hydrophobic properties to prevent water from penetrating said microphone housing through said acoustic port,
   wherein said mirror is an electrochromic mirror.

2. The rearview mirror assembly of claim 1 and further including a circuit board having a hole sized to receive at least a portion of said transducer, wherein said transducer is mounted within the hole in the circuit board such that a portion of said transducer extends below a bottom surface of said circuit board.

3. The rearview mirror assembly of claim 1 and further including a second transducer disposed in said microphone housing.

4. The rearview mirror assembly of claim 1, wherein said transducer includes a front and a rear surface, wherein said front surface is acoustically coupled to said acoustic port in said microphone housing.

5. The rearview mirror assembly of claim 1, wherein said microphone housing has at least two acoustic ports and wherein said windscreen is sealed across said acoustic ports.

6. The rearview mirror assembly of claim 5, wherein said transducer includes a front and a rear surface, wherein said front surface is acoustically coupled to a first one of said acoustic ports in said microphone housing and said rear surface is acoustically coupled to a second one of said acoustic ports.

7. The rearview mirror assembly of claim 1, wherein said transducer is positioned in said microphone housing such that said at least one port of said transducer housing is spaced apart from said windscreen.

8. The rearview mirror assembly of claim 1, wherein:
said at least one acoustic port in said microphone housing includes at least one front acoustic port and at least one rear acoustic port;
said windscreen is disposed across said front and rear acoustic ports;
said at least one port in said transducer housing includes at least one front port and at least one rear port;
said at least one front port of said transducer housing being acoustically coupled to said at least one front acoustic port of said microphone housing; and
said at least one rear port of said transducer housing being acoustically coupled to said at least one rear acoustic port of said microphone housing.

9. The rearview mirror assembly of claim 8, wherein said microphone housing defines a common cavity to which both said front and rear ports of said transducer housing are acoustically coupled.

10. The rearview mirror assembly of claim 1, wherein said at least one acoustic port in said microphone housing includes at least one front acoustic port and at least one rear acoustic port, and wherein said microphone housing defines a common cavity to which both said front and rear acoustic ports of said microphone housing are acoustically coupled.

11. The rearview mirror assembly of claim 1, wherein said windscreen is adhesively attached to the underside of said microphone housing so as to extend across said acoustic port.

12. The rearview mirror assembly of claim 1 and further comprising a circuit board, wherein said transducer is mounted to said circuit board and said microphone housing is tightly bonded about said circuit board to provide a water-impervious enclosure for at least a portion of said transducer.

13. The rearview mirror assembly of claim 1, wherein said windscreen is molded integrally across said acoustic port of said microphone housing.

14. The rearview mirror assembly of claim 1, wherein said windscreen is made of cloth.

15. A vehicle accessory for mounting to a vehicle, comprising:
a microphone assembly comprising:
a microphone housing having at least one acoustic port;
a transducer disposed in said microphone housing;
a windscreen sealed across said acoustic port, said windscreen having hydrophobic properties to prevent water from penetrating said microphone housing through said acoustic port; and
a circuit board having a hole sized to receive at least a portion of said transducer, wherein said transducer is mounted within the hole in the circuit board such that a portion of said transducer extends below a bottom surface of said circuit board.

16. A vehicle accessory for mounting to a vehicle, comprising:
a vehicle accessory housing adapted to be mounted to the vehicle;
a microphone assembly mounted to, on, or within said vehicle accessory housing, comprising:
a microphone housing having at least one acoustic port;
a first transducer disposed in said microphone housing;
a windscreen sealed across said acoustic port, said windscreen having hydrophobic properties to prevent water from penetrating said microphone housing through said acoustic port; and
a second transducer disposed in said microphone housing,
wherein said first and second transducers each comprise a transducer housing having at least one port.

17. A vehicle accessory for mounting to a vehicle, comprising:
a microphone assembly comprising:
a microphone housing having at least one acoustic port;
a transducer disposed in said microphone housing, wherein said
transducer includes transducer housing having at least one port; and
a windscreen sealed across said acoustic port, said windscreen having hydrophobic properties to prevent water from penetrating said microphone housing through said acoustic port,
wherein said vehicle accessory is a rearview mirror assembly having a mirror housing and said microphone housing is mounted on said mirror housing.

18. The vehicle accessory of claim 17, wherein said transducer includes a front and a rear surface, wherein said front surface is acoustically coupled to said acoustic port in said microphone housing.

19. The vehicle accessory of claim 17, wherein said microphone housing has at least two acoustic ports and wherein said windscreen is sealed across said acoustic ports.

20. The vehicle accessory of claim 19, wherein said transducer includes a front and a rear surface, wherein said front surface is acoustically coupled to a first one of said acoustic ports in said microphone housing and said rear surface is acoustically coupled to a second one of said acoustic ports.

21. The vehicle accessory of claim 17, wherein said windscreen is adhesively attached to the underside of said microphone housing so as to extend across said acoustic port.

22. The vehicle accessory of claim 17, wherein said windscreen is molded integrally across said acoustic port of said microphone housing.

23. The vehicle accessory of claim 17, wherein said windscreen is made of cloth.

24. A vehicle accessory for mounting to a vehicle, comprising:
a microphone assembly comprising:
a microphone housing having at least one acoustic port;
a transducer disposed in said microphone housing;
a windscreen sealed across said acoustic port, said windscreen having hydrophobic properties to prevent water from penetrating said microphone housing through said acoustic port; and
a circuit board, wherein said transducer is mounted to said circuit board and said microphone housing is tightly bonded about said circuit board to provide a water-impervious enclosure for at least a portion of said transducer.

25. A vehicle accessory for mounting to a vehicle, comprising:
a vehicle accessory housing adapted to be mounted to the vehicle;
a microphone assembly mounted to, on, or within said vehicle accessory housing, comprising:
a microphone housing having at least one acoustic port;
a transducer disposed in said microphone housing; and
a windscreen sealed across said acoustic port, said windscreen having hydrophobic properties to prevent water from penetrating said microphone housing through said acoustic port,
wherein said transducer includes a transducer housing having at least one port.

26. The vehicle accessory of claim 25, wherein said transducer is positioned in said microphone housing such that said at least one port of said transducer housing is spaced apart from said windscreen.

27. A vehicle accessory for mounting to a vehicle, comprising:
a microphone assembly comprising:
a microphone housing having at least one acoustic port;
a transducer disposed in said microphone housing; and
a windscreen sealed across said acoustic port, said windscreen having hydrophobic properties to prevent water from penetrating said microphone housing through said acoustic port,
wherein said transducer includes a transducer housing having at least one port, and wherein:
said at least one acoustic port in said microphone housing includes at least one front acoustic port and at least one rear acoustic port;
said windscreen is disposed across said front and rear acoustic ports;
said at least one port in said transducer housing includes at least one front port and at least one rear port;
said at least one front port of said transducer housing being acoustically coupled to said at least one front acoustic port of said microphone housing; and
said at least one rear port of said transducer housing being acoustically coupled to said at least one rear acoustic port of said microphone housing.

28. The vehicle accessory of claim 27, wherein said microphone housing defines a common cavity to which both said front and rear ports of said transducer housing are acoustically coupled.

* * * * *